US010089033B2

(12) United States Patent
Yamamoto et al.

(10) Patent No.: US 10,089,033 B2
(45) Date of Patent: Oct. 2, 2018

(54) STORAGE SYSTEM

(71) Applicant: HITACHI, LTD., Tokyo (JP)

(72) Inventors: Akira Yamamoto, Tokyo (JP); Junji Ogawa, Tokyo (JP); Norio Shimozono, Tokyo (JP); Yoshihiro Yoshii, Tokyo (JP); Kazuei Hironaka, Tokyo (JP); Atsushi Kawamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/122,533

(22) PCT Filed: Apr. 24, 2014

(86) PCT No.: PCT/JP2014/061577
§ 371 (c)(1),
(2) Date: Aug. 30, 2016

(87) PCT Pub. No.: WO2015/162758
PCT Pub. Date: Oct. 29, 2015

(65) Prior Publication Data
US 2017/0075620 A1    Mar. 16, 2017

(51) Int. Cl.
*G06F 12/00*      (2006.01)
*G06F 13/00*      (2006.01)
(Continued)

(52) U.S. Cl.
CPC .......... *G06F 3/0641* (2013.01); *G06F 3/0608* (2013.01); *G06F 3/0659* (2013.01);
(Continued)

(58) Field of Classification Search
CPC ............... G06F 3/0641; G06F 17/3015; G06F 17/30097; G06F 11/1004; G06F 12/0246
(Continued)

(56) References Cited

U.S. PATENT DOCUMENTS

2006/0059408 A1    3/2006  Chikusa et al.
2007/0277017 A1*  11/2007  Yamane ................ G06F 3/0608
                                                     711/170
(Continued)

FOREIGN PATENT DOCUMENTS

JP    2006-079380 A    3/2006
JP    2009-048497 A    3/2009
(Continued)

OTHER PUBLICATIONS

International Search Report of PCT/JP2014/061577 dated Aug. 12, 2014.

*Primary Examiner* — Edward Dudek, Jr.
*Assistant Examiner* — Sidney Li
(74) *Attorney, Agent, or Firm* — Mattingly & Malur, PC

(57) ABSTRACT

A storage system according to the present invention has a plurality of flash packages equipped with a deduplication function. When a storage controller transmits a write data and a feature value of write data to a flash package, the flash package compares contents of the write data with data having a same feature value as the feature value of the write data. As a result of the comparison, if there is no corresponding data, the write data is stored in the flash memory, but if there is a corresponding data, the new data will not be stored. Thus, a greater number of data can be stored in the flash memory while preventing deterioration of performance.

14 Claims, 44 Drawing Sheets

(51) Int. Cl.
| | |
|---|---|
| *G06F 13/28* | (2006.01) |
| *G06F 3/06* | (2006.01) |
| *G06F 12/084* | (2016.01) |
| *G06F 12/0866* | (2016.01) |
| *G06F 12/0871* | (2016.01) |
| *G06F 12/0873* | (2016.01) |
| *G06F 12/1009* | (2016.01) |
| *G06F 12/109* | (2016.01) |
| *G06F 12/02* | (2006.01) |
| *G06F 11/10* | (2006.01) |
| *G06F 17/30* | (2006.01) |

(52) U.S. Cl.
CPC .......... *G06F 3/0688* (2013.01); *G06F 12/084* (2013.01); *G06F 12/0866* (2013.01); *G06F 12/0871* (2013.01); *G06F 12/0873* (2013.01); *G06F 12/1009* (2013.01); *G06F 12/109* (2013.01); *G06F 11/1004* (2013.01); *G06F 12/0246* (2013.01); *G06F 17/3015* (2013.01); *G06F 17/30097* (2013.01); *G06F 2212/1044* (2013.01); *G06F 2212/1048* (2013.01); *G06F 2212/2022* (2013.01); *G06F 2212/263* (2013.01); *G06F 2212/466* (2013.01); *G06F 2212/657* (2013.01)

(58) Field of Classification Search
USPC ........................................................... 711/103
See application file for complete search history.

(56) References Cited

U.S. PATENT DOCUMENTS

| | | |
|---|---|---|
| 2009/0055593 A1 | 2/2009 | Satoyama et al. |
| 2009/0077097 A1* | 3/2009 | Lacapra ............ G06F 17/30079 |
| 2009/0089483 A1* | 4/2009 | Tanaka .................. G06F 3/0608 |
| | | 711/103 |
| 2009/0310408 A1* | 12/2009 | Lee ...................... G11C 11/5628 |
| | | 365/185.03 |
| 2012/0290801 A1 | 11/2012 | Hasegawa et al. |
| 2012/0317333 A1 | 12/2012 | Yamamoto et al. |

FOREIGN PATENT DOCUMENTS

| | | |
|---|---|---|
| JP | 2009-087021 A | 4/2009 |
| JP | 2012-238125 A | 12/2012 |

\* cited by examiner

Fig. 5

| Logical Volume ID | — 2001 |
|---|---|
| Logical Capacity | — 2002 |
| Logical Volume RAID Type | — 2003 |
| Real Page Pointer | — 2004(2004-0) |
| ⋮ | |
| Real Page Pointer | — 2004(2004-(n-1)) |

Logical Volume Information 2000

Fig. 6

| Package Group | — 2101 |
|---|---|
| Real Page Address | — 2102 |
| Free Page Pointer | — 2103 |
| Amount of Stored Page Data | — 2104 |
| Amount of Stored Data After Page Deduplication | — 2105 |
| Transfer State Flag | — 2109 |
| Transfer Destination Real Page Information | — 2110 |
| Transfer Standby Flag | — 2111 |

Real Page Information 2100

Fig. 9

| | |
|---|---|
| Flash Package ID | — 2501 |
| Flash Package Virtual Capacity | — 2502 |
| Virtual Block Capacity | — 2503 |

Flash Package Information 2500

Fig. 10

| | |
|---|---|
| Flash Package Group ID | — 2301 |
| Package Group RAID Type | — 2302 |
| Number of Real Pages | — 2303 |
| Number of Free Real Pages | — 2304 |
| Flash Package Pointer | — 2305 |
| ⋮ | |
| Flash Package Pointer | — 2305 |
| Number of Unavailable Real Pages | — 2306 |

Flash Package Group Information 2300

Free Page Management Information Queue 2201

Unavailable Page Management Information Queue 2701

Fig. 14

| Package ID | — 3001 |
| --- | --- |
| Virtual Package Capacity | — 3002 |
| Real Package Capacity | — 3003 |
| Flash Block Capacity | — 3004 |
| Flash Segment Capacity | — 3008 |
| Number of Free Blocks in Package | — 3005 |
| Amount of Stored Package Data | — 3006 |
| Amount of Stored Package Data after Deduplication | — 3007 |
| Number of Blocks for Storing Internal Information | — 3009 |
| Address Storing Internal Information | — 3010 |

Package Information 3000

Fig. 15

| Chip ID | — 3101 |
| --- | --- |
| Number of Real Blocks in Chip | — 3102 |
| Number of Free Real Blocks in Chip | — 3103 |
| Connection Bus ID | — 3104 |
|  |  |
| Connection Bus ID | — 3104 |

Chip Information 3100

Real Block Information 3300

Free Real Block Information Queue 1700

Real Page Information 2100'

Flash Package Information 2500'

Free Virtual Segment Management Information Queue 42000

STORAGE SYSTEM

TECHNICAL FIELD

The present invention relates to a deduplication technology in a storage system.

BACKGROUND ART

When rewriting data in a flash memory, the characteristic feature of the flash memory does not allow direct overwrite of update data to a physical area where the original data has been stored. In order to rewrite data, the update data must be written to a different area instead of to the area where the original data has been stored. Identical data are written in a plurality of areas, and when the blocks become full, only the newest data stored in the blocks are transferred to unused blocks, and thereafter, a delete process is performed to the blocks not storing the relevant newest data, to thereby create free blocks. In the following description, this process will be called a reclamation process. For this reason, in a storage device equipped with flash memories, a logical address layer having an address that differs from a physical address is provided as an address layer visible to higher-level devices using the storage device, such as host computers, and access requests to logical addresses are received from higher-level devices. When storing data, the physical addresses allocated to the logical addresses are changed as needed. According to this method, the logical address will not change even if the physical address is changed, so that higher-level devices can access the data without recognizing the change of physical address of the write data, so that a high usability can maintained.

Since storage devices having flash memories as storage media are extremely high-speed as compared with HDDs and the like, the use thereof is spreading widely along with the reduction of bit costs recently. In storage systems generally used in companies and the like, high reliability has been realized by having a plurality of HDDs and other storage devices and storing data in a redundant manner to the plurality of storage devices by the controller in the system, and high performance has been realized by having the plurality of storage devices perform processes in parallel. Therefore, even when storage devices having flash memories as storage media are used in a storage system, generally a plurality of storage devices using flash memories as storage media are installed in the storage system, and a storage controller is configured to control the plurality of storage devices having the flash memories as storage media. Some storage devices having flash memories as storage media have a form factor or interface compatible with HDDs, which are called SDDs (Solid State Disks). However, there are some storage devices that do not have compatibility with HDDs. The storage devices having flash memories as storage media described in the present invention include both meanings, and in the following description, both are collectively referred to as flash packages.

However, flash memories have higher bit costs compared to magnetic disks and the like, so there is a strong demand to reduce the capacity of stored data and increase apparent capacity (amount of data that can be stored from higher-level devices such as host computers). In the technical field of storage systems, a deduplication technology exists as a technology for reducing the capacity of stored data. The present technology causes the storage controller to check whether there are data having the same contents among the plurality of data stored in storage devices within the system, and if there are a plurality of data having the same contents, only causes one data to remain and the other same data are not stored (deleted) to thereby reduce the amount of data to be stored in the storage device. If all the data are checked to see whether there are data having the same contents, the amount of calculation becomes excessive, so that a method is often adopted to calculate a representative value of data such as a hash value for each data, by performing calculation using a hash function, and to perform a comparison process of only the data having the same representative values. Further, the method for calculating the representative value is not restricted to the method using a hash function, and can be any method, as long as the values calculated from the same data are always the same by the calculation method. In the following description, the representative value such as the hash value used in the deduplication technology is called a feature value.

Patent Literature 1 discloses an example of a data deduplication technology. Patent Literature 1 discloses a storage system equipped with a plurality of flash memory modules (flash packages), wherein the storage controller or the flash memory module calculates the hash value of write target data, and if the hash value of data already stored in the flash memory module is equal to the hash value of write target data, the flash memory module further compares the data stored in the relevant flash memory module with the write target data on bit-by-bit basis, and when the data correspond, the write target data will not be written to the physical block of the flash memory module, by which the number of rewrites of data of the flash memory can be reduced.

On the other hand, a capacity virtualization technology is spreading widely in a storage system. A capacity virtualization technology is a technology for showing a capacity greater than the physical capacity of the storage device installed in the storage system (virtual capacity) to the host side, which is realized in generally by the storage controller in the storage system. This technology utilizes the characteristic feature that when the user actually uses the storage, the amount of data actually stored in the system does not easily reach the capacity of the volume defined by the user (capacity of the storage device seen from the user). In other words, if there is no capacity virtualization technology, the physical storage area corresponding to the size of the whole storage area of the defined volume had been allocated when defining the volume, whereas if the capacity virtualization technology is applied, the physical storage area is allocated only when the data is actually stored in the storage system. According to this arrangement, the necessary amount of physical storage area can be reduced, and the user is not required to strictly define the volume capacity, so that the user should simply define a value with a great margin, according to which the usability of the system can be enhanced. Patent Literature 2 discloses a storage system having a storage controller coupled to a plurality of flash packages, wherein not only the storage controller but also the flash packages are equipped with a capacity virtualization technology. According further to Patent Literature 2, a technique is disclosed where the flash packages have a function to compress and store the data, and to change the virtual capacity that the flash package shows to the storage controller (lower-level virtual capacity) in response to the change of compression rate. Therefore, the flash package has shown to the storage controller a capacity greater than the actual physical capacity of the flash memories. In Patent Literature 2, the capacity virtualization technology executed by the storage controller is called a higher-level capacity virtualization function, and the capacity virtualization technology executed within the flash packages is called a lower-level capacity virtualization function, to thereby distinguish the two virtualization technologies.

When compression is performed, the data length after compression differs in each data update, so that there are many cases where data cannot be stored in the area where the data had been originally stored. Due to the property of the flash memory, the updated data must be stored in a new area, so that realizing the compression function in a flash package is considered to make good use of the property of the flash memory.

CITATION LIST

Patent Literature

[PTL 1] US Patent Application Publication No. 2009/0089483
[PTL 2] US Patent Application Publication No. 2012/0317333

SUMMARY OF INVENTION

Technical Problem

In a large-scale storage system being the target of the present invention having flash memories as storage media, the number of flash memory chips reaches tens of thousands. Therefore, a configuration where a few hundreds of flash packages equipped with a few hundreds of chips are coupled to the controller of the storage system is the typical configuration of a large-scale storage system having flash memories as storage media.

The problems to be solved the present invention is to provide a large-scale storage system including a large number of flash packages, wherein the influence on the performance in the whole storage system is reduced, and the capacity of stored data in the flash memory is cut down using a deduplication technology, so that data having a capacity greater than the visible capacity can be stored. A first problem relates to the calculation of feature value of data when performing deduplication in a flash package. Generally, there is a strong cost reduction requirement in a flash package, so that when the feature value is calculated in a flash package, the increase of calculation overhead becomes a problem. On the other hand, when the feature value such as the hash value is calculated in the storage controller and the value is used for the deduplication process executed in the flash package, there is a need to add a new function (interface) to send the feature value to the flash package, which leads to increase of costs of the flash package.

We will now describe the second problem. If the flash package has a deduplication function, the deduplication of data between flash packages becomes a problem. Patent Literature 1 discloses a deduplication method of a case where there are multiple data having the same contents in a flash package, but it does not teach a specific method regarding the deduplication method of a case where multiple data having the same contents exist in different flash packages, other than that the storage controller executes deduplication of data having a size equal to or greater than a given value.

Solution to Problem

The first characteristic feature of the present invention for solving the first problem described above is as follows. In the present embodiment, an 8-byte assurance code including data showing a 2-byte feature value is added to a 512-byte data, and a standardized SCSI write command is used where 520 bytes is set as one transfer unit. When the controller sends write data to the flash package, it adds 8 bytes of data including a 2-byte feature value to the 512-byte data to execute data transfer in which 520 bytes is set as one transfer unit, according to which the flash package can receive the feature value of the write data. Using this feature value, it becomes possible to narrow down the data to be actually compared with the target data value. Thereby, it becomes unnecessary to calculate the feature value of the flash package, and to provide a new interface between the flash package and controller.

The second problem of the present invention is solved by the following method according to the present invention. In order for the flash package to actually execute deduplication process and to efficiently perform data deduplication among multiple flash packages, the present invention causes the storage controller to calculate the hash value of data, and based on the hash value, decides the flash package for storing data. When the feature values such as the hash values do not correspond, it means that the data themselves clearly do not correspond, in other words, deduplication cannot be performed, so that efficient deduplication within the whole system becomes possible by gathering data having the same hash value or feature value in one flash package.

Advantageous Effects of Invention

According to the present invention, a deduplication process having high efficiency and small performance deterioration can be realized in a large-capacity storage system equipped with multiple flash packages each having a large number of flash memories, according to which a capacity greater than the physical capacity can be allocated. In addition, the present invention can be applied not only to flash packages but also to storage devices such as HDDs, so that the present invention is also effective when applied to HDDs and other storage devices.

BRIEF DESCRIPTION OF DRAWINGS

FIG. 5 is a view showing a format of logical volume information according to the present embodiment.

FIG. 6 is a view showing a format of real page information according to the present embodiment.

FIG. 9 is a view showing a format of flash package information according to the present embodiment.

FIG. 10 is a view showing a format of flash package group information according to the present embodiment.

FIG. 14 is a view showing a format of package information according to the present embodiment.

FIG. 15 is a view showing a format of chip information according to the present embodiment.

DESCRIPTION OF EMBODIMENTS

Embodiment 1

Figure 1:
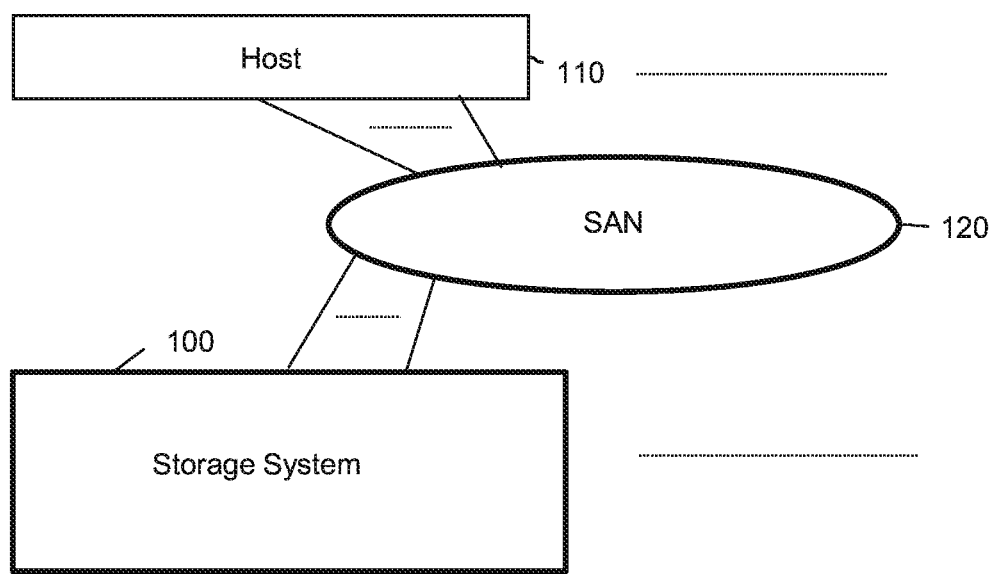
FIG. 1 is a view showing a configuration of an information system according to the preferred embodiment of the present invention.

FIG. 1 is a view showing a configuration of an information system according to a preferred embodiment of the present invention. The information system is composed of a storage system 100, a host 110, and a SAN (Storage Area Network) 120 coupling these components. The host 110 is a system in which a user application is executed, and it reads and write required data back and forth to the storage system 100 via the SAN 120. The SAN 120 uses a protocol capable of transferring SCSI commands. For example, a Fibre Channel or other protocols can be used. The present invention is also effective in a configuration where the host 110 and the storage system 100 are directly coupled.

The present embodiment realizes a technology for reducing the capacity of data stored in a flash memory through a deduplication process in the storage system 100 comprising a large number of flash memories as storage media. In the first embodiment, the storage system 100 has a hierarchical capacity virtualization technology. The control unit of a higher-level capacity virtualization technology is called "page". Page in this embodiment is used in the capacity virtualization technology realized in accordance with a storage controller 200 disclosed for example in PTL 2. Furthermore, the present invention is also effective even when a higher-level control unit in the hierarchical capacity virtualization technology is not a page.

In the present embodiment, the size of the page is larger than a block which is the delete unit in the flash memory. Since the read/write unit in a flash memory is normally called a page, a page is smaller than a block. However, as already explained, in the present embodiment, page is used as a term referring to the page which is the allocation unit of storage area in a capacity virtualization technology, and the size thereof is larger than the block. Furthermore, in the present embodiment, the read/write unit in the flash memory is called segment to distinguish it from the page which is the control unit in the higher-level capacity virtualization. Furthermore, the control unit of the lower-level capacity virtualization technology in the present embodiment will be explained as multiple units of the block which is the delete unit of the flash memory. The present invention will still be effective even when a capacity virtualization function, setting the flash memory as the storage media, the virtual capacity larger than the real capacity, and the block, which is the delete unit, as the allocation unit, is provided to the host 120 without a conventional higher-level capacity virtualization function.

Figure 2:
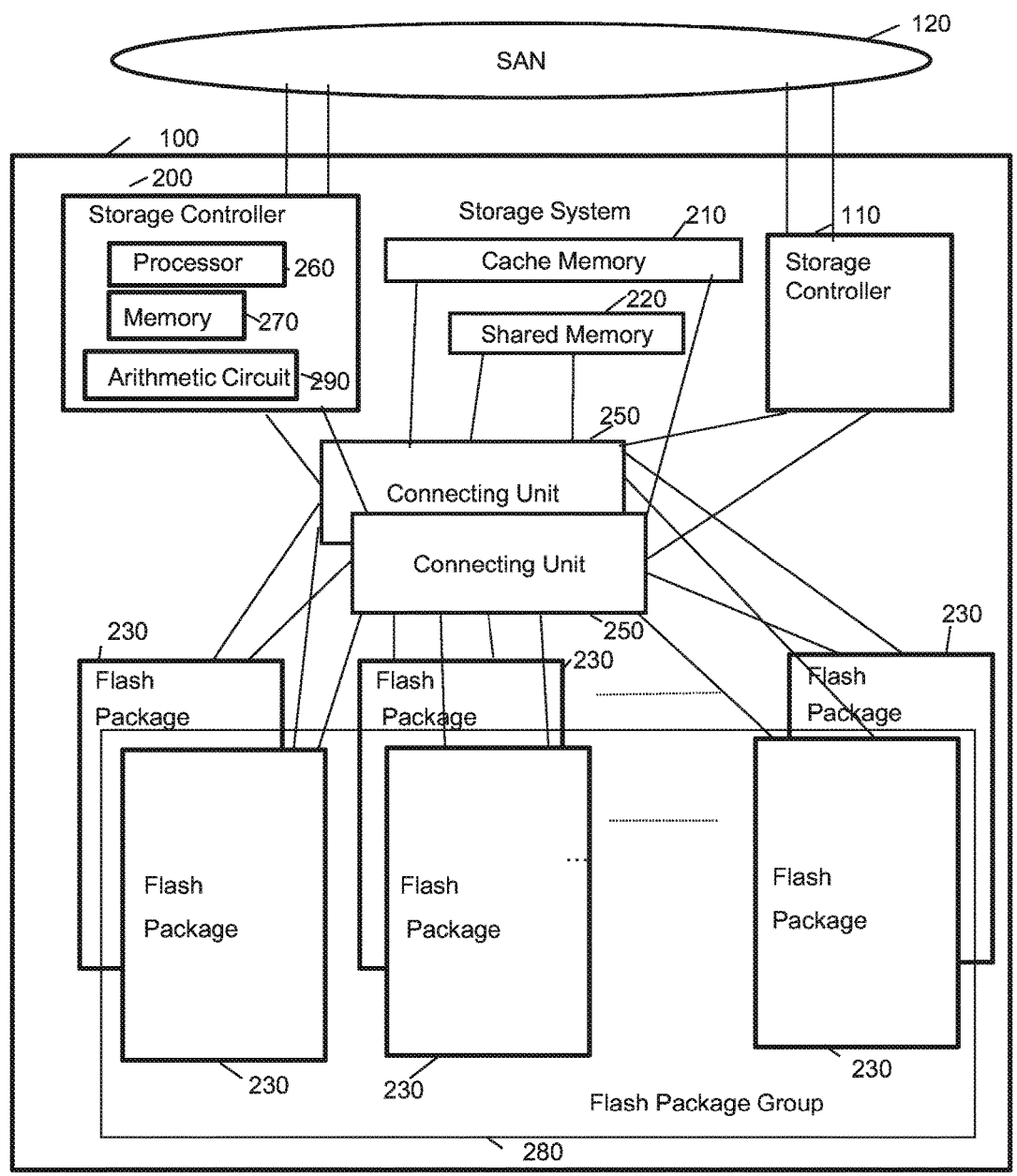
FIG. 2 is a view showing a configuration of a storage system according to the present embodiment.

FIG. 2 shows a configuration of the storage system 100. The storage system 100 is composed of one or more storage controllers 200, a cache memory 210, a shared memory 220, a flash package 230, and one or more connecting units 250 for coupling these components. Furthermore, in FIG. 2, the plurality of storage media inside the storage system are all flash packages 230, but the present embodiment is also effective when the system includes other types of storage media, such as an HDD, in addition to the flash packages. Further, the capacities of all the flash packages 230 are all the same in this example. However, the present invention is also effective when some of the flash packages 230 have different capacities. The storage controller 200 is composed of a processor 260 for processing read/write requests issued from the host 120, a memory 270 for storing programs and information, and an arithmetic circuit 290.

The characteristic feature of the present invention is that a deduplication process is executed by the flash package 230. In a deduplication process, when data has been newly written, a feature value similar to a hash value (value derived by performing a given calculation to data, wherein a calculation method assuring that the same value is always derived from data having the same contents is adopted to perform the relevant given calculation: a data length of the feature value is sufficiently shorter than a data length of the target data from which the feature value is calculated, for example, 2 bytes of feature value with respect to 512 bytes of data length) is calculated, and comparison is performed with other data having the same feature value to determine whether the data are the same, and if the data are the same, the relevant data is not stored to reduce the storage capacity.

The reason for using this feature value is to narrow down the target candidates for comparing the data contents. According to the storage system 100 of the first embodiment, the feature value is not calculated by the flash package 230. Calculation of the feature value requires complex calculation by referring to the whole data. Therefore, if the calculation of the feature value is executed within the flash package 230, the performance may be deteriorated thereby.

In the storage system 100 according to the first embodiment, the storage controller 200 executes the calculation of the feature value. However, the feature value calculated in the storage system 100 must be transmitted to the flash package 230. If it is necessary for the storage controller 200 to transmit the feature value to the flash package 230, it is necessary to provide a dedicated interface for transmitting and receiving the feature value between the flash package 230 and the storage controller 200. According to SCSI standards, data is transmitted in 512-byte units, but a method is standardized where an assurance code called DIF having 8 bytes in total, composed of the 2-byte feature value derived from the data contents and information such as an address in which the data is stored, for assuring that the data is correct, is added to the data so that a 520-byte data is transferred.

The characteristic feature of the first embodiment is that the flash package 230 extracts the 2-byte information showing the feature value from the 520-bytes of data and utilizes the same for deduplication. Further, since the calculation of the 2-byte feature value included in the DIF is often done with the aim to ensure data integrity and the like in the storage controller 200 requiring high reliability, data deduplication can be executed without creating a new overhead in such storage controller 200. Therefore, the storage controller 200 and the flash package 230 according to the preferred embodiment of the present invention are designed to support a data format and command set in compliance with SCSI standards. Commands in compliance with SCSI standards are used as I/O requests sent and received between the storage controller 200 and the flash package 230. A similar effect can be achieved by applying the embodiment to a storage device such as an HDD, instead of the flash package, so that the present invention is also effective when being applied to HDD and other storage devices. The arithmetic circuit 290 is a circuit for calculating the 2-byte feature value. However, the present invention is also effective even when the calculation of the 2-byte feature value is executed by the processor 260.

The connecting unit 250 is a mechanism for coupling the respective components within the storage system 100. In the storage system 100 according to the preferred embodiment of the present invention, each flash package 230 is coupled to one or more storage controllers 200 via a plurality of connecting units 250 to increase reliability. However, the present invention is also effective in a case where each flash package 230 is coupled to only one connecting unit 250.

The cache memory 210 and the shared memory 220 are normally composed of DRAM or other volatile memory, but it is made nonvolatile by a battery and the like. However, the present invention is also effective in a case where the cache memory 210 and the shared memory 220 are not made nonvolatile. Out of the data stored in the flash package 230, the data being frequently accessed by the storage controller 200 is stored in the cache memory 210. At a point of time when the storage controller 200 writes the data received to be written to the flash package 230 by a write request from the host 120 to the cache memory 210, it returns a notice that the relevant write request has been completed to the host 120, that is, data is written via a so-called write-back method. However, the present invention is also effective in a system where the write request is completed at the point of time when the write data is stored in the flash package 230. Control information of the cache memory 210, important management information within the storage system 100, the connection information between storage controllers 200, synchronized information and the like are stored in the shared memory 220.

Furthermore, in the storage system 100 according to the preferred embodiment of the present invention, each flash package 230 is recognized as a single storage device from the storage controller 200. It is assumed that the storage controller 200 has a Redundant Array of Independent Disks/Devices (RAID) function that enables data to be recovered even when one flash package 230 fails, to ensure availability. In a RAID function, a group composed of multiple flash packages 230 (so-called a RAID group) is defined, and when one flash package 230 within the RAID group fails, the data contents being stored in the failed flash package 230 can be recovered based on the information stored in the remaining flash packages 230 within the RAID group. In the present embodiment, this group composed of multiple flash packages 230 is called a flash package group 280. However, the present invention is also effective even when the storage controller 200 is not equipped with such RAID function.

Figure 3:
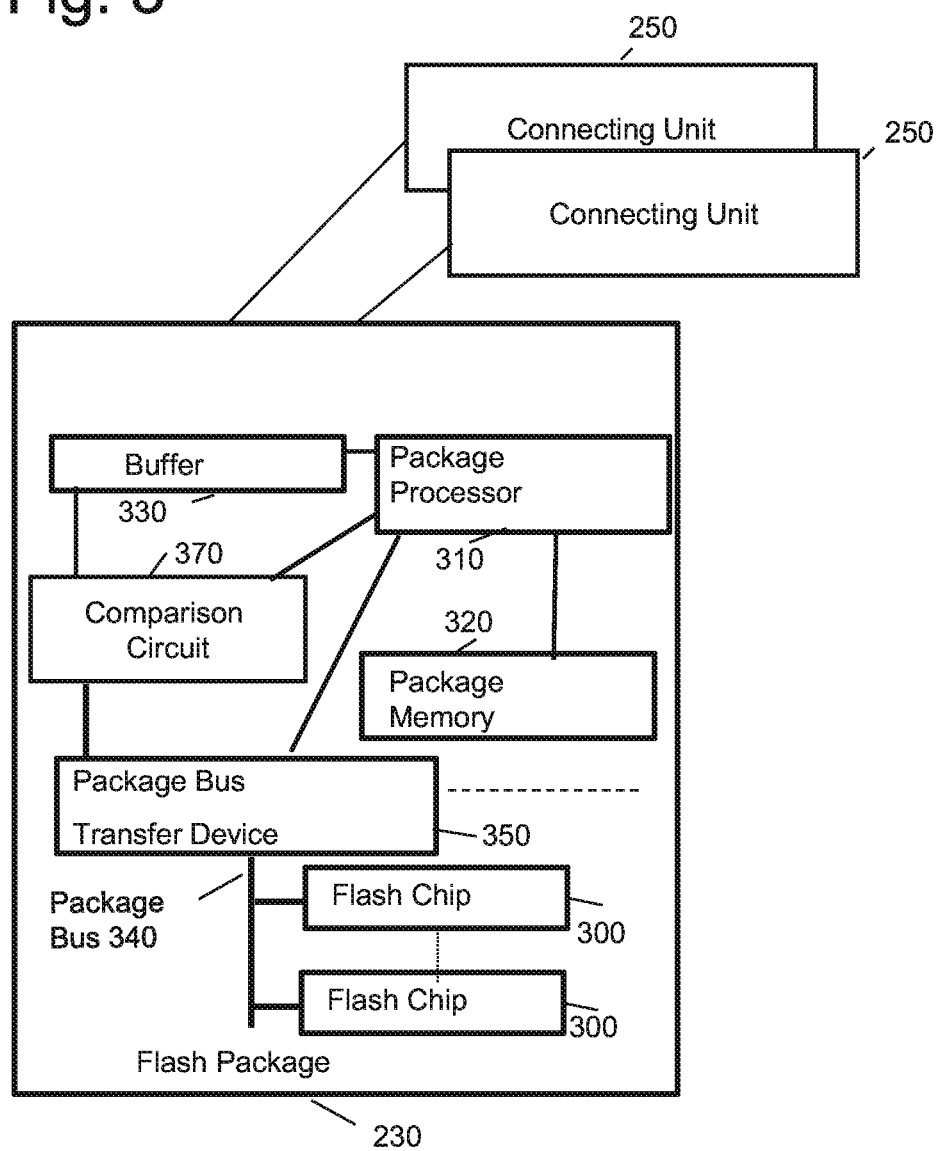
FIG. 3 is a view showing a configuration of a flash package according to the present embodiment.

FIG. 3 shows the configuration of the flash package 230. The flash package 230 is composed of a plurality of flash chips 300, a package processor 310, a package memory 320, a buffer 330, a package bus 340, a package bus transfer device 350, and a comparison circuit 370. The comparison circuit 370 is used by the flash package 230 when checking whether the newly written data value is equal to the data having been stored thereto or not. The comparison circuit 370 can be in the flash package 230 since the scale of calculation is small compared to the calculation of the feature value and the like. In the present embodiment, the present comparison is executed by the comparison circuit 370, but the present embodiment is also effective even if the comparison is executed by the package processor 310. The present embodiment is also effective in a case where the flash package 230 has a compression-extension function, and compresses the data written to the flash chip 300. The capacity reduction effect is further expanded through the combination with the compression function. In that case, there may be two methods for performing comparison, one method for first extending the read data and then performing comparison, and one method for compressing the received data before performing comparison, and either method can be adopted.

The flash package 230 according to the present embodiment has a capacity virtualization function performed in block units, which is the delete unit of the flash memory. However, the present invention is also effective even in a case where the flash package 230 has a capacity virtualization function in units other than blocks. For this reason, a storage space having a capacity that is larger than the total capacity of all flash chips 300 in the flash package 230 is defined, and the relevant storage space is provided to the storage controller 200, wherein when a write request to a certain location within the relevant storage space is received from the storage controller 200, whether or not a block to which the data should be written has been allocated to the relevant certain location is checked, and only when there is no allocated block, a block is allocated to the relevant certain location for the first time. Thereby, the time at which a block is actually allocated to a storage space can be delayed, and an effect of reducing capacity can thereby be realized.

The package processor 310 receives read/write requests from the storage controller 200, and executes processes in accordance with the received request. The buffer 330 stores the data to be either read or written between the storage controller 200 and the flash chip 300. In the flash package 230 according to the preferred embodiment of the present invention, the buffer 330 is a volatile memory, and when a write request is received from the storage controller 200, the flash package 230 reports that the write process has been completed to the storage controller 200 at the point of time when the received write data is written to the flash chip 300. However, the buffer 330 may be a nonvolatile memory, and the present invention is also effective in a case where the completion of write processing is reported at the point of time when the write data designated by the write request received from the storage controller 200 is written to the buffer 330.

A program executed by the package processor 310 and management information of the flash chip 300 are stored in the package memory 320. Since the management information is important information, it is preferable that the management information is able to be saved in a specific flash chip 300 during a planned stoppage of the storage system and the like. It is also preferable to have a battery in preparation for a sudden failure, and to use this battery to save the management information to a specific flash chip 300 when a failure or the like occurs.

The package bus 340 is for transferring data between the buffer 330 and the flash chip 300, and one or more of these package buses exist within the flash package 230. A flash package 230 generally has a plurality of package buses 340 to improve performance, but the present invention is still effective with just one package bus. The package bus transfer device 350 exists corresponding to each package bus 340, and executes data transfer between the buffer 330 and the flash chip 300 in accordance with an instruction from the package processor 310. The comparison circuit 370 is connected to the buffer 330, and compares data received from the storage controller 200 and the data read from the package memory 320 in accordance with an instruction from the package processor 310.

Figure 4:
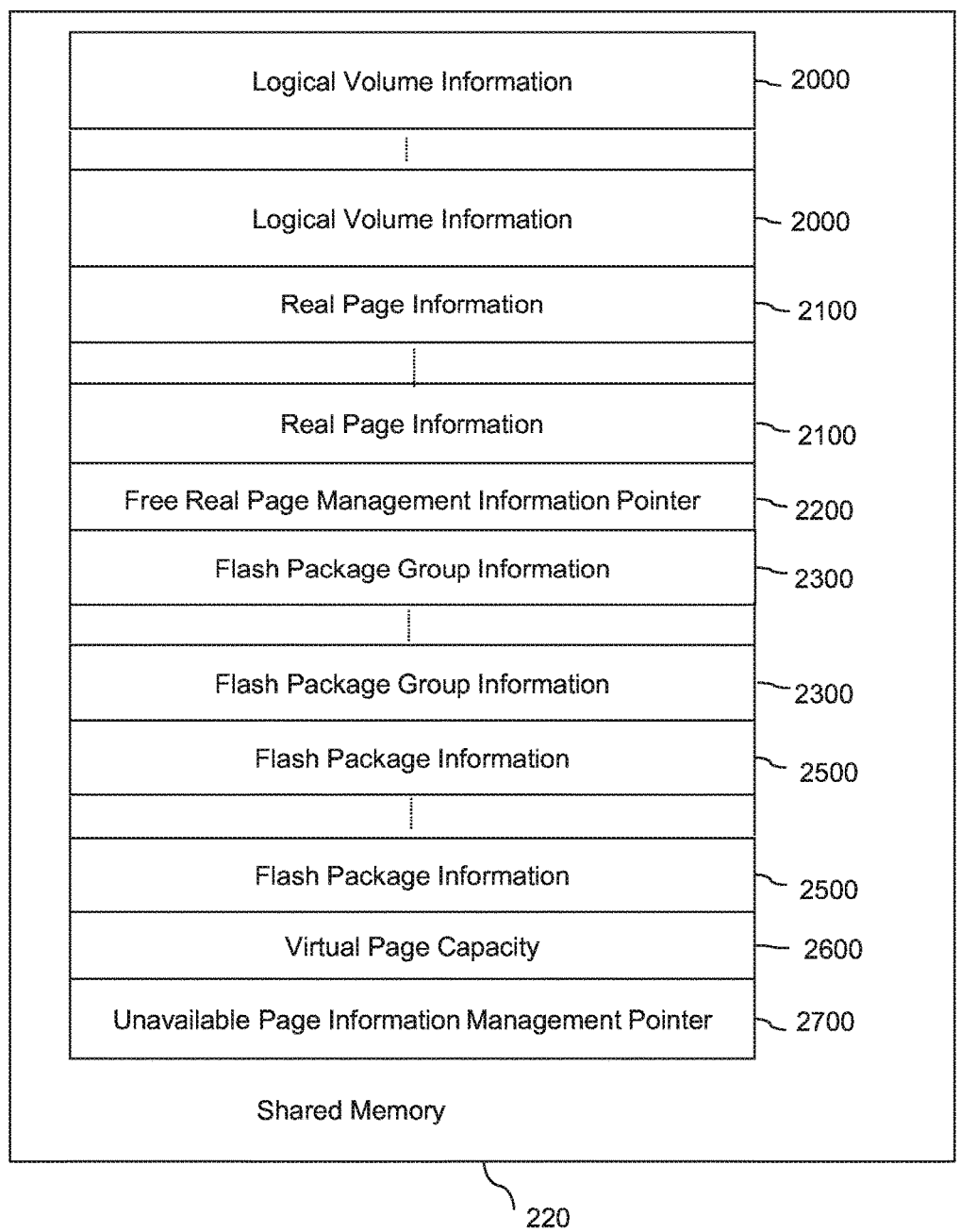
FIG. 4 is a view showing control information stored in a shared memory of a storage system according to the present embodiment.

FIG. 4 shows information stored in the shared memory 220 of the storage system 100 according to the preferred embodiment of the present invention, which are used in the various processes described in the present embodiment, including logical volume information 2000, real page information 2100, a free real page management information pointer 2200, flash package group information 2300, flash package information 2500, virtual page capacity 2600, and an unavailable page information management pointer 2700. These information are necessary information for realizing the higher-level capacity virtualization technology.

In the present embodiment, it is assumed that the storage controller 200 supports a higher-level capacity virtualization function. However, the present invention is also effective even if the storage controller 200 does not have a higher-level capacity virtualization function. Normally, the unit of allocating the storage area in the higher-level capacity virtualization function is called page. The storage controller 200 according to the present embodiment partitions the storage space of the logical volume provided to higher-level devices such as the host 110 into areas having a given size called virtual pages, and manages the same. The storage area of the flash package group 280 is partitioned into units called real pages, and managed thereby.

Figure 7:
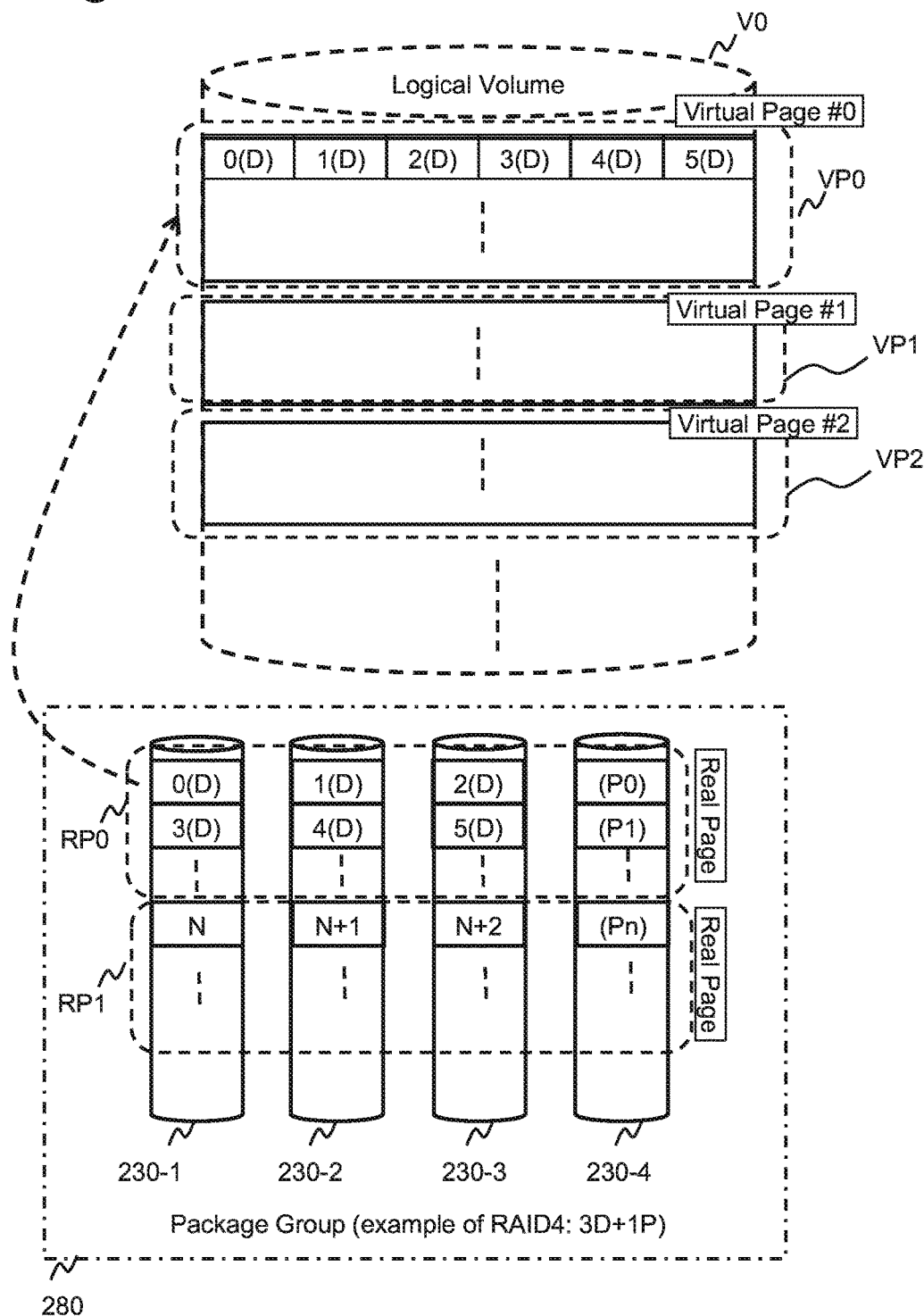
FIG. 7 is a view showing a relationship among logical volume, virtual page, real page and package group 280 according to the present embodiment.

With reference to FIG. 7, the relationship between the logical volume, the virtual page, the real page and a package group 280 will be described. The storage controller 200 can define one or more logical volumes and provide them to the higher-level device such as the host 110. As described earlier, the storage controller 200 divides the storage space of each logical volume into areas of given units, which are a plurality of virtual pages (FIG. 7: VP0, VP1, VP2), and manages the storage space of each logical volume as a storage area composed of a plurality of virtual pages. The virtual page size is stored in the virtual page capacity 2600 in the shared memory 220. Further, in the storage system 100 according to the preferred embodiment of the present invention, the capacities of all virtual pages are set the same, but the present invention is also effective in a configuration where virtual pages of different sizes exist within the storage system 100.

The storage controller 200 manages the storage space of each logical volume in units called virtual pages, but the higher-level device such as the host 110 accessing the logical volume does not need to be conscious of the existence of virtual pages. The host 110 accesses a storage area of the logical volume by designating an address such as an LBA (Logical Block Address), and the storage controller 200 converts the LBA designated by the host 110 to a virtual page number (identification number assigned to each virtual page) (which can be converted by dividing the LBA by the virtual page size). A virtual page is a concept that is only used for managing the storage space of the logical volume within the storage controller 200. If it is assumed that the virtual page size is P (MB), the area corresponding to P (MBs) from a head position of the logical volume is managed as virtual page #0 (#0 represents the virtual page number), and the area corresponding to the next P (MBs) is managed as virtual page #1. Subsequently, areas of P (MBs) are similarly respectively managed as virtual pages #2, #3, and so on.

A physical storage area corresponding to each virtual page does not exist immediately after the storage controller 200 defines the logical volume. Only when a write request to the virtual page is received from the host 110, the physical storage area is allocated for the first time to the relevant virtual page. The physical storage area allocated at this time is called real page. FIG. 7 illustrates a state where real page RP0 is allocated to virtual page #0 (VP0).

A real page is an area formed by partitioning the storage areas that each flash package 230 constituting the package group 280 (that is, the RAID group) provides to the storage controller 200 in a manner as illustrated in FIG. 7. In FIGS. 7, 230-1, 230-2, 230-3 and 230-4 respectively conceptually illustrate storage areas provided from the respective flash packages 230 to the storage controller 200. Further, the RAID type of the package group 280 illustrated in FIG. 7 is a RAID 4 having a 3D+1P configuration (RAID group composed of three data drives and one parity drive).

In addition to the write data from the host 110, RAID parity is stored into the storage areas of the respective flash packages 230 constituting the package group 280. In the drawing, the areas denoted as 0(D), 1(D), 2(D) and so on within the real page (RP0) represent areas storing write data from the host 110, and areas denoted as P0, P1 and so on represent areas storing parity (parity generated from 0(D), 1(D) and 2(D) is stored in P0, and parity generated from 3(D), 4(D) and 5(D) is stored in P1). A real page is composed of multiple stripes (assembly of one parity and data required to generate the relevant one parity according to the RAID technology: in the example of FIG. 7, a set of 0(D), 1(D), 2(D) and (P0) constitutes a single stripe).

When a real page is allocated to a virtual page, only the areas storing write data from the host 110, such as 0(D), 1(D) and the like, are allocated. Further, the total size of the area storing the write data in the real page is equal to the virtual page size. In other words, the following relationship is realized: (real page size−parity storage area size)=virtual page size. Only the configuration example of RAID4 is illustrated in FIG. 7, but for example, if the RAID type of the package group 280 is RAID1, the real page size will be double the virtual page size (virtual page capacity 2600).

The relationship (mapping) between the respective areas within the virtual page and the respective areas within the real page is as shown in FIG. 7. That is, the area having excluded the parity from the head stripe in the real page (0(D), 1(D) and 2(D)) is mapped to the head area of the virtual page. Subsequently, in a similar manner, the areas having excluded the parity from the second and subsequent stripes in the real page (3(D), 4(D), 5(D) and so on) are sequentially mapped to the areas of the virtual page. As described, since the mapping between the respective areas within the virtual page and the respective areas within the real page is performed systematically, by obtaining the virtual page number and the relative address within the virtual page (offset address from head of page) based on the access location (LBA) within the logical volume, it is possible to uniquely determine which flash package 230 the relevant access position is mapped to the access location, and which location within the relevant flash package 230 is mapped to the access location. However, the mapping of the respective areas within the virtual page and the respective areas within the real page is not restricted to the mapping method described here.

In the capacity virtualization technology, it is also possible to define the total storage capacity of the respective logical volumes to be greater than the capacity of the real storage media when defining the respective logical volumes. Therefore, generally the number of virtual pages is greater than the number of real pages. Also according to the storage system of the present embodiment, the number of virtual pages can be set greater than the number of real pages.

The real pages allocated to the respective virtual pages within the logical volume are not necessarily restricted to the real pages within the same package group 280. It is possible that the real page allocated to virtual page #0 and the real page allocated to virtual page #1 belong to different package groups. However, there is a limitation that the real pages allocated to the respective virtual pages in a single logical volume must all be allocated from a package group having the same RAID type.

FIG. 5 shows a format of logical volume information 2000. The logical volume is a storage device in which data is read or written by the host 120 is stored. The logical volume information 2000 exists for each logical volume. That is, N number of logical volume information 2000 will exist in the shared memory 220 when N number of logical volumes is defined in the storage system 100. The logical volume information 2000 is composed of a logical volume ID 2001, a logical capacity 2002, a logical volume RAID type 2003, and a real page pointer 2004.

Generally, the host 120 issues an access command including information representing an ID for uniquely identifying a logical volume, such as a LUN, a head address (LBA) of the access target area within the logical volume, and an access target data length. The logical volume ID 2001 denotes the ID for uniquely identifying a logical volume, such as a LUN. The logical capacity 2002 denotes the capacity of the logical volume (accessible storage space size recognized by the host 120). The logical volume RAID type 2003 denotes the information specifying the RAID type (for example, RAID 0, RAID 1 and so on) of the corresponding logical volume. If redundancy data having an amount corresponding to one storage device is stored with respect to the data amount of N storage devices, as in RAID 5, a value N is also stored in the logical volume RAID type 2003. However, it is not possible to specify an arbitrary RAID type, and the RAID type must be supported by at least one flash package group 280 within the storage system 100.

The real page pointer 2004 (2004-0 through 2004-($n$−1)) is the pointer to management information (real page information 2100 described later) of the real page allocated to a virtual page of the corresponding logical volume. The number of real page pointers 2004 stored in a single logical volume information 2000 is the number of virtual pages in the logical volume (a number obtained by dividing a value denoting the logical capacity 2002 by a value denoting the virtual page capacity 2600, and if there is a remainder, 1 is added to the quotient). If the number of virtual pages in the logical volume is n, it means that n number of real page pointers 2004 exist (real page pointers 2004-0 through 2004-($n$−1) exist). The page corresponding to the first real page pointer 2004 (2004-0 in the drawing) is the real page that has been allocated to the virtual page corresponding to the initial area of the logical volume (virtual page #0), and thereafter, a pointer corresponding to the real page to be allocated to the virtual page corresponding to the next area is stored in the next real page pointer 2004. Furthermore, since the storage system 100 supports a capacity virtualization function, the timing of allocation of the real page is not when the logical volume is defined, but when a data write request regarding the corresponding virtual page is actually received. Therefore, in the case of a virtual page for which a write has not yet to be done, the corresponding real page pointer 2004 is NULL.

FIG. 6 is a format of the real page information 2100. The real page information 2100 is management information of a real page, which exists for each real page. The real page information 2100 is composed of a package group 2101, a real page address 2102, a free page pointer 2103, amount of stored page data 2104, amount of stored data after page deduplication 2105, a transfer state flag 2109, a transfer destination real page information 2110, and a transfer standby flag 2111.

The package group 2101 includes information (identifier) of the flash package group 280 to which the corresponding real page is allocated. The real page address 2102 is information showing the relative position (address) inside the flash package group 280 specified by the package group 2101 to which the corresponding real page is allocated. It means that the area for the real page size that begins from the real page address 2102 is allocated to the relevant real page. in the free page pointer 2103, a valid value is stored in a case where the relevant real page is not allocated to a virtual page (hereafter, such real page is referred to as "free page"). In this case, the value stored in the free page pointer 2103 points to the real page information 2100 of the next free page. In a case where the virtual page is allocated, the value stored in the free page pointer 2103 becomes a NULL value.

In this embodiment, each flash package 230 is equipped with a capacity virtualization function, and provides the storage controller 200 with capacity that appears to be larger than the actual physical capacity. The unit for capacity virtualization in the flash package 230 in this embodiment is the block, which is the delete unit of the flash memory. Below, the block seen from the storage controller 200 may be called a virtual block and the block actually allocated by the flash package 230 may be called a real block. Therefore, in the storage system 100 according to the present embodiment, the real page is composed of one or more virtual blocks. Furthermore, in the present invention, since deduplication is executed, the storage space composed of the virtual blocks of the flash package 230 is larger than the storage space composed of the real blocks (satisfies the following relationship; number of virtual blocks>number of real blocks).

Figure 8:
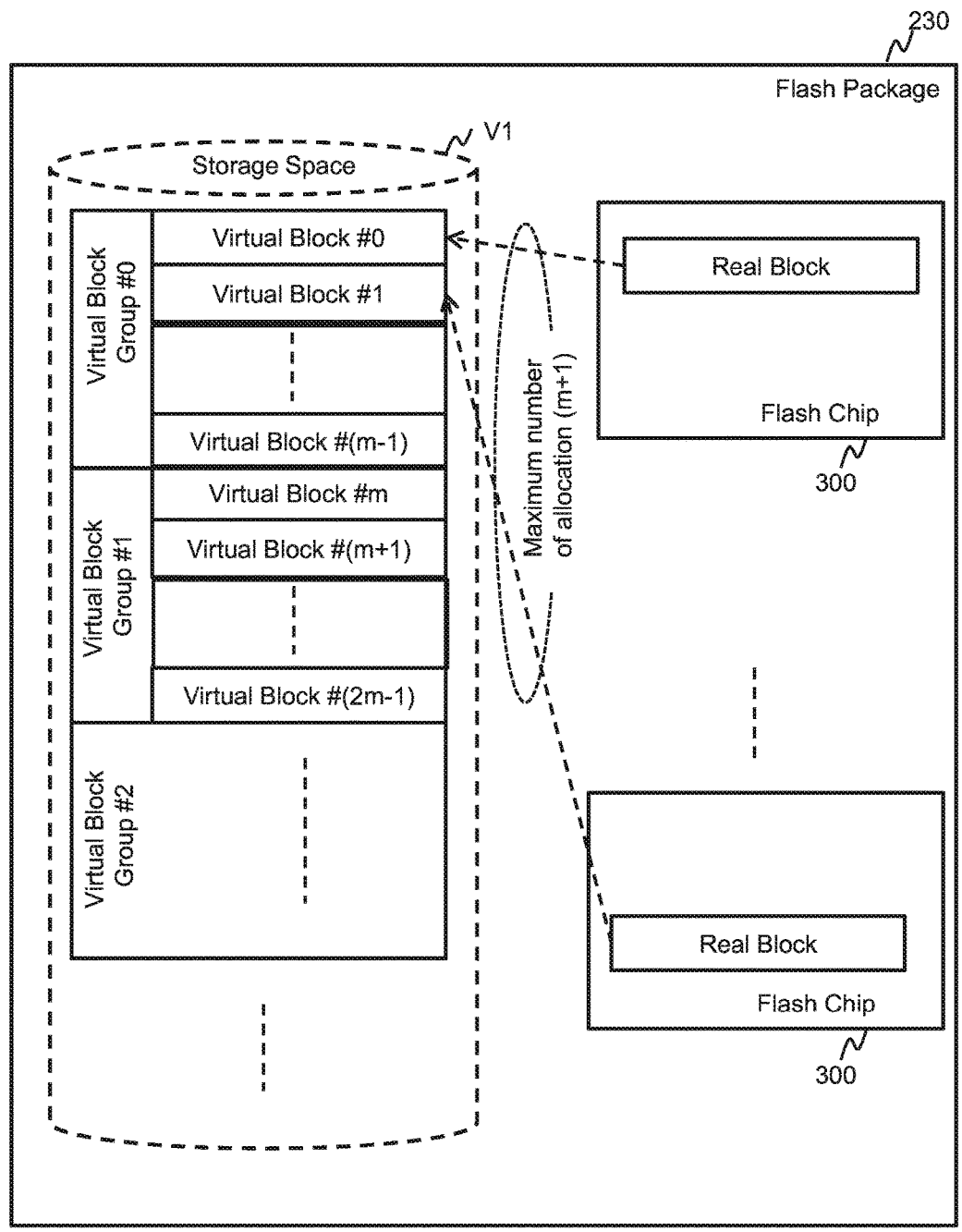
FIG. 8 is a view showing a relationship among storage space that the flash package provides to the storage controller, the virtual block, and the real block according to the present embodiment.

FIG. 8 is a view showing the relationship among the storage space V1 that the flash package 230 provides to the storage controller 200, the virtual block and the real block. The flash package 230 partitions the storage space V1 provided to the storage controller 200 into areas of m-number of virtual block sizes. A set of m number of virtual blocks is called a "virtual block group". The size of the virtual block is the same as the size of a block which is the delete unit of the flash memory. If the block size is B (KB), the m×B (KB) area from the head of the storage space V1 is managed as virtual block group #0, and thereafter, the respective m×B (KB) areas are managed as virtual block groups #1, #2, and so on in order.

Further, at least one and no more than (m+1) of real blocks can be allocated to each virtual block group. A set of one or more real blocks allocated to one virtual block group is called a real block group.

We will now describe the reason why the maximum number of allocation of real blocks is set to m+1 in the present embodiment. Hypothetically, it is supposed that most of the data stored in the virtual block group could not be deduplicated. In this case, the required number of real blocks will be m, but there will be practically no free capacity in the real blocks. We assume that the flash package 230 has received a request (a normal write request) to rewrite a portion of the data inside the block from the storage controller 200 at this time. Since the flash memory block cannot be rewritten, the flash package 230 must read all the data in this block to the buffer 330, update the rewrite part only, delete the corresponding block once, and thereafter store the data in the entire block. Executing the above operation each time the flash package 230 receives a write request results in excessively long processing times and cannot be called practical. To solve this problem, in the present embodiment, one extra real block is allocated to the virtual block group to ensure a free area, and the additional write is carried out to the free area. When the free area becomes too small to accommodate the rewrite data, a delete process is carried out. The performance can be improved by this arrangement since the delete process should only be executed once per every n write requests. Furthermore, reducing the number of delete processes also increases the life of the flash memory.

In the present embodiment, the flash package 230 makes it appear to the storage controller 200 that there are move virtual blocks than real blocks. However, in the present embodiment, the storage controller 200 is aware of how many free real blocks each flash package 230 actually has, and reallocates a real page according to the number of free real blocks. According to the characteristics of the present embodiment, in a case where the flash package 230 has received a write request specifying a virtual block group to which a real block is not allocated, a real block is allocated to the virtual block.

We will now return to the description of FIG. 6. Each of the amount of stored page data 2104 and the amount of stored data after page deduplication 2105 exist equal to the number of flash packages 230 constituting the flash package group 280 to which the corresponding page is allocated. However, this information is not attribute information of the virtual block included in the real page, but rather, is attribute information related to the data of the virtual page corresponding to this real page. Therefore, in a case where the data of the real page (supposing that this real page is called real page A) allocated to this virtual page is copied to an new real page, and when the new real page (supposing that this real page is called real page B) is allocated to this virtual page, it is necessary to reflect (inherit) the amount of stored page data 2104 and the amount of stored data after page deduplication 2105 within the real page management information 2100 of the real page A to the real page information 2100 of the real page B. The amount of stored page data 2104 is the amount of data written to the relevant real page from a higher-level device such as the host 110. The amount of stored data after page deduplication 2105 is the amount of data after executing deduplication stored in the relevant real page. When the deduplication process is carried out, only one data having the same contents is stored in the storage media. Therefore, the amount of stored data after page deduplication 2105 can be described as the amount of data actually stored in the flash chip 300 of the flash package 230 out of the data having been written to the corresponding real page. The above two values are computed based on information received from the flash package 230 by the storage controller 200.

The transfer state flag 2109, the transfer destination real page information 2110 and the transfer standby flag 2111 are information used when the data of the relevant real page is moved to another real page. The transfer state flag 2109 is set to ON when the data of the relevant real page is being transferred to a different real page. The transfer destination real page information 2110 is information denoting the address of the destination real page to which the data of this real page is being moved. The transfer standby flag 2111 is a flag that is set to ON when the data in the relevant real block is decided to be moved.

FIG. 9 is a format of the flash package information 2500. The flash package information 2500 is composed of a flash package ID 2501, a flash package virtual capacity 2502, and a virtual block capacity 2503. The flash package information 2500 exists for each flash package 230.

The flash package ID 2501 is the identifier of the relevant flash package 230. The flash package virtual capacity 2502 denotes the virtual capacity of the relevant flash package 230 (the size of the storage space provided to the storage controller 200). The virtual block capacity 2503 is the size of the virtual block. Therefore, a value obtained by dividing the flash package virtual capacity 2502 by the virtual block capacity 2503 constitutes the number of virtual blocks of this flash package 230. The present invention characterizes in that this flash package virtual capacity 2502 is adjusted in accordance with the deduplication rate and the like of the flash package 230. As already explained, in the present embodiment, the flash package 230 determines the capacity, but the capacity may be determined by the storage controller 200. When a notification that the virtual capacity has changed and the virtual capacity after the change is received from the flash package 230, the storage controller 200 sets this received value (virtual capacity after the change) in the flash package virtual capacity 2502.

FIG. 10 shows the format of the flash package group information 2300. The flash package group information 2300 exists for each flash package group 280. The flash package group information 2300 is composed of a flash package group ID 2301, a package group RAID type 2302, a number of real pages 2303, a number of free real pages 2304, flash package pointers 2305, and a number of unavailable real pages 2306.

The flash package group ID 2301 is the identifier of the relevant flash package group 280 (the same value as the package group 2101 is stored). The package group RAID type 2302 is the RAID type of the relevant flash package group 280. The RAID types in the present embodiment are the same as those described when explaining the logical volume RAID type 2003. The number of real pages 2303 denotes the total number of real pages, the number of free real pages 2304 denotes the total number of free real pages, and the number of unavailable real pages 2306 denotes the total number of unavailable real pages, of the relevant flash package group 280.

As already explained, one characteristic feature of the present invention is that the virtual capacity of the flash package 230 changes in accordance with the deduplication rate. When the virtual capacity of the flash package 230 belonging to a certain flash package group 280 changes, the number of real pages 2304 and the number of free real pages 2304 of the flash package group 280 also change. This will be explained below.

First, when the virtual capacity of the relevant flash package 230 changes, the number of real pages of the flash package group 280 to which the relevant flash package 230 belongs also changes. This will be described concretely. First, based on the principle of RAID, the premise is that the available capacity is identical in the flash packages 230 inside the same flash package group 280. Consequently, the (smallest flash package virtual capacity 2502 of flash packages 230 in flash package group 280)*(number of flash packages 230 in flash package group 280)/(real page size) will be the number of real pages 2303. Therefore, in a case where the smallest flash package virtual capacity 2502 of the flash packages 230 in the relevant flash package group 280 has changed, the number of real pages 2303 also changes. Similarly, the number of free real pages 2304 also changes.

The details will be described later, but the number of unavailable real pages 2306 will also change, since the number of real pages that are unavailable is also changed. For example, in a case where the number of real pages 2303 is increased by 10, the number of free real pages 2304 also increases by 10 and the number of unavailable real pages 2306 decreases by 10. Furthermore, as already explained, in this example, the flash package 230 determines this capacity, but the storage controller 200 may also make this decision. The flash package pointer 2305 is the pointer to the flash package information 2500 of the flash package(s) 230 belonging to the relevant flash package group 280. The number of package pointers 2305 is equal to the number of flash packages 230 that belong to the relevant flash package group 280, but this value is determined in accordance with the package group RAID type 2302.

Figure 11:
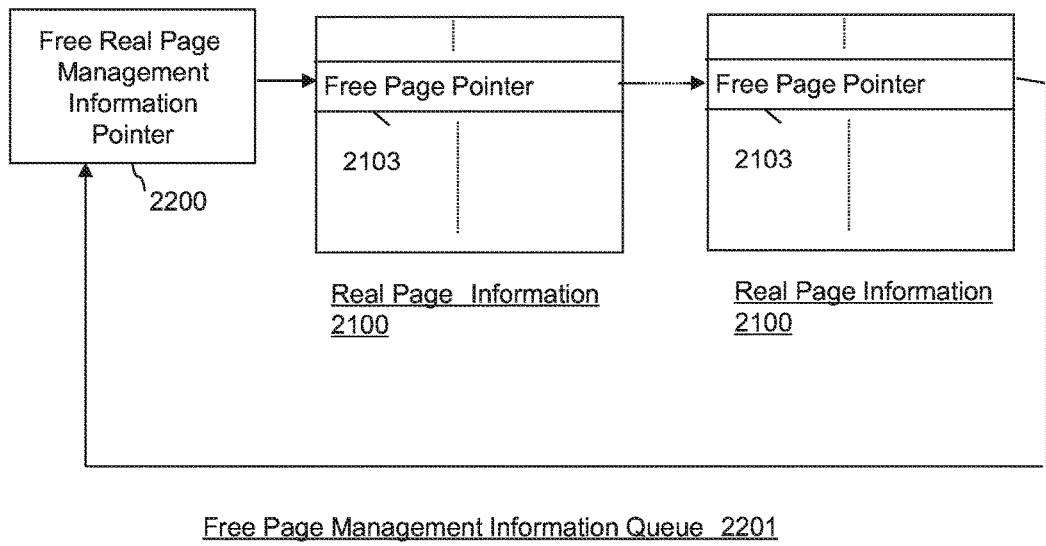
FIG. 11 is a view showing a structure of a free page management information queue according to the present embodiment.

The free real page management information pointer 2200 is information provided for each flash package group 280. FIG. 11 denotes a set of free real pages managed by the free real page management information pointer 2200. This structure is called a free real page management information queue 2201. Free real page signifies a real page that has not been allocated to a virtual page. Furthermore, the real page information 2100 corresponding to the free real page is called free real page information 2100. The free real page management information pointer 2200 is the pointer to the address at the head of the free real page information 2100. Next, the free page pointer 2103 inside the first real page information 2100 points to the next free real page information 2100.

In FIG. 11, the free real page pointer 2103 of the last free real page information 2100 points to the free real page management information pointer 2200, but it is possible to have NULL value stored in the free real page pointer 2103 of the last free real page information 2100. The storage controller 200, upon receiving a write request with respect to (an address of a logical volume within the range of) a virtual page to which a real page has not been allocated, selects one of the flash package groups 280 (for example, the flash package group 280 having the greatest number of free real pages) whose package group RAID type 2302 is the same as the logical volume RAID type 2003 among the multiple flash package groups 280 within the storage system 100, and refers to the free real page management information pointer 2200 of the selected flash package group 280 to search for a free real page and allocates the same to the virtual page.

Figure 12:
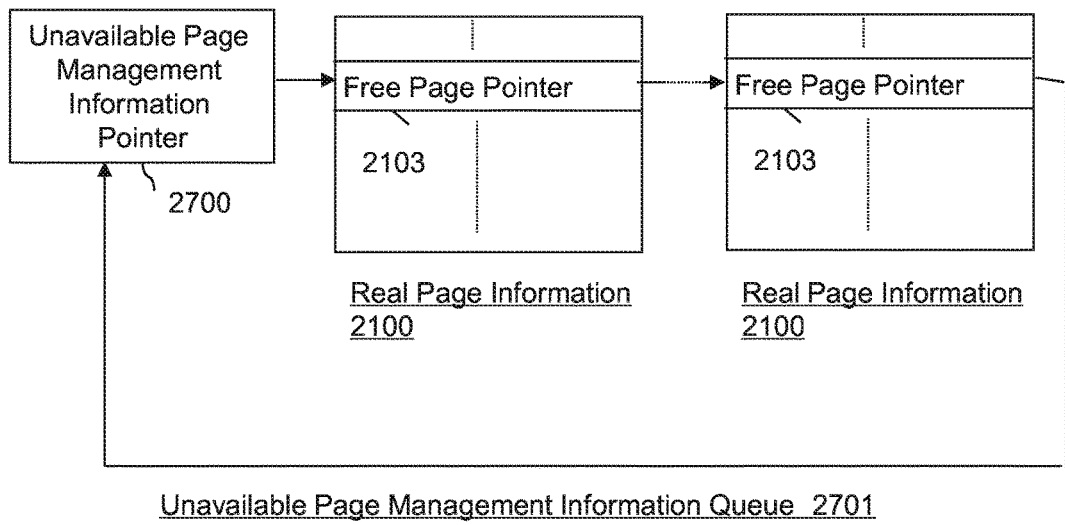
FIG. 12 is a view showing a structure of an unavailable management information queue according to the present embodiment.

The unavailable page information management pointer 2700 is information provided for each flash package group 280. FIG. 12 denotes a set of unavailable real pages managed by the unavailable page information management pointer 2700. This structure is called an unavailable page management information queue 2701. The structure thereof is the same as the free page management information queue 2201. In a case where the virtual capacity of the flash package 230 has lessened and the number of the number of real pages 2303 has decreased (it is assumed that the number of real pages 2303 has been reduced by n), n number of real page information 2100 out of the real page information 2100 managed by the free page management information queue 2201 is transferred to the unavailable page management information queue 2701. By contrast, in a case where the virtual capacity of the flash package 230 has grown and the number of the number of real pages 2303 has increased (by n), n number of real page information 2100 out of the real page information 2100 managed by the unavailable page management information queue 2701 is transferred to the free page management information queue 2201. In the present invention, the storage controller 200 is equipped with a higher-level capacity virtualization function, and the flash package 230 is equipped with a lower-level capacity virtualization function. For this reason, even when the virtual capacity of the flash package 230 changes, the already-explained method should simply be used to transfer the real page information 2100. In a case where the real page information 2100 has been associated with the unavailable page management information queue 2701, the real page corresponding to the relevant real page information 2100 is unable to be allocated to a virtual page, but an access will not occur to the virtual block corresponding to this real page, so that the real block can be allocated to another area and used effectively.

Figure 13:
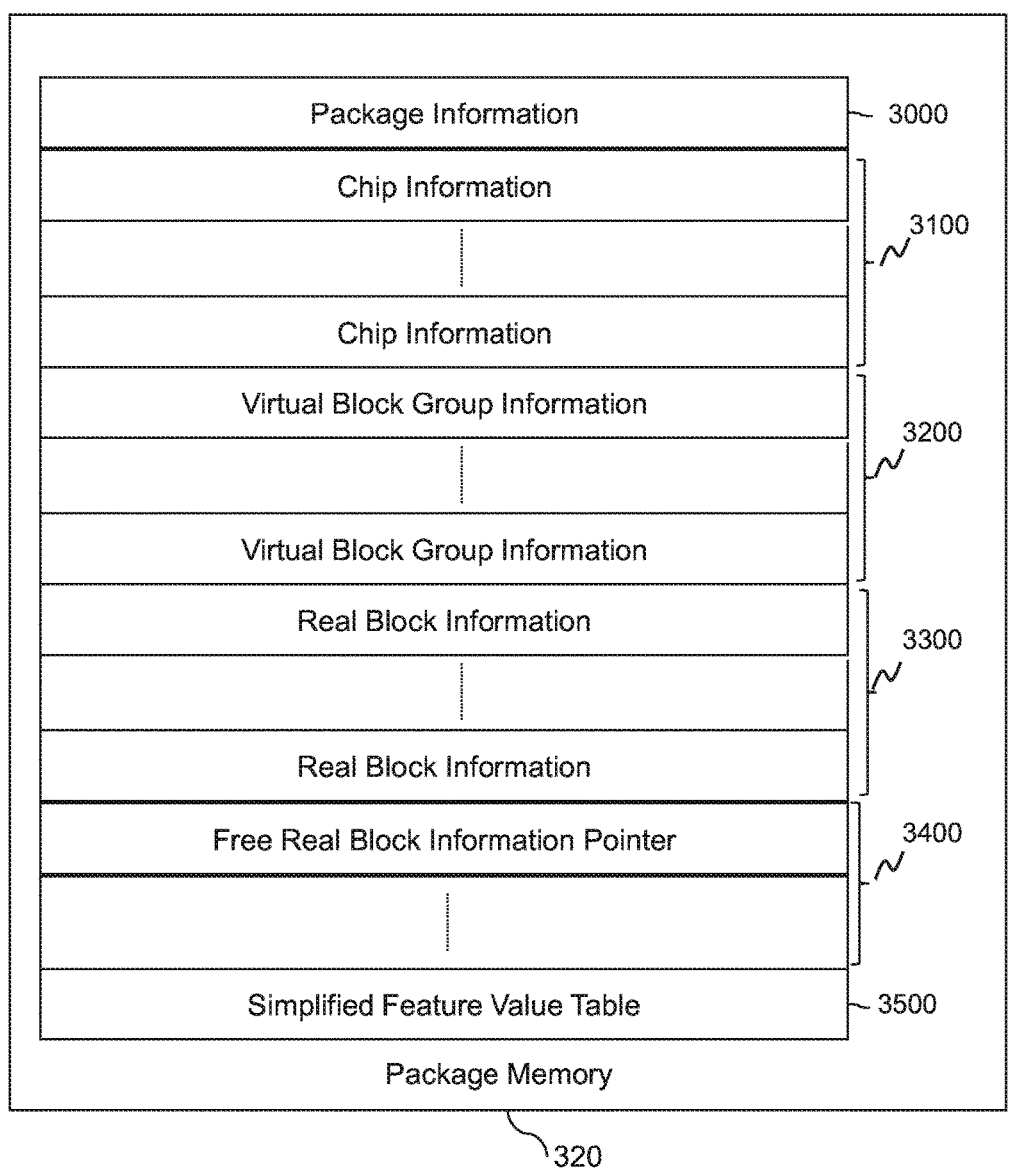
FIG. 13 is a view showing control information stored in a package memory of a flash package according to the present embodiment.

Next, the management information of the flash package 230 will be explained. The flash package 230 holds the management information inside the package memory 320. FIG. 13 shows the information stored in the package memory 320. Package information 3000, chip information 3100, virtual block group information 3200, real block information 3300, free real block information pointers 3400, and a simplified feature value table 3500 are stored in the package memory 320. These information are required to realize the lower-level capacity virtualization technology and the deduplication technology. In the present embodiment, the flash package 230 realizes the lower-level capacity virtualization technology and the deduplication technology. However, in the present invention, the storage controller 200 may realize the lower-level capacity virtualization technology and the deduplication technology.

FIG. 14 is a format of the package information 3000. The package information 3000 is composed of a package ID 3001, a virtual package capacity 3002, a real package capacity 3003, a flash block capacity 3004, a flash segment capacity 3008, a number of free blocks in package 3005, an amount of stored package data 3006, an amount of stored package data after deduplication 3007, a number of blocks for storing internal information 3009, and an address for storing internal information 3010.

The package ID 3001 is the identifier of the relevant flash package 230. The virtual package capacity 3002 denotes the virtual capacity of the relevant flash package 230 as seen from the storage controller 200 (provided to the storage controller 200). One characteristic feature of the present invention is the fact that the flash package 230 adjusts this virtual package capacity in accordance with a change in the deduplication rate. As explained already, this adjustment may be carried out by the storage controller 200. The real package capacity 3003 denotes a sum of the capacity within the relevant flash package 230 capable of physically storing the data received from the storage controller 200 (amount of storable data after executing deduplication) and the extra capacity for performing reclamation.

The flash block capacity 3004 denotes the size of the block, which is the delete unit of the flash memory. The flash segment capacity 3008 denotes the size of the segment, which is the read/write unit of the flash memory. The number of free blocks in package 3005 denotes the number of free blocks in the relevant flash package 230.

The amount of stored package data 3006 denotes the total value of write data received via the write request from the storage controller 200 prior to deduplication, and the amount of stored package data after deduplication 3007 denotes the total value of data after deduplication. The number of blocks for storing internal information 3009 is the number of blocks allocated to save the package information 3000, the chip information 3100, the virtual block group information 3200, the real block information 3300 and the free real block information pointer 3400 stored in the package memory 320 when power is turned off or when failure occurs (which is called the "blocks for storing internal information"). The address for storing internal information 3010 denotes the address of the blocks in which the internal information is stored. The package information 3000, the chip information 3100, the virtual block information 3200, the real block information 3300, and the free real block information pointer 3400 are important information, so that they can be stored n times in the one or more blocks for storing internal information. Also, since save operations are not so numerous, the number of deletions of the blocks for storing internal information will not become a problem. The total of the real package capacity 3003/the flash block capacity 3004 and the number of blocks for storing internal information 3009 is the total number of real blocks included in the relevant flash package.

FIG. 15 is the format of the chip information 3100. The chip information 3100 exists for each flash chip 300, and stores information related to each flash chip 300 within the flash package 230. The chip information 3100 is composed of a chip ID 3101, a number of real blocks in chip 3102, a number of free real blocks in chip 3103, and a connection bus ID 3104.

The chip ID 3101 is the identifier of the relevant flash chip 300. The number of real blocks in chip 3102 denotes the number of real blocks possessed by the relevant flash chip 300. The number of free real blocks in chip 3103 shows the number of free real blocks inside the relevant flash chip 300 (a free real block is a real block that has not been allocated to a virtual block). The connection bus ID 3104 is the identifier of the package bus 340 to which the relevant flash chip 300 is coupled.

Figure 16:
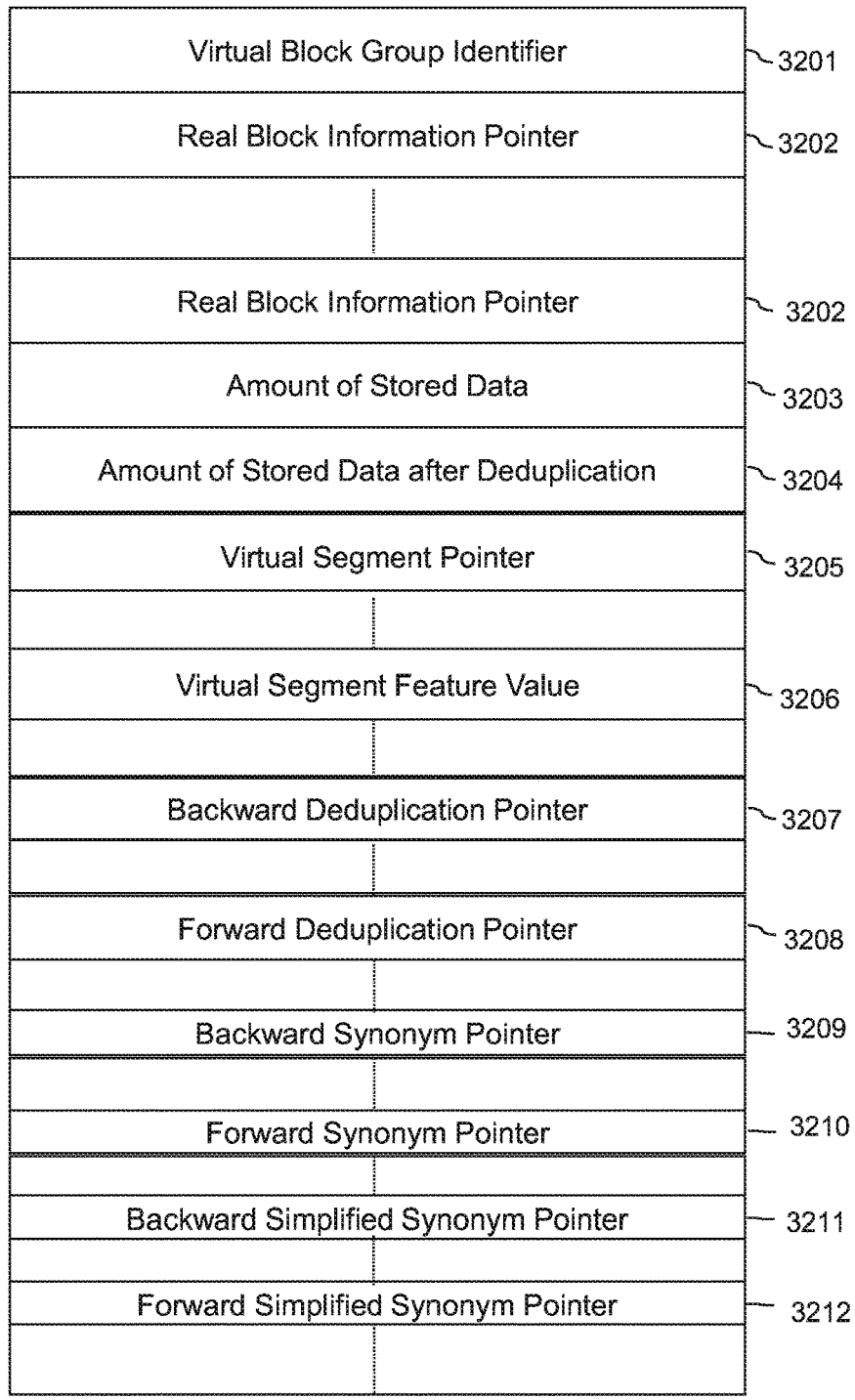
FIG. 16 is a view showing a format of virtual block group information according to the present embodiment.

FIG. 16 is a format of the virtual block group information 3200. The virtual block group information 3200 is information that exists for each virtual block group within the flash package 230. As shown in FIG. 13, multiple virtual block group information 3200 are stored adjacent to one another in the package memory 320, and the respective virtual block group information 3200 is arranged in the order of the virtual block address. We will describe this information, with further reference to FIG. 8. The first virtual block group information 3200 stored in the package memory 320 is management information of the virtual block group #0 of FIG. 8, and subsequently, the second and third virtual block group information 3200 are the management information of virtual block groups #1 and #2, respectively.

The virtual block group information 3200 is composed of a virtual block group identifier 3201, real block information pointer 3202, an amount of stored data 3203, an amount of stored data after deduplication 3204, virtual segment pointer 3205, virtual segment feature value 3206, backward deduplication pointer 3207, forward deduplication pointer 3208, backward synonym pointer 3209, forward synonym pointer 3210, backward simplified synonym pointer 3211, and forward simplified synonym pointer 3212.

In the present embodiment, the read/write unit of the flash memory is called segment. The read/write unit of the flash memory is normally called page, but in the present embodiment, the unit for performing capacity virtualization by the storage controller 210 is called page, and as such, the read/write unit of the flash memory is called segment in the present embodiment. In the present embodiment, data written to the flash memory is stored after deduplication, and the segment is treated as the unit of deduplication. However, the present invention is also effective in a case where the unit of deduplication is not a segment. The segment of the flash memory storing the deduplicated data is called real segment. The virtual segment prior to deduplication is called virtual segment. In the present embodiment, for each updated virtual segment, a check is performed on whether there is a virtual segment having the same value as the relevant virtual segment, and if such segment exists, the content of the updated virtual segment will not be stored newly. By this configuration, the effect of capacity reduction can be exerted.

The virtual block group identifier 3201 is the identifier (identification number) of the corresponding virtual block group. In the flash package 230 of the present embodiment, as shown in FIG. 8, an identification number starting from zero is assigned to each virtual block group (in FIG. 8, "#1" of "virtual block group #1" and the like is the identification number).

The real block information pointer 3202 is the pointer to the real block information 3300 (described later) of the real block allocated to the corresponding virtual block group. There are at most (m+1) real block information pointers 3202, when the number of virtual blocks constituting the virtual block group is m. The real block information pointer 3202 is NULL value when the real block has not been allocated. When allocating real blocks, the pointer to the real block information 3300 will be stored into the first real block information pointer 3202 storing the NULL value among the multiple real block information pointers 3202. In a case where there are k (where k is equal to or less than (m+1)) real blocks allocated to the relevant virtual block group, k real block information pointers 3202 from the head are valid (not NULL values).

The amount of stored data 3203 denotes the amount of data before deduplication stored in the relevant virtual block group. Its maximum is the capacity of the virtual block group. On the other hand, the amount of stored data after deduplication 3204 is the stored amount of data after deduplication. In the case of a flash memory, when the content of a virtual segment is rewritten, the rewritten content is stored into a different segment from the segment storing the data before rewrite. Therefore, the data corresponding to the same virtual segment reside in a plurality of locations. The amount of stored data 3203 and the amount of stored data after deduplication 3204 of the virtual block group is calculated based on the most recent amount of data stored in the virtual segment.

The virtual segment pointer 3205 and the virtual segment feature value 3206 are information representing the virtual segment, and a plurality of such information exist in the virtual block group information 3200 (the number of which is the same as the number of virtual segments within the virtual block group). The virtual segment pointer 3205 at the head of the plurality of virtual segment pointers 3205 stores the pointer to the real segment allocated to the virtual segment positioned at the head of the storage space of the virtual block group corresponding to the virtual block information 3200, and similarly, the second and subsequent virtual segment pointers 3205 respectively store the pointers to real segments allocated to virtual segments positioned at the second and subsequent positions in the storage space of the virtual block group corresponding to the virtual block information 3200.

Specifically, the pointer to a real segment is a real block identifier 3301 (described later) and an address within the real block (address assigned to the real segment) of the real block information 3300 corresponding to the real block to which the relevant real segment belongs. The format representing the address assigned to the real segment is not restricted to a specific format, and any arbitrary representing format can be used as long as the target real segment can be uniquely specified within the real block.

Similarly, the head of the virtual segment feature value 3206 among the plurality of virtual segment feature values 3206 represents the feature value of the head virtual segment, and the second and subsequent virtual segment feature values 3206 respectively represent the feature values of the second and subsequent feature values. In the present embodiment, the flash package 230 stores the two-byte feature value included in the assurance code added to the data received from the storage controller 200 via a SCSI command to the virtual segment feature value 3206. However, the length of the segment (excluding the side of the assurance code) is 4 Kbytes or 8 Kbytes, whereas the assurance code is information added to each 512-byte data, so that in total, a 16-byte or 32-byte feature value is set in the virtual segment feature value 3206. However, it is also possible to have a portion of the 16-byte or 32-byte value set thereto.

The backward deduplication pointer 3207 and the forward deduplication pointer 3208 are information for coupling a set of virtual segments having the same data value as the relevant virtual segment via bidirectional pointers. The backward synonym pointer 3209 and the forward synonym pointer 3210 are information for coupling a set of virtual segments having the same feature value as the relevant virtual segment but having a different data value via bidirectional pointers. The backward simplified synonym pointer 3211 and the forward simplified synonym pointer 3212 are information for converting the feature value to a simplified feature value for easily finding a virtual segment having the same feature values. Specifically, they are the information for coupling a set of virtual segments having the identical simplified feature value via bidirectional pointers.

Therefore, similar to the virtual segment pointer 3205 and the virtual segment feature value 3206, the numbers of the backward deduplication pointer 3207, the forward deduplication pointer 3208, the backward synonym pointer 3209, the forward synonym pointer 3210, the backward simplified synonym pointer 3211, and the forward simplified synonym pointer 3212 are equal to the number of virtual segments within the virtual block group. The n-th backward deduplication pointer 3207, forward deduplication pointer 3208, backward synonym pointer 3209, forward synonym pointer 3210, backward simplified synonym pointer 3211 and forward simplified synonym pointer 3212 within the virtual block group information 3200, respectively, are a pointer for the n-th virtual segment in the storage space of the virtual block group corresponding to the virtual block information 3200. In the following description, the pointers (the backward deduplication pointer 3207, the forward deduplication pointer 3208, the backward synonym pointer 3209, the forward synonym pointer 3210, the backward simplified synonym pointer 3211, or the forward simplified synonym pointer 3212) for a certain virtual segment are respectively referred to as a "pointer corresponding to the virtual segment".

In the present embodiment, the virtual segment pointer 3205, the virtual segment feature value 3206, the backward deduplication pointer 3207, the forward deduplication pointer 3208, the backward synonym pointer 3209, the forward synonym pointer 3210, the backward simplified synonym pointer 3211, and the forward simplified synonym pointer 3212 are provided for each virtual segment, but it is also possible to adopt a configuration where one information is provided for two or more virtual segments.

Figure 17:
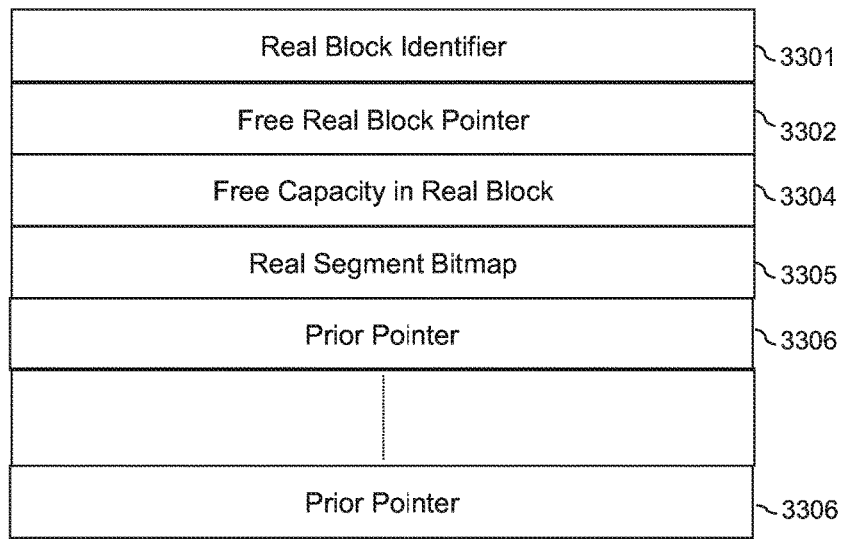
FIG. 17 is a view showing a format of real block information according to the present embodiment.

FIG. 17 is the format of the real block information 3300. The real block information 3300 exists for each real block. The real block information 3300 comprises a real block identifier (also called real block ID) 3301, a free real block pointer 3302, a free capacity in real block 3304, a real segment bitmap 3305, and prior pointer 3306.

The real block identifier 3301 is the identifier of the corresponding real block. The identifier of a real block shows a set of information for identifying the flash chip 300 in which the real block exists (such as an identification number) and an address within the relevant flash chip. The free real block pointer 3302, in a case where the real block corresponding to the real block information 3300 is not allocated to a virtual block (in a free state), stores information that points to the real block information 3300 of the real block of the next free real block. The free capacity in real block 3304 shows the current free capacity of the corresponding real block. After receiving the write request equal to or smaller than this free capacity from the storage controller 200 to the corresponding real block, the package processor 310 can store the write data to this free area. After storing the data, the free capacity in real block 3304 is reduced by the amount of write data that was stored.

The real segment bitmap 3305 is an N-bit size information if the number of real segments belonging to the relevant real block is N. Each bit shows whether each real segment belonging to the relevant real block is being used (allocated to a virtual segment) or free (not allocated to a virtual segment). The bit shows that the block is used when it is ON, and that the block is not used when it is OFF. When the real segment bitmap 3305 is ON, the prior pointer 3306 shows a pointer to the virtual segment corresponding to the real segment (address in the package memory 320 storing the virtual segment pointer 3205). If it corresponds to multiple virtual segments, it denotes one of the virtual segments. The same number of prior pointers 3306 as the number of real segments within the real block exists within the real block information 3300.

Figure 18:
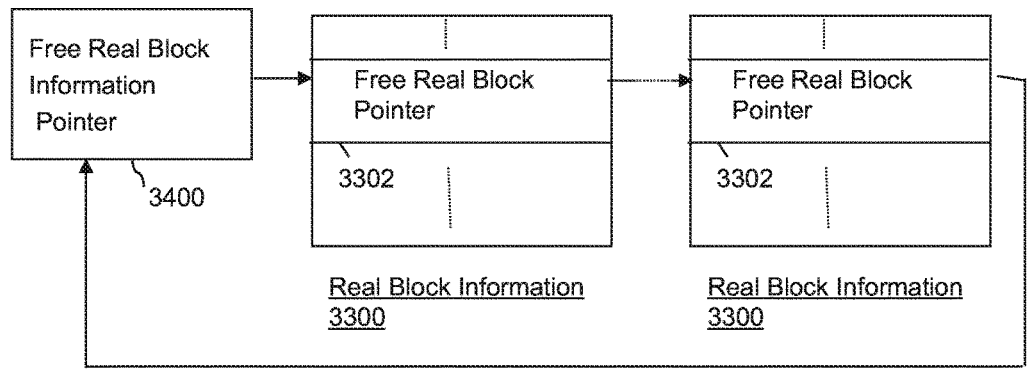
FIG. 18 is a view showing a set of real blocks in a free state pointed to by a free real block information pointer according to the present embodiment.

The free real block information pointer 3400 exists for each flash chip 300. FIG. 18 denotes a set of free real blocks managed by the free real block information pointer 3400. The free real block information pointer 3400 points to the address of the real block information 3300 of the first free real block. Next, the free real block pointer 3302 inside the real block information 3300 of the first free real block points to the real block information 3300 of the next free real block. In FIG. 18, the free real block pointer 2103 of the real block information 3300 of the last free real block shows the free real block information pointer 3400, but this may be a NULL value. The package processor 310, upon receiving a write request specifying a virtual block to which a real block has not been allocated, searches for a free real block from the free real block information pointer 3400 corresponding to the flash chip 300 having the greatest number of free real blocks (that can be acquired by referring to the number of free real blocks in chip 3103), and allocates it to the virtual block.

The flash package 230 according to the preferred embodiment of the present invention manages a queue structure for managing a group of virtual segments storing the data having the same contents as a single group. This is called a deduplication queue 1800. In order to constitute the deduplication queue 1800, the flash package 230 uses the backward deduplication pointer 3207 and the forward deduplication pointer 3208 of the virtual block group information 3200 to create a bidirectional list.

Figure 19:
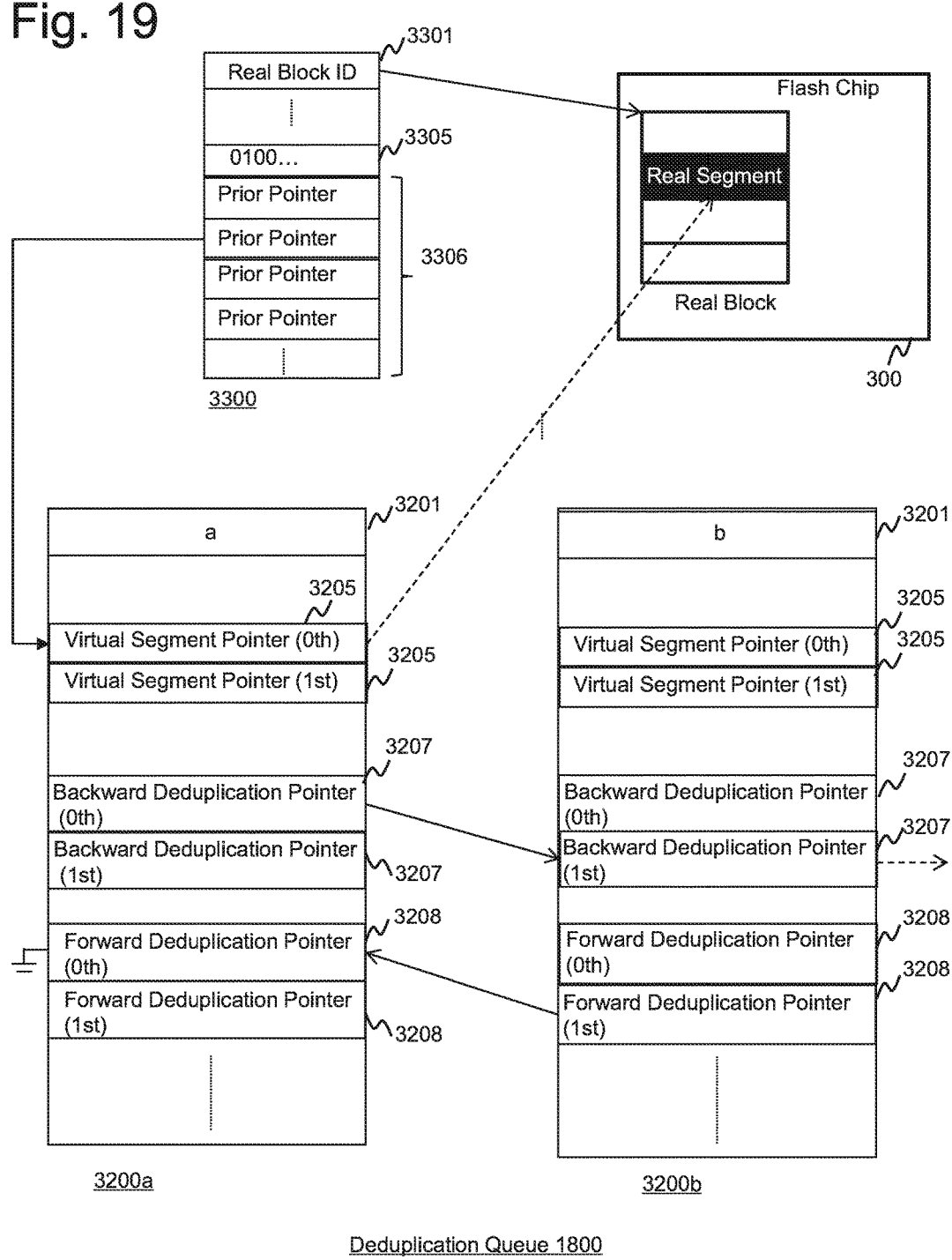
FIG. 19 is a view showing a format of deduplication queue according to the present embodiment.

FIG. 19 shows a configuration example of the deduplication queue 1800 of a case where the content of data of the head (0th) virtual segment within a virtual block group in which the virtual block group identifier (3201) is "a" (hereinafter, the virtual block group information 3200 of the relevant virtual block group is called virtual block group information 3200a) is the same as the content of data of the next (1st) virtual segment within a virtual block group in which the virtual block group identifier (3201) is "b" (hereinafter, the virtual block group information 3200 of the relevant virtual block group is called virtual block group information 3200b). In this case, the 0th backward deduplication pointer 3207 in the virtual block group information 3200a is configured to point to the 1st backward deduplication pointer 3207 in the virtual block group information 3200b (the address in the package memory 320 storing the 1st backward deduplication pointer 3207 in the virtual block group information 3200b is stored in the 0th backward deduplication pointer 3207 in the virtual block group information 3200a). Moreover, the 1st forward deduplication pointer 3208 in the virtual block group information 3200b is configured to point to the 0th backward deduplication pointer 3207 in the virtual block group information 3200a. If the content of data in another virtual segment is the same as the contents of these virtual segments, the 1st backward deduplication pointer 3207 in the virtual block group information 3200b is configured to point to the backward deduplication pointer 3207 corresponding to the relevant different virtual segment. NULL value is stored in the last backward deduplication pointer 3207 of the deduplication queue 1800, and NULL value is stored in the first forward deduplication pointer 3208 of the deduplication queue 1800.

The relationship between the virtual segment constituting the deduplication queue 1800 and the real segment is associated by the real block information 3300. As shown in FIG. 19, the real block identifier (real block ID) 3301 of the real block information 3300 stores information specifying one of the plurality of real blocks within the flash package 230. For example, if the content of each virtual segment constituting the deduplication queue 1800 is the same as the one stored in the second real segment within the real block, as shown in FIG. 19, the second bit of the real segment bitmap 3305 is turned ON (1), and the second prior pointer 3306 within the real block information 3300 points to the virtual segment pointer 3205 of the virtual segment positioned at the head of the deduplication queue 1800. In other words, the real segment bitmap 3305, the prior pointer 3306 and the deduplication queue 1800 of the real block information 3300 show that the content of data of the real segment stored in the flash chip and the content of data of each virtual segment belonging to the deduplication queue 1800 that the prior pointer 3306 points to are the same.

FIG. 19 illustrates a configuration example where the virtual segments having the same data contents belong to different virtual block groups, but it is possible that the virtual segments having the same data contents belong to the same virtual block group, and also in that case, the deduplication queue 1800 can be configured. For example, if the contents of data in the head (0th) virtual segment and the next (1st) virtual segment within the virtual block group specified by the virtual block group information 3200a are the same, the 0th backward deduplication pointer 3207 of the virtual block group information 3200a points to the 1st backward deduplication pointer 3207 of the virtual block group information 3200a, and the 1st forward deduplication pointer 3208 of the virtual block group information 3200a points to the 0th backward deduplication pointer 3208 of the virtual block group information 3200a.

The same value is stored in the virtual segment pointers 3205 and the virtual segment feature values 3206 of the respective virtual segments connected to a single deduplication queue 1800. Further, when the content of data of a certain virtual segment connected to the deduplication queue 1800 is changed, the relevant virtual segment is deleted (separated) from the deduplication queue 1800. Further, when there is no other virtual segment storing the same data as a certain segment, the deduplication queue 1800 will not be configured.

Figure 20:
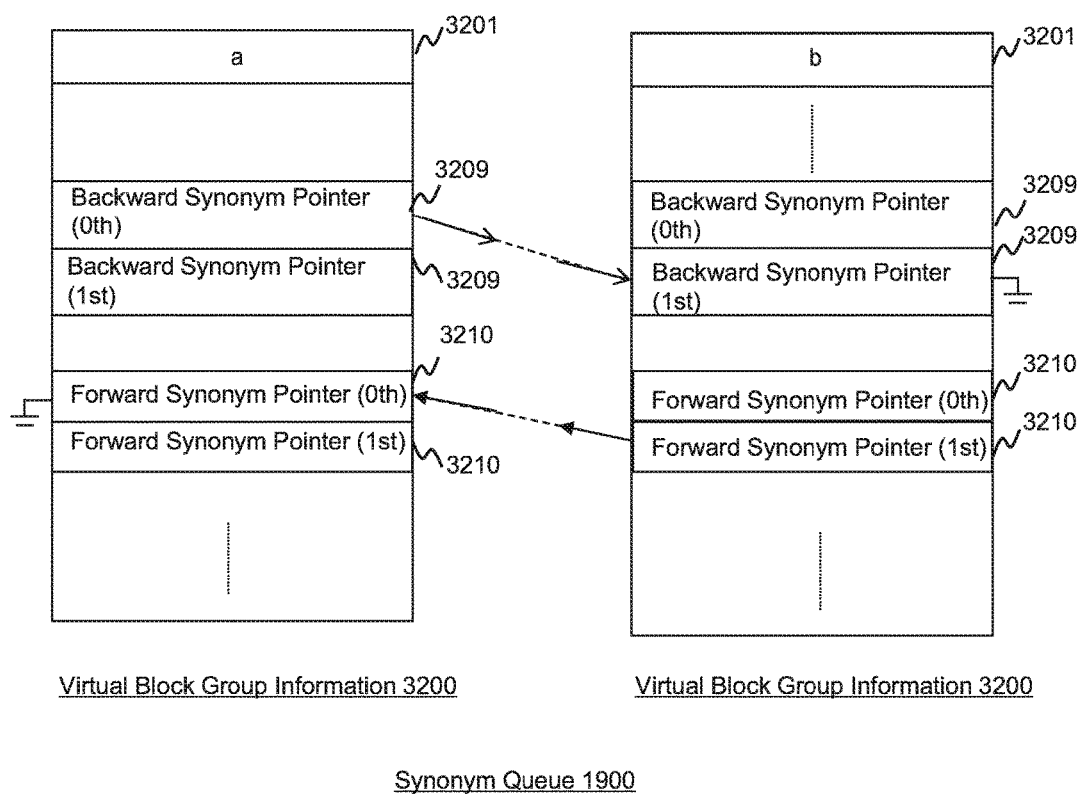
FIG. 20 is a view showing a format of a synonym queue according to the present embodiment.

The flash package 230 according to the preferred embodiment of the present invention further manages a queue structure for managing a group of virtual segments having different data contents but the same feature values derived from the data as one group. This is called a synonym queue 1900. FIG. 20 shows a set of virtual segments having the same feature values but different data values. The synonym queue 1900 is configured similar to the deduplication queue 1800. In the deduplication queue 1800, the virtual segments having the same data contents are connected using the backward deduplication pointer 3207 and the forward deduplication pointer 3208 to configure a single deduplication queue composed of virtual segments having the same data contents. When constituting the synonym queue 1900, the backward synonym pointer 3209 and the forward synonym pointer 3210 are used to connect virtual segments having the same feature values but have different data values. Other than these points, the present queue is the same as the deduplication queue 1800.

When there is no other virtual segment having the same feature value as a certain virtual segment, the synonym queue 1900 will not be configured. The virtual segment feature values 3206 of the virtual segments in the synonym queue 1900 are the same, but the values of the virtual segment pointers 3205 differ. However, if there exists a set of virtual segments having the same data values (supposing that this set constitutes deduplication queue A), the virtual segment positioned at the head of deduplication queue A is coupled to the synonym queue 1900. The backward synonym pointer 3209 denotes an address of the next virtual segment having the same feature value but having a different data value. The last backward synonym pointer 3209 is set to a NULL value. The forward synonym pointer 3210 denotes an address of a directly preceding virtual segment having the same feature value but a different data value. The first forward synonym pointer 3210 is set to a NULL value. If the feature value of a newly written virtual segment is the same and a set of virtual segments having the same data values is not found, the segment is added to this set (synonym queue) as the last virtual segment. If the feature value of a virtual segment belonging to this set is changed, the relevant virtual segment is deleted from this set.

The flash package 230 according to the present embodiment further manages a queue structure for managing a virtual segment group having different data contents and feature values but having the same simplified feature value, which is a value derived from the feature values, as one group set. This is called a simplified synonym queue 3550.

Figure 21:
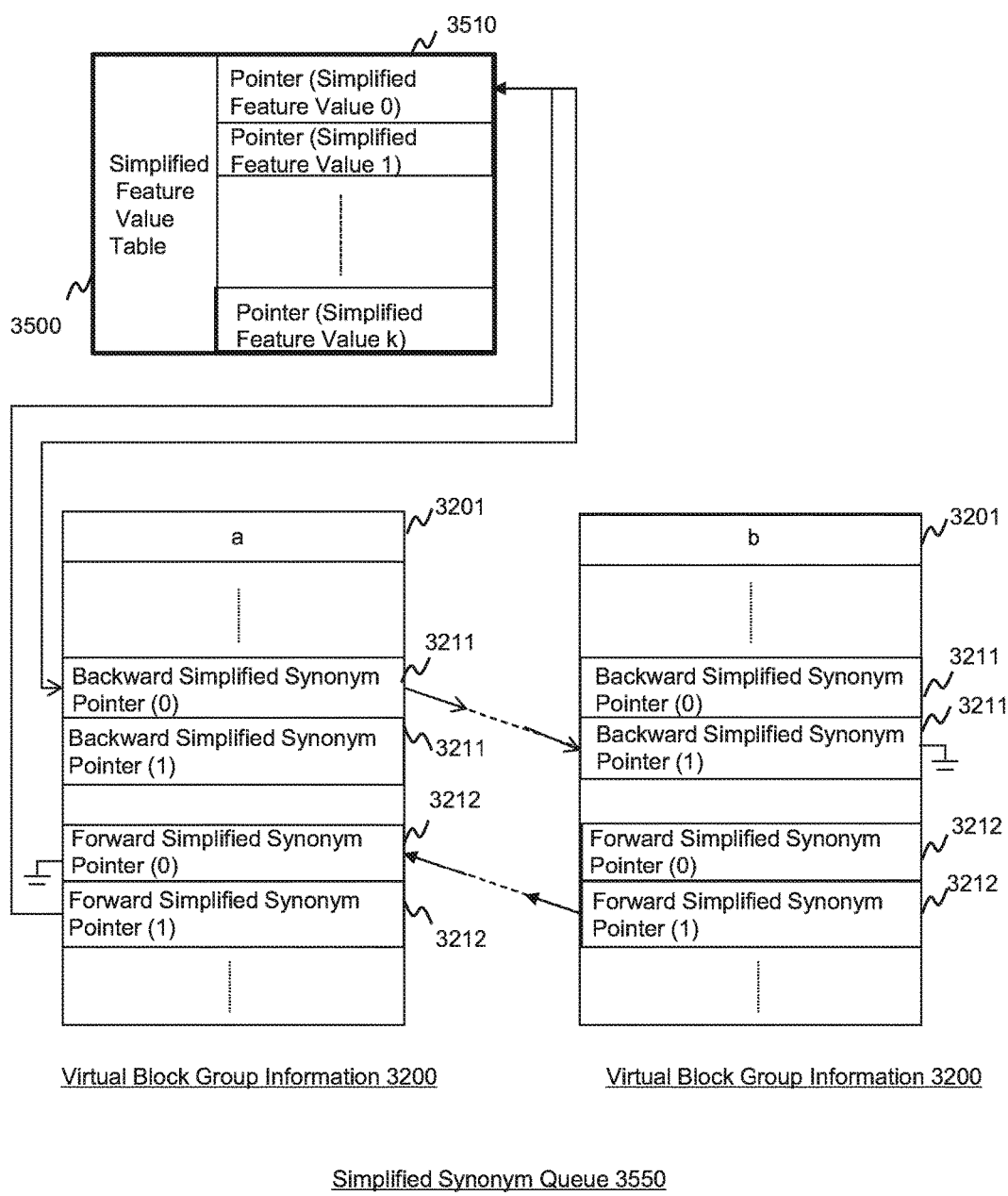
FIG. 21 shows a format of a simplified synonym queue according to the present embodiment.

FIG. 21 shows a structure of the simplified feature value table 3500, and a set of virtual segments having the same simplified feature value and different feature values. When there are a large number of virtual segments having the same feature value and different data values, the reading process and comparing process are executed as many times as the number of different data, so that it is preferable to increase the space (number) of the feature values and to reduce the number thereof (number of virtual segments having the same feature value and different data values). Further, the easiest method to find virtual segments having the same feature values is to provide a feature value table having the same size as the order of the feature value space. However, if the feature value space becomes too large, the size of the feature value table becomes too large and will not fit in the package memory 320. Therefore, according to the present embodiment, the virtual segment feature value 3206 is converted to a smaller value (simplified feature value) by a given method to derive the simplified feature value and provide a simplified feature value table 3500 storing the set of relevant simplified feature values.

The size of the simplified feature value table 3500 is set to a number (space) approximate the order of the number of virtual segments in the flash package 230. The simplified feature value table 3500 is composed of simplified feature value pointers 3510 (hereinafter also abbreviated as "pointer 3510"). The number of the simplified feature value pointer 3510 is approximate the order of the number of virtual segments in the flash package 230. The simplified feature value pointer 3510 at the head of the simplified feature value table 3500 is a pointer pointing to the virtual segment whose simplified feature value is 0, and subsequently thereafter, the pointers respectively point to virtual segments whose simplified feature values are 1, 2 and so on.

The simplified feature value pointer 3510 points to the backward simplified synonym pointer 3211 corresponding to the initial virtual segment, if a virtual segment having the same simplified feature value as the simplified feature value 3505 exists in the relevant flash package 230. If such segment does not exist, NULL is set. The simplified feature value pointer 3510 is included in the simplified synonym queue 3550, so that if even one virtual segment exists having a simplified feature value equal to the simplified feature value 3505 corresponding to the simplified feature value pointer 3510, the simplified synonym queue 3550 will exist. The backward simplified synonym pointer 3211 shows an address of a next virtual segment having the same simplified feature value and a different feature value. However, if there exists a set of virtual segments having the same simplified feature values and same feature values (supposing that this set constitutes a synonym queue A), the virtual segment positioned at the head of synonym queue A is connected to a simplified synonym queue 3500. The last backward simplified synonym pointer 3207 is set to a NULL value. A forward simplified synonym pointer 3212 shows the address of a directly preceding virtual segment having the same simplified feature value and a different feature value. The initial backward simplified feature value pointer 3212 shows the address storing the simplified feature value pointer 3510 corresponding to that simplified feature value. If the simplified feature value of the newly written virtual segment is the same but a set of virtual segments having the same feature value is not found, the segment is added to this set as the final virtual segment. When the simplified feature value of the virtual segment belonging to this set is changed, the relevant virtual segment is deleted from this set.

Next, the operations executed by the storage controller 200 and the flash package 230 using the management information explained above will be explained. First, the operation of the storage controller 200 will be explained. The operation of the storage controller 200 to be explained below is achieved by the processor 260 inside the storage controller 200 executing the programs for these operations stored in the memory 270.

Figure 22:
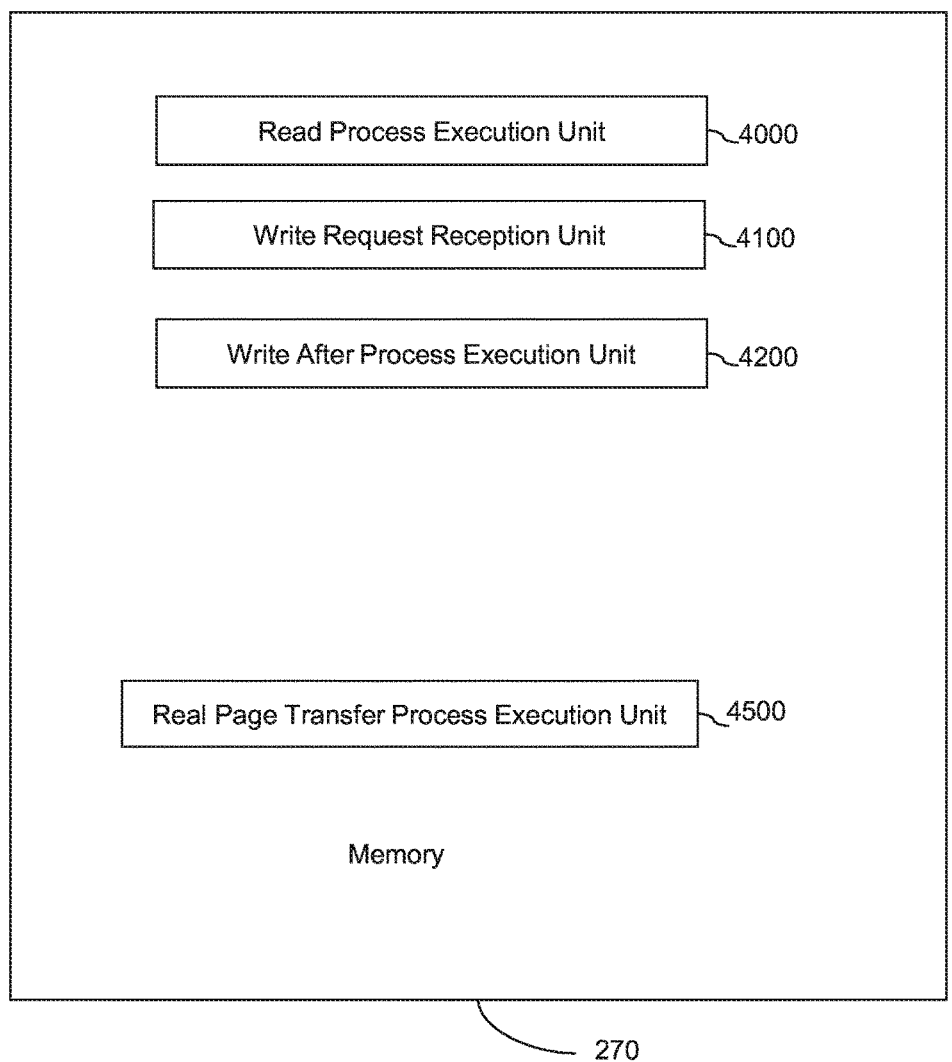
FIG. 22 shows a program performing higher-level control in the memory of a storage controller according to the present embodiment.

FIG. 22 shows the programs related to the present embodiment stored in the memory 270. The programs related to the present embodiment are a read process execution unit 4000, a write request reception unit 4100, a write after process execution unit 4200, and a real page transfer process execution unit 4500. These programs are for achieving the higher-level wear leveling technology and capacity virtualization technology. In the following description, there are some areas described as having the "execution unit" (in other words, program) set as the subject of operation to execute the processes, but it actually means that the processes are performed by having the program executed by the processor 260.

As already explained, in the present embodiment, the flash package 230 achieves the lower-level wear leveling technology and capacity virtualization technology, but the storage controller 200 may achieve the lower-level wear leveling technology and capacity virtualization technology. In that case, the lower-level wear leveling technology and capacity virtualization technology are executed by the storage controller 200. Therefore, since the higher-level program and the lower-level program are both executed by the storage controller 200, the interface between the programs will differ, but fundamentally there are no major differences between the contents executed by the higher-level program. Therefore, in the present embodiment, the flows of processing of the read process execution unit 4000, the write request reception unit 4100, the write after process execution unit 4200, and the real page transfer process execution unit 4500 will be explained in detail on the premise that the lower-level wear leveling technology and capacity virtualization technology are achieved by the flash package 230.

Furthermore, in the present embodiment, it is supposed that the access target data range designated by a read request and a write request from the host 12 corresponds to the virtual segment boundary, which is the read/write unit of the flash memory (in the present invention). Specifically, if the virtual segment size is 8 KB, the range corresponding to the 8-KB boundary in the address space of the logical volume is designated as the access target range. Of course, the present invention is also effective in a case where the access range designated by the read request or the write request from the host 12 is only a portion of the virtual segment, and when such access request is received, the flash package 230 reads the whole virtual segment including the access range, wherein if the request is a read request, the flash package 230 only returns the designated partial area to the host 12, and if the request is a write request, only the designated partial area is updated within the read virtual segment data, and the entire updated virtual segment is written to the flash package 230.

Figure 23:
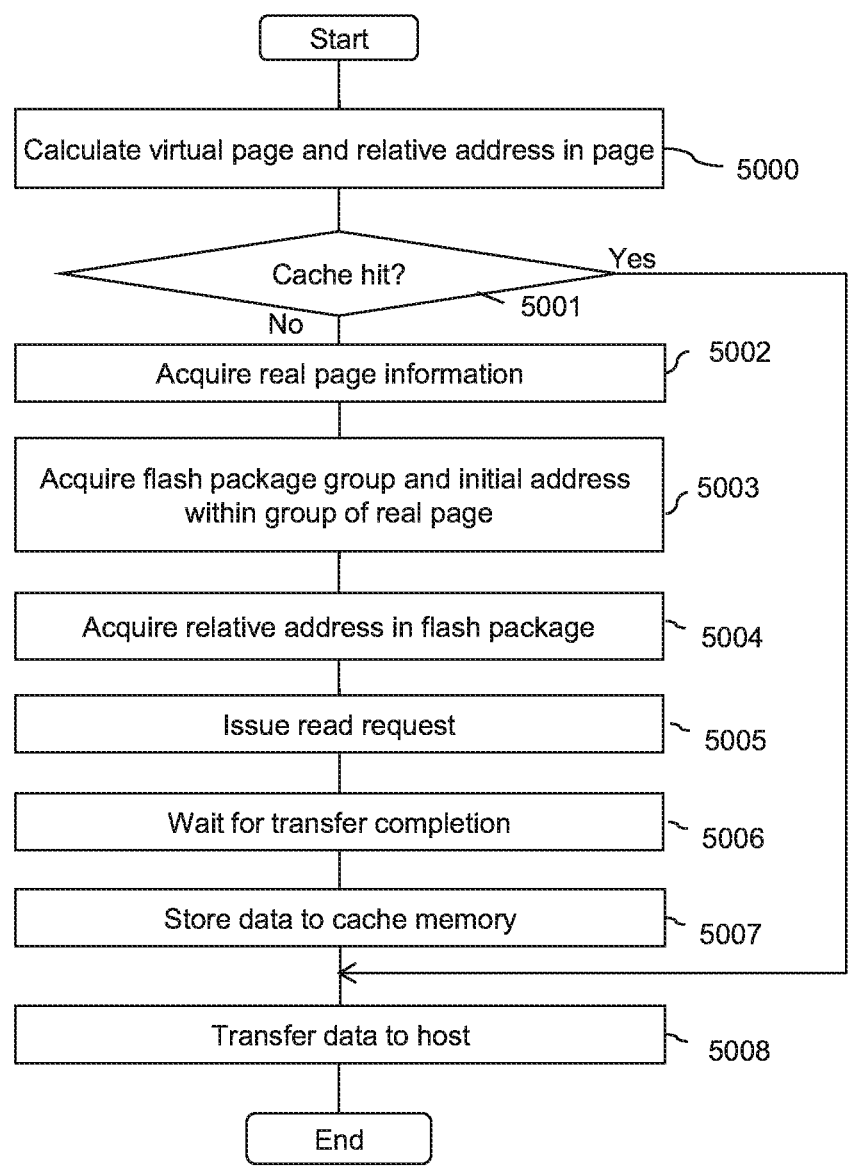
FIG. 23 is a view showing the flow of processing of a read process execution unit according to the present embodiment.

FIG. 23 shows the process flow of the read process execution unit 4000. The read process execution unit 4000 is executed when the storage controller 200 receives a read request from the host 120.

Step 5000: The processor 260 calculates a corresponding virtual page and a relative address within the virtual page based on the read target address designated by the received read request.

Step 5001: Whether the read target data exists in the cache memory 210 (cache hit) or not is checked. This is a publicly known technology. In the case of a cache hit, the procedure jumps to Step 5008.

Step 5002: In the present step, the read target data must be loaded to the cache memory 210. At first, the real page information 2100 corresponding to the real page allocated to the read target virtual page is acquired from the real page pointer 2004 in the logical block management information 2000.

Step 5003: By referring to the package group 2101 and the real page address 2102 of the acquired real page management information 2100, the identifier of the flash package group 280 to which the relevant real page belongs and the head address within the flash package group 280 of the relevant real page are acquired.

Step 5004: The relative address inside the real page being the access target of the relevant request is computed based on the relative address in the virtual page obtained in Step 5000 and the package group RAID type 2302 (obtained by referring to the flash package group information 2300 based on the identifier of the flash package group 280 obtained in Step 5003). The access target flash package 230 and the access target address within the relevant flash package 230 are identified based on the calculated relative address within the real page, the package group RAID type 2302 and the flash package pointer 2305.

Step 5005: The read request is issued to the address identified in Step 5004 of the flash package 230 identified in Step 5004.

Step 5006: The procedure waits for data to be to be sent from the flash package 230.

Step 5007: The procedure stores the data sent from the flash package 230 in the cache memory 210.

Step 5008: The procedure transmits the data in the cache memory 210 designated by the relevant read request to the host 120, and ends the process.

Figure 24:
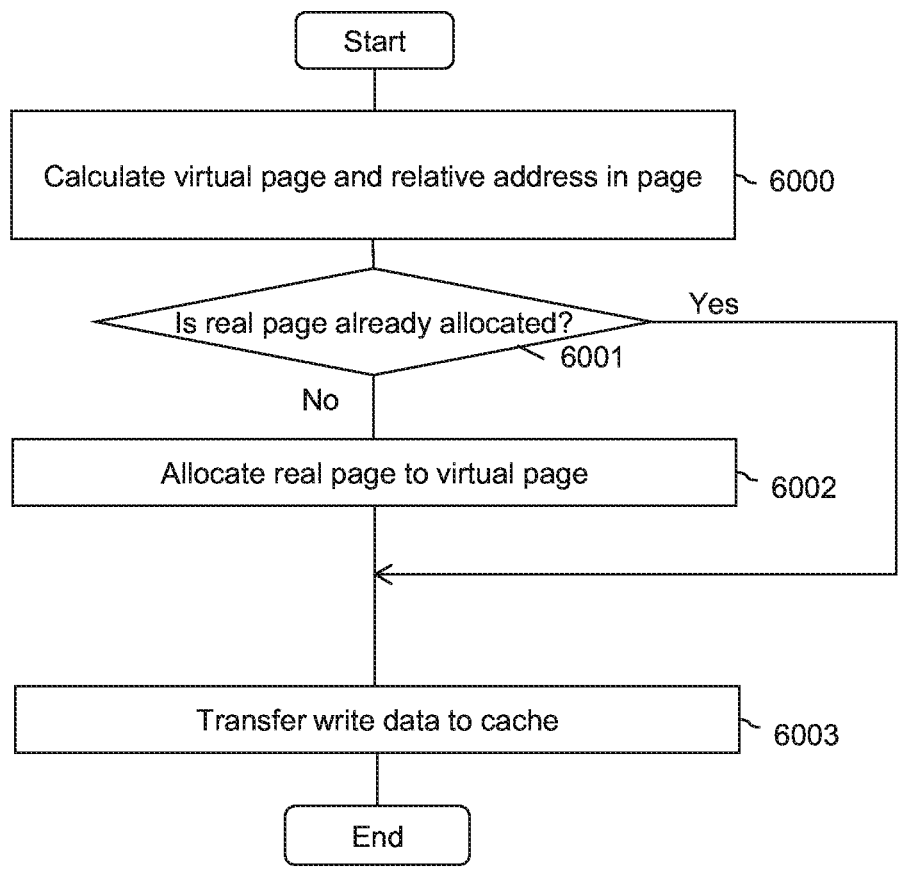
FIG. 24 is a view showing the flow of processing of a write request reception unit according to the present embodiment.

FIG. 24 is a flow of processing of the write request reception unit 4100. The write request reception unit 4100 is executed when the storage controller 200 receives a write request from the host 120.

Step 6000: The processor 260 calculates the virtual page corresponding to the relevant address and the relative address inside the access target virtual page based on the write target address of the received write request.

Step 6001: Since the information of the access target logical volume (such as LUN) is designated in the write request, the processor 260 can uniquely identify the logical volume information 2000 of the access target logical volume by referring to the contents of the write request. In Step 6001, the processor 260 refers to the logical volume information 2000 identified based on the received write request, and checks whether a real page has been allocated to the virtual page obtained in Step 6000 by referring to the real page pointer 2004. In a case where a real page has been allocated, the procedure jumps to step 6003.

Step 6002: In this step, allocation of a real page to the corresponding virtual page is performed. The flash package group 280 from which the real page is to be allocated is determined by referring to the RAID type 2002 in the logical volume information 2000, the package group RAID type 2303 and the number of free real pages 2304 in the flash package group information 2300, and so on. Thereafter, by referring to the free real page management information pointer 2200 of the corresponding flash package group 280, the relevant real page pointer 2004 is made to point to the initial free page information 2100. By doing this, a real page is allocated to the virtual page. Furthermore, the free real page management information pointer 2200 is made to point to the next real page information 2100 (real page information 2100 pointed to by the free page pointer 2103 within the real page information 2100 of the real page allocated to the virtual page), and in addition, the free page pointer 2103 within the real page information 2100 of the real page allocated to the virtual page is set to NULL. Furthermore, the number of free pages 2304 of the flash package group management information corresponding to the relevant real page is reduced. In the present embodiment, the processing example performed when the processor 260 receives a write request has been explained as the process for allocating a virtual page to a real page, but the processing is not restricted thereto. The allocation processing should be executed at least before the data is stored in the flash package 230.

Step 6003: The write data designated by the relevant write request from the host 120 is stored in the cache memory 210.

The flash package group 280 adopts a RAID configuration, so that redundancy data is generated with respect to the write data stored in the cache memory 210, and the redundant data is also stored in the cache memory 210. Since this is a publicly known method, it will not be described in detail. Further, since the real page includes an area for storing redundancy data, the storage address of the redundancy data with respect to the write data within the real page is also uniquely determined. The redundancy data is also stored once into the cache memory 210. In Step 6003, when storing the write data and the redundancy data in the cache memory 210, the flash package ID of the flash package 230 and the address of the flash package 230 to which the data should be stored respectively are determined (a similar process as the process performed in a well-known storage subsystem adopting a RAID technology should be performed), and information showing the address of the flash package 230 to which writing should be performed and the corresponding real page information (such as the real page pointer 2004) are also attached to the redundancy data and the write data in the cache memory 210. The write data and the redundancy data are written to the flash package 160 by a write after process execution unit 5200, but since these data are both written to the flash package 230 from the perspective of the write after process executing unit 5200, there is no need to distinguish the two data. Similarly, there is also no need for the flash package 230 to distinguish the two data.

Figure 25:
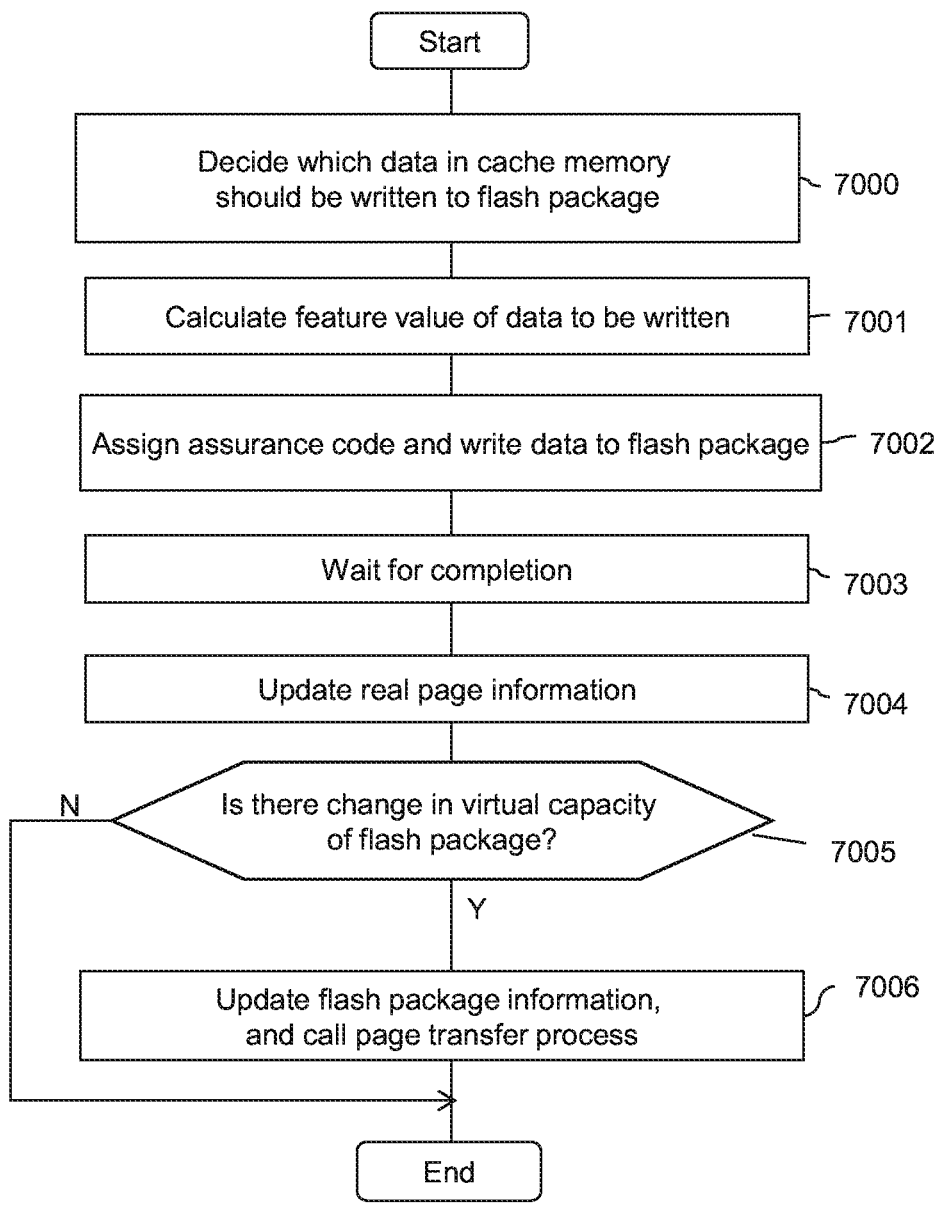
FIG. 25 is a view showing the flow of processing of a write after process execution unit according to the present embodiment.

FIG. 25 is the flow of processing of the write after process execution unit 4200. The write after process refers to a process for storing (destaging) the write data, which was stored in the cache memory by the process of the write request reception unit 4100 described in FIG. 24, into the flash package 230 which is a final storage media of the storage system 100. The write after process execution unit 4200 is a process that the processor 260 executes arbitrarily, independently from the process performed by the write request reception unit 4100. The write after process execution unit 4200 executes a process to write the write data received from the host 120 and the redundancy data to the flash package 230. However, the write after process execution unit 4200 processes both the write data and the redundancy data as data to be written to the flash package 230 without distinguishing the two data.

Step 7000: The processor 260 searches the cache memory 210 and determines the data to be written to the flash package 230. The method for determining the data to be written can use a well-known method, such as LRU algorithm. The processor 260 extracts the information on the data write target flash package 230 and the information related to the write destination address of the relevant flash package 230, which are attached to the found data, for each virtual segment.

Step 7001: The process requests the arithmetic circuit 280 to create two bytes of feature value per 512 bytes of virtual segment subjected to the write process, and waits for completion. This calculation of the feature value can be executed when a write request has been received from the host 110. Practically, the feature value can be calculated when the write data is stored to the cache memory 210 in Step 6003 of the write request reception unit 4100, and stored in the cache memory 210.

Step 7002: A write request of the virtual segment to be written is issued to the appropriate flash package 230. According to the first embodiment, an 8-byte assurance code including the 2-byte data showing the feature value calculated in Step 7001 is added to the 512-byte data, and data is transmitted using a SCSI write command where 520 bytes is set as a single transfer unit. At this time, the transfer state flag 2109 of the real block information 2500 corresponding to the real block performing the data write is checked, and if the flag is ON, it means that this real page is being moved, so that the execution of this write request is stopped and a different write data is searched.

Step 7003: The procedure waits for completion of the write request.

Step 7004: The processor 260 checks the completion report related to the relevant write request from the flash package 230. These processes are the characteristic feature of the present invention. The completion report regarding the write request received from the flash package 230 includes, at least, the information on the amount of stored data stored according to the process related to the present write request, the amount of data after deduplication, and the virtual capacity of the flash package 230. In step S7004, processes related to the amount of stored data and the amount of data after deduplication included in the completion report related to the relevant write request are performed. Specifically, the processor 260 adds the amount of stored data to the amount of stored page data 2104, and adds the amount of stored data after deduplication to the amount of stored data after page deduplication 2105.

Step 7005: Here, a check is performed on whether there is no flash package 230 whose virtual capacity has been changed. If there is no such flash package, the process is ended.

Step 7006: If there is a flash package 230 whose virtual capacity has been changed, the received respective virtual capacities are set to the corresponding flash package virtual capacity 2502. Next, a check is performed on whether the minimum value of the flash package virtual capacity 2502 of each flash package 230 belonging to the corresponding flash package group 280 has been changed by this change or not. In the case of a change, the number of real pages 2303 and the number of free real pages 2304 are updated in accordance with this changed value. Furthermore, in accordance with this value, the real page management information is transferred between the free page management information queue 2201 and the unavailable page management information queue 2701. Thus, the real page will be increased when data deduplicated for many times is stored, and as a result, a greater amount of storage areas can be provided to the higher-level device. Thereafter, a page transfer process (FIG. 26) is called. After that, the process is ended.

Figure 26:
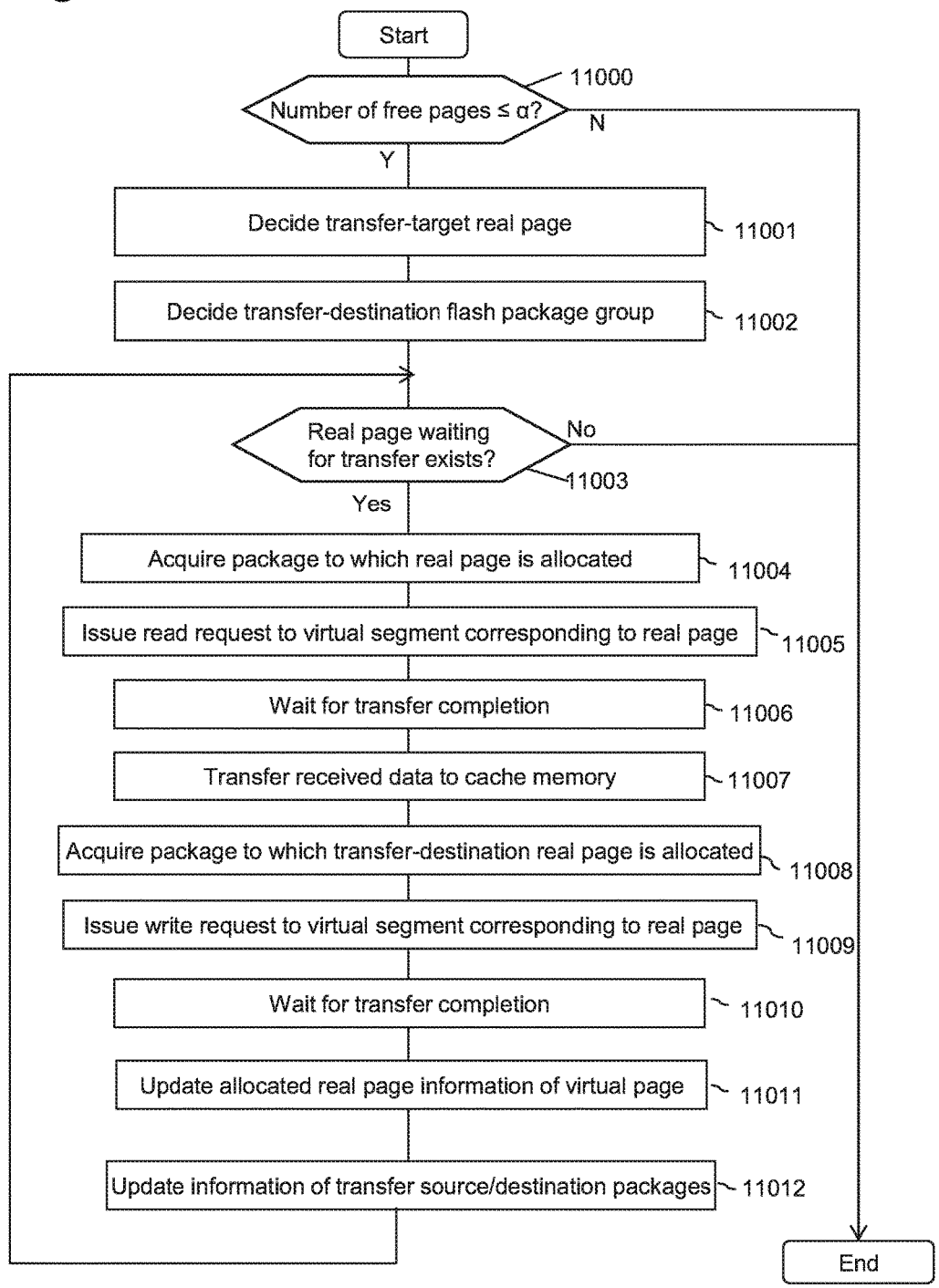
FIG. 26 is a view of the flow of processing of a real page transfer process execution unit according to the present embodiment.

FIG. 26 is the flow of processing of the real page transfer process execution unit 4500. The real page transfer process execution unit 4500 is called from the write after process execution unit 4200 (Step 7006).

Step 11000: The processor 260 confirms whether the number of free real pages 2304 of each flash package group 280 is not equal to or less than a certain value: α (wherein α is a predetermined value) or not. In a case where no package group 280 fulfills the condition (the number of free real pages 2304 is not equal to or less than α), the process is ended.

Step 11001: The real page management information 2100 corresponding to the processing target flash package group 280 is searched to find a set of real page management information 2100 having a large amount of stored data after page deduplication 2105 (greater than a given threshold), and these real pages are set as target candidates of migration so that their respective transfer standby flags 2111 are turned ON.

Step 11002: At this point, the flash package group 280 that will be the transfer destination is selected. In the present embodiment, one flash package group is selected, but it goes without saying that a plurality of flash package groups may be selected. For example, a flash package group with a relatively small number of free real pages 2304 is selected. Next, which of the real pages inside the selected transfer-destination flash package group 280 will be the transfer destination will be decided. Upon deciding the flash package group 280 to which the transfer-destination real page is allocated, the real page information 2100 to which the free real page management information pointer 2200 corresponding to this flash package group 280 points is set to the transfer destination real page information 2110 in the real page management information 2100 of the transfer source real page. The free real page management information pointer 2200 is set to point to the next page management information 2100 in a free state. The above processing is executed with respect to all the real pages for which a transfer decision was made in Step 11001. By the above processing, the transfer destination pages for the respective transfer source real pages of the set of transfer-source real pages will be decided.

Step 11003: At this time, the real page management information 2100 that is to be the transfer source is decided. Specifically, one real page management information 2100 for which the transfer standby flag 2111 is ON is found. When there is no real page management information 2100 for which the transfer standby flag 2111 is ON, the processing is ended and returned to the call source.

Step 11004: At this time, the set of virtual segments of the flash package 230 constituting the flash package group 280 to which the real page corresponding to the real page information 2100 selected in step 11003 corresponds is obtained. The flash package group information 2300 showing the package group 2101 of the discovered real page information 2100 is the relevant flash package group information 2300. The flash package(s) 230 corresponding to the flash package information 2500 pointed to by the flash package pointer 2305 stored in this flash package group information 2300 is/are the flash package(s) 230 to which the copy source real package is allocated. Next, the set of virtual segments being the transfer target within the respective flash packages 230 is obtained with respect to all flash packages 230, based on the real page address 2101 inside the real page information 2100 and the virtual block capacity 2503 of the flash package information 2500.

Step 11005: The data of the virtual segment storing the data among the virtual segments obtained in step 11004 is required to be transferred to the cache memory 210 to the respective flash packages 230 constituting the flash package group 280 to which the transfer source real page is allocated. The flash packages 230 having received this request execute a virtual block transfer process execution unit 12300 (FIG. 36) described later.

Step 11006: The procedure waits for a completion report from all the flash packages 230 to which the request has been issued.

Step 11007: Information as to whether or not data has been stored in each virtual segment is included in the completion report from the flash packages 230. In a case where such data has been stored in the virtual segment, the data stored in the virtual segment is also sent. The data in the virtual segment is sent as a set of 520 bytes of data, including the 512-byte data and the 8-byte assurance code including the 2-byte feature value. The processor 260 stores the data having been stored in the virtual segment to the cache memory 210.

Step 11008: At this point, the set of flash packages 230 configuring the flash package group 280 to which the transfer-destination real page is allocated, and a set of virtual segments of the relevant flash package 230 to which the transfer-destination real page corresponds, are obtained. In this case, the real page information 2100 pointed to by the transfer destination real page information 2110 of the transfer-source real page information 2100 is the real page information 2100 corresponding to the transfer-destination real page. The process for computing, based on the real page information 2100, the set of flash packages 230 configuring the flash package group 280, and the set of virtual segments of each flash package 230 to which the page corresponds, is similar to the process described in Step 11004, so the description thereof will be omitted.

Step 11009: At this point, the data in the transfer source virtual segment stored in the cache memory 210 in Step 11007 is requested to be stored in each flash package 230 configuring the flash package group 280 to which the transfer-destination real page is allocated. At this time, the information sent to each flash package 230 is information on whether data is stored in each segment, and if data is stored, the content of the stored data is sent in addition thereto. In this case, the virtual segment is sent as a set of data of 520 bytes, including a 512-byte data and 8-byte assurance code including the 2-byte feature value.

Step 11010: The procedure waits for a completion report from all flash packages 230 to which the request has been issued.

Step 11011: The transfer source real page is allocated to the free real page, and the virtual page to which the transfer source real page has been previously allocated is allocated to the transfer destination real page. This is performed by coupling the transfer source real page to a free real page management pointer 2200, and setting the real page pointer 2004 which had been showing the transfer source real page information to show the transfer destination real page information. Further, among the transfer source real page information, the amount of stored page data 2104 and the amount of stored data after page deduplication 2105 are copied to the real block information 2100 of the transfer destination. After copying the same, the transfer state flag 2109, the transfer destination real page information 2110, and the transfer standby flag 2111 of both the transfer-source and transfer-destination real page management information 2100 are cleared.

Step 11012: The flash package group information 2300 being the transfer source and the flash package group information 2300 being the transfer destination are updated. At this time, 1 is taken away from the number of free real pages 2304 in the transfer-source flash package group information 2300, and 1 is added to the number of free real pages 2304 in the transfer-destination flash package group information 2300. Thereafter, the procedure jumps to Step 11003 to search for the next transfer-target real page.

Figure 27:
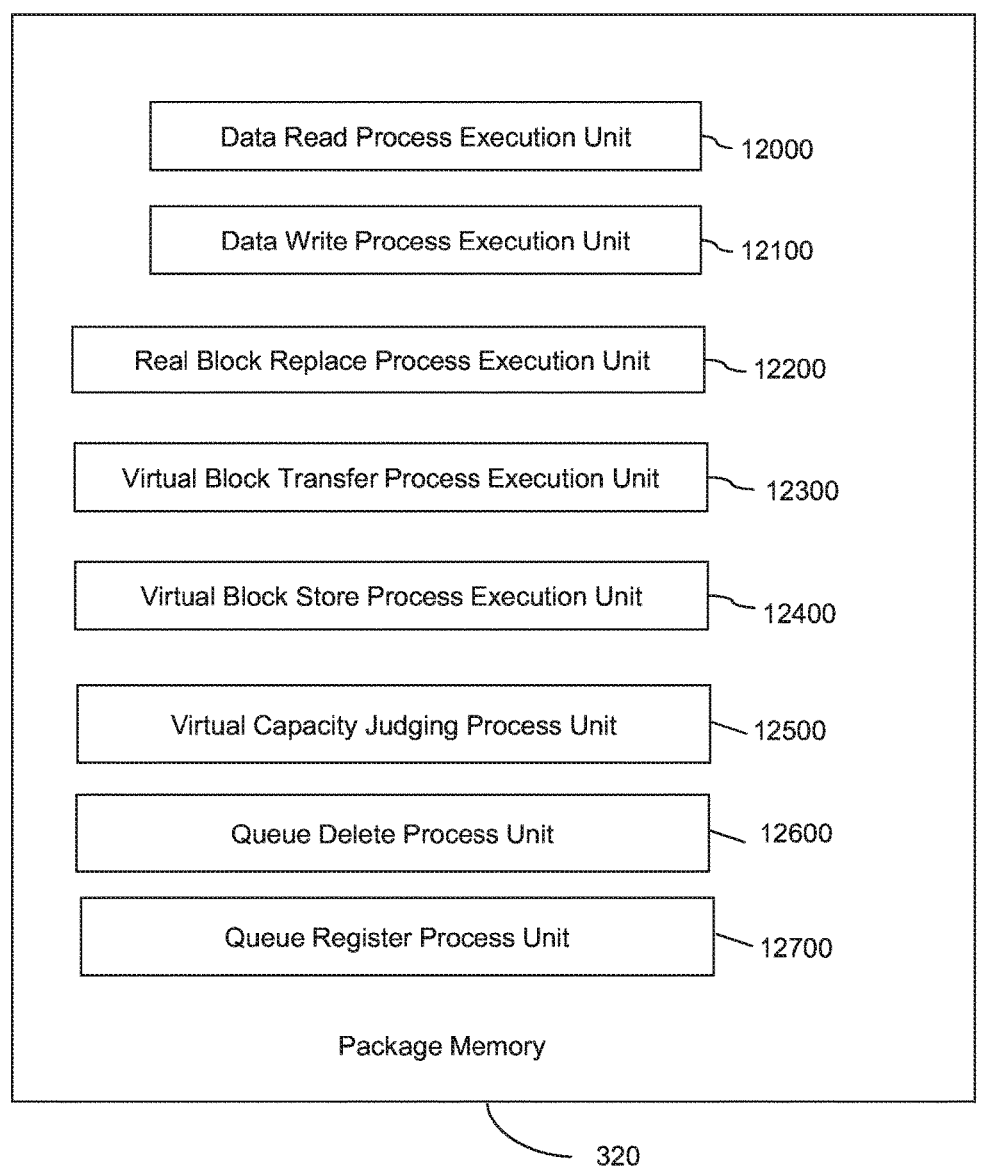
FIG. 27 is a view showing programs executing a lower-level control in a package memory of the flash package according to the present embodiment.

Next, the operations executed by the flash package 230 will be explained. The various processes described below are achieved by the package processor 310 executing a program stored in the package memory 320. FIG. 27 shows the programs related to the present embodiment stored in the package memory 320. The programs related to the present embodiment are a data read process execution unit 12000, a data write process execution unit 12100, a real block replace process execution unit 12200, a virtual block transfer process execution unit 12300, a virtual block store process execution unit 12400, a virtual capacity judging process unit 12500, a queue delete process unit 12600, and a queue register process unit 12700. These programs are for realizing the lower-level wear leveling technology and capacity virtualization technology. In the present embodiment, the flash package 230 realizes the lower-level wear leveling technology and capacity virtualization technology. The flow of processing of the data read process execution unit 12000, the data write process execution unit 12100, the real block replace process execution unit 12200, the virtual block transfer process execution unit 12300, the virtual block store process execution unit 12400, the virtual capacity judging process unit 12500, the queue delete process unit 12600, and the queue register process unit 12700 will be explained in detail. In the following description, there may be areas where it is described that the "execution (process) unit" (that is, the program) is the subject of operation for executing the processes, but it actually means that the processes are performed by the package processor 310 executing the programs Unless stated otherwise, the subject of operation of each step in the description of the flow of processing is the package processor 310.

Figure 28:
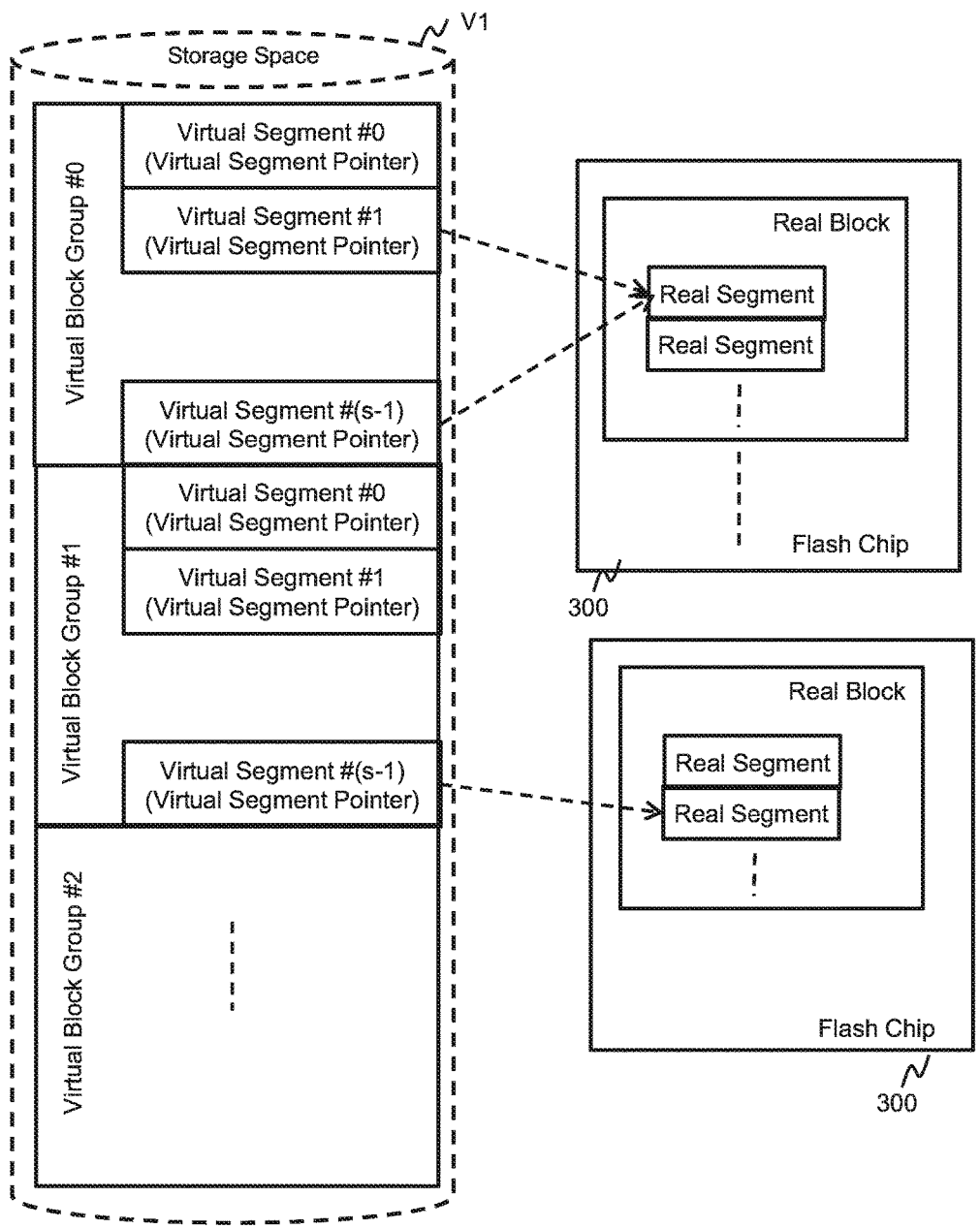
FIG. 28 is a concept view showing the relationship between storage space that the flash package provides to the storage controller and information necessary for performing access according to the present embodiment.

Before describing the processes of various programs, we will describe the outline of the process performed when the flash package 230 receives an access request (read request or write request) from the storage controller 200. FIG. 28 shows a concept view of the relationship between the storage space V1 provided by the flash package 230 to the storage controller 200, and the information required for access. As mentioned earlier, the flash package 230 manages the storage space V1 as being composed of a plurality of virtual block groups, wherein each virtual block group is composed of a plurality of virtual segments (also, there exists a management unit called virtual blocks, but in the drawing, the virtual blocks are omitted). Since the start address (LBA) of the access target area is included in the access request from the storage controller 200, the flash package 230 identifies the access target virtual segment by identifying the virtual block group identifier (number) corresponding to the access target area and the relative address within the virtual block (relative virtual segment number from the head of the virtual block group) from the LBA included in the request.

Specifically, the virtual block group identifier can be calculated by dividing the LBA by the virtual block group size, which is a multiplication of the virtual block size by the number of blocks (m) within the virtual block group, and further, the relative virtual segment number within the virtual block group can be calculated by dividing the remainder of the above-described division by the virtual segment size.

The virtual block group information 3200 corresponding to the access target virtual block group can be identified by calculating the virtual block group identifier. Then, when the virtual segment number is determined, the virtual segment pointer 3205 corresponding to the access target virtual segment can be identified among the virtual segment pointers 3205 stored in the virtual block group information 3200. As shown in FIG. 28, the address information of the real segment corresponding to the virtual segment is stored in the virtual segment pointer 3205, so that the access target real segment can be specified.

Figure 29:
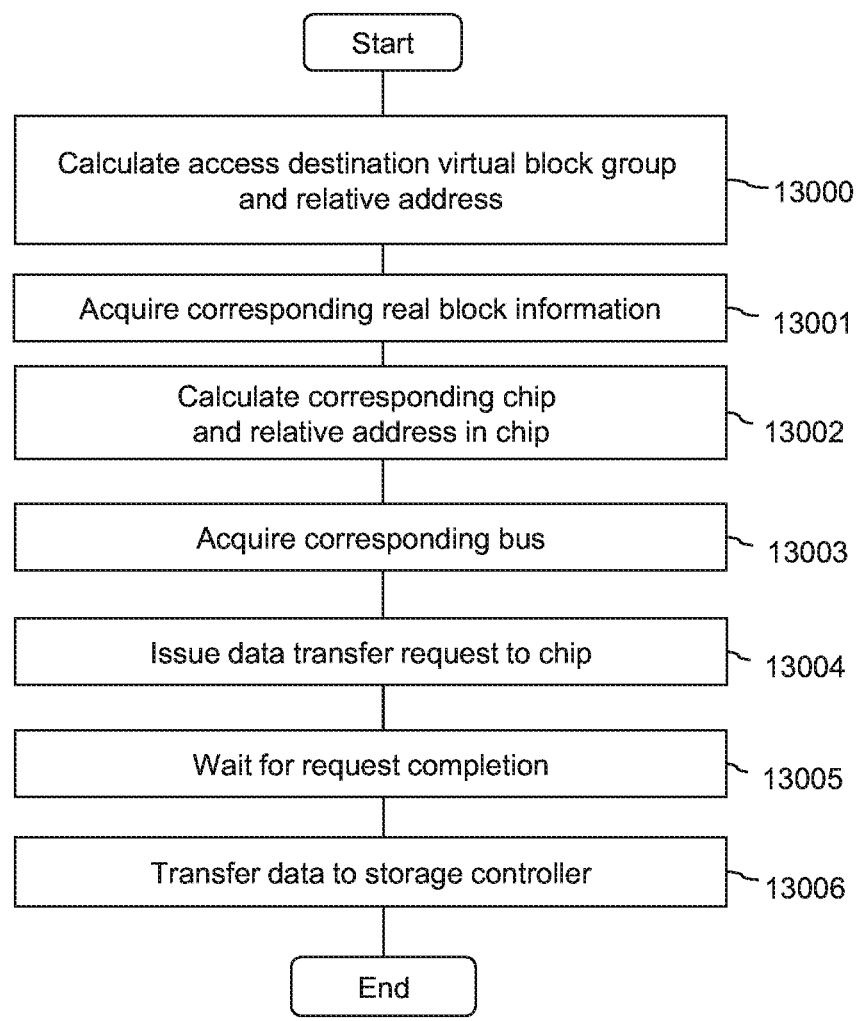
FIG. 29 is a view showing the flow of processing of a data read execution unit according to the present embodiment.

FIG. 29 is a flow of processing of the data read process execution unit 12000. The data read process execution unit 12000 is executed when a read request is received from the storage controller 200. The flow of processing of FIG. 29 illustrated in the present embodiment shows a process where the access range designated by the read request received from the storage controller 200 is one or more virtual segments stored within one virtual block group. However, the present invention is also effective in a case where the access range designated by the read request extends across a plurality of virtual block groups.

Step 13000: The package processor 310, based on the read-target address in the received read request, calculates the virtual block group identifier corresponding to the read-target address and the relative virtual segment number within the access-target virtual block group in the manner described above. The virtual block group information 3200 corresponding to the access-target virtual block group is specified.

Step 13001: In this step, the real block information 3300 of real blocks allocated to the respective read-target virtual segments are respectively acquired from the real block information pointers 3202 of the respective virtual block group information 3200.

Step 13002: The flash chip 300 storing the real block corresponding to the real block information 3300 and the address within the relevant flash chip 300 are specified based on the real block identifiers 3301 of the acquired respective real block information 3300. Next, the virtual segment pointer 3205 of the access target virtual segment is referred to using the virtual block group information 3200 and the relative virtual segment number specified in Step 13000, to calculate the address in the relevant flash chip 300 in which the access target virtual segment is stored.

Step 13003: The package bus 340 to which the relevant flash chip 300 is connected is identified by accessing the chip information 3100 corresponding to the flash chip 300 storing the read data, and the corresponding package bus transfer device 350 is identified.

Step 13004: The process instructs the package bus transfer device 350 identified in Step 13003 to transfer data to the buffer 330 from a specified address of a specified flash chip 300.

Step 13005: Thereafter, the process waits for the transfer to be completed.

Step 13006: The read data stored in the buffer 330 requested by the storage controller 200 is sent to the storage controller 200. Thereafter, the processing is completed.

Figure 30:
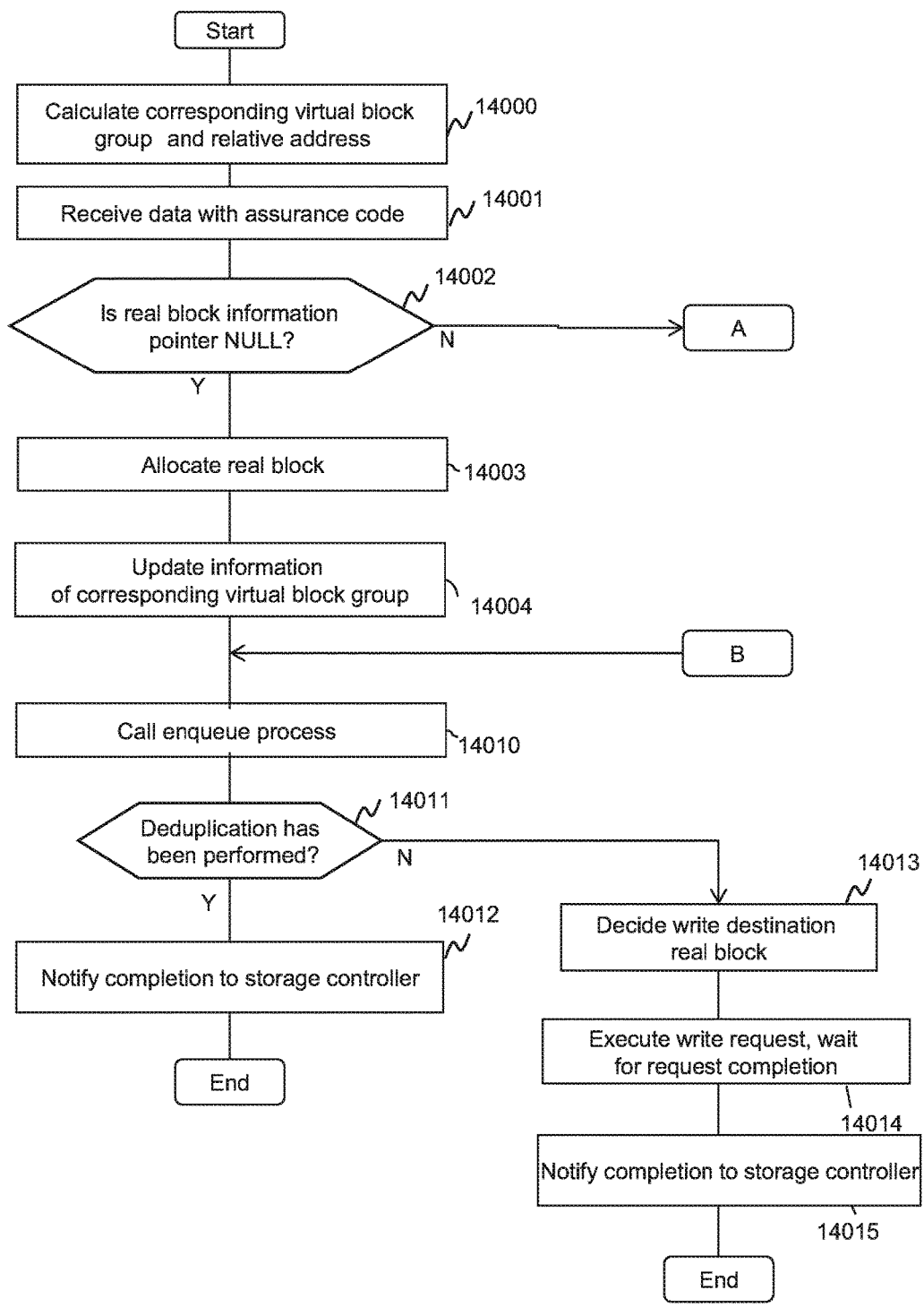
FIG. 30 is a view showing the flow of processing of a part of a data write process execution unit according to the present embodiment.
Figure 31:
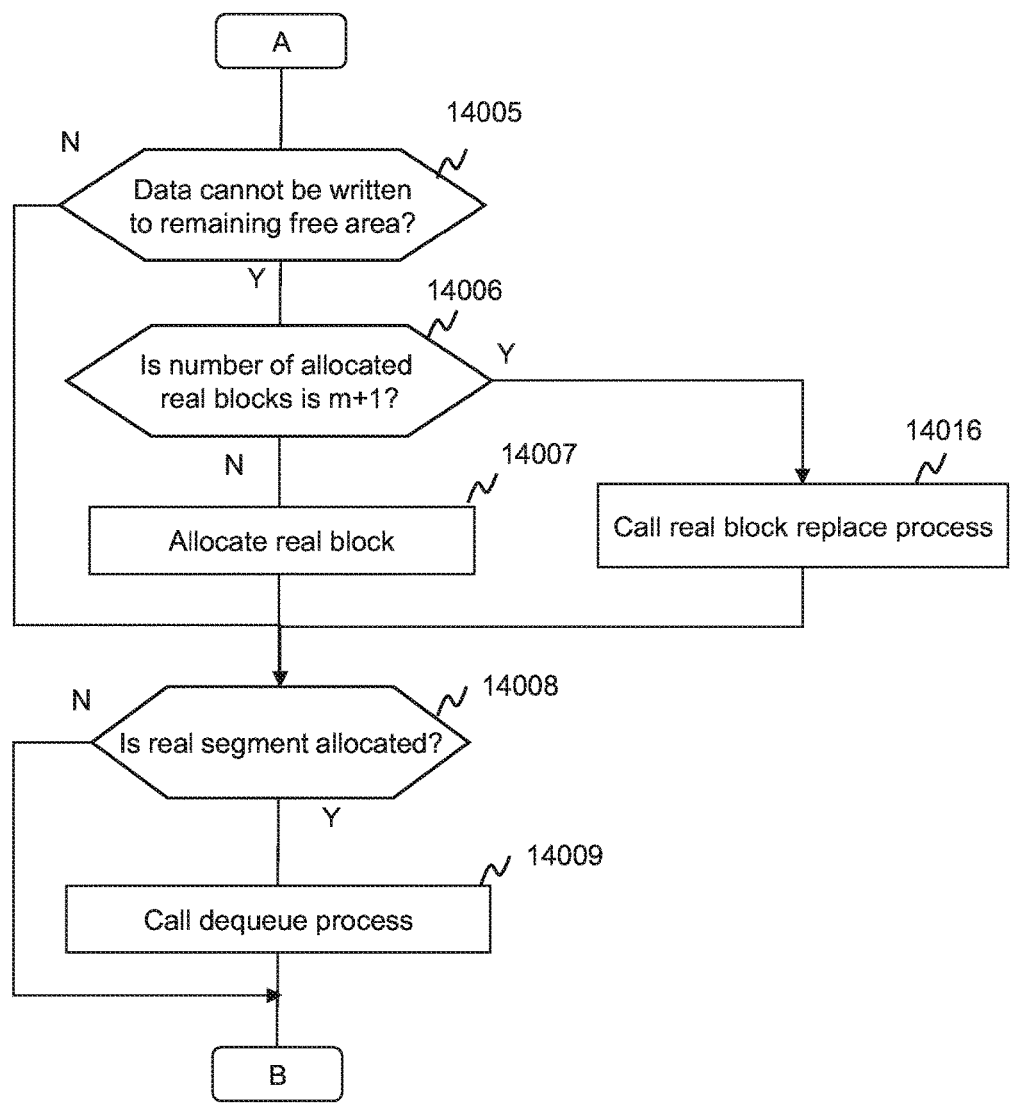
FIG. 31 is a view showing the flow of processing of a part of the data write process execution unit according to the present embodiment.

FIGS. 30 and 31 are the flow of processing of the data write process execution unit 12100. The data write process execution unit 12100 is executed when the flash package 230 receives a write request from the storage controller 200. The flows of processing of FIGS. 30 and 31 shown in this embodiment are for writing data to be stored in one virtual segment. However, the present invention is also effective in a case where the data is written stored in a plurality of virtual segments in accordance with the write request. Furthermore, it is assumed that the access target range designated in the write request from the storage controller 200 corresponds to the virtual segment boundary in the storage space that the flash package 230 provides to the storage controller. However, the present invention is also effective in a case where the access target range designated by the write request from the storage controller 200 is only a part of the virtual segment. If a partial area of the virtual segment is designated, the flash package 230 will read the whole virtual segment, update only the designated partial area, and then write the whole virtual segment.

Step 14000: The package processor 310 calculates the virtual block group number corresponding to the access target area and the relative virtual segment number within the virtual block group corresponding to the access target area based on the write-target address specified in the received write request. This is a similar process as Step 13001.

Step 14001: The write data designated by the relevant write request and the assurance code are received from the storage controller 200, and the write data is stored in the buffer 330. Furthermore, the 2-byte data showing the feature value is taken out and stored in a different area as the write data in the buffer 330. In this case, since the data showing the feature value exists in 520-byte units, if the length of the virtual segment (excluding the assurance code portion) is 8 Kbytes, a total of 32-byte feature value will be stored, and if the length is 4 Kbytes, a total of 16-byte feature value will be stored. However, it is possible to store a portion of the feature value instead of all the feature values having been taken out.

Step 14002: The first real block information pointer 3202 within the virtual block group information 3200 corresponding to the write-target virtual segment is acquired. A check is performed to determine whether or not this value is NULL, that is, whether a real block has been allocated. In a case where a real block has been allocated (Step 14002: N), the procedure jumps to step 14005. If this value is NULL (Step 14002: Y), a real block has not been allocated, so that the procedure advances to Step 14003.

Step 14003: This step allocates a free real block to the corresponding virtual block group. The real block to be allocated at this time is the one which is not storing any data. The real block of the flash chip 300 to be allocated is decided by referring to the number of free real blocks in chip 3101 and the like of each chip information 3100 (for example, the real block of the flash chip 300 having the greatest number of free real blocks 3101 is decided to be allocated). Thereafter, the free real block information pointer 3400 of the corresponding flash chip 300 is referred to, and the initial real block pointer 3202 of the relevant virtual block group information 3200 is updated to point to the head real block information 3300. By doing this, the first real block is allocated to the virtual block group. Furthermore, the free block management information pointer 3400 is updated to point to the next real block information 3300 (the real block information 3300 pointed to by the free real block pointer 3302 in the real block information 3300 of the real block allocated to the virtual block), and the free real block pointer 3302 within the real block information 3300 of the real block allocated to the virtual block is set to NULL. Further, the number of free real blocks in chip 3103 of the chip information 3100 corresponding to the relevant real block is decreased. The value of the free capacity in real block 3302 corresponding to the allocated real block is set as the capacity of the real block.

Step 14004: This step updates the corresponding virtual block group information. Further, it sets the real block identifier 3301 of the real block allocated in Step 14003 and the start address within the real block into the virtual segment pointer 3205 corresponding to the virtual segment specified in Step 14000. Further, it sets the capacity of the write-target virtual segment into the amount of stored data 3203. In addition, the same value (the capacity of the write-target virtual segment) is added to the amount of stored package data 3006. Thereafter, the procedure jumps to Step 14010.

Step 14005: Based on the free capacity in real block 3304 of the real block information 3300 corresponding to the write-target real block and the length of the write data stored in the buffer 330, the procedure checks whether the received data can be written to a free area within the relevant real block. In a case where the data can be written (Step 14005: N), the procedure jumps to Step 14008.

Step 14006: The present step is executed when the length of the write data is greater than the free area in the write-target real block (when Step 14005: Y). The present step determines whether or not (m+1) real blocks are allocated to the relevant virtual block group, and if (m+1) real blocks are allocated, jumps to Step 14016 without allocating the real block.

Step 14007: This step allocates a free real block to the corresponding virtual block group. The real block to be allocated here is the one that is erased and does not store any data. Which real block of the flash chip 300 is to be allocated is decided by referring to the number of free real blocks in chip 3103 and the like in each chip information 3100. Thereafter, the free real block information pointer 3400 of the corresponding flash chip 300 is referred to, and the real block pointer 3302 storing a NULL value and positioned first among the plurality of real block pointers 3302 within the relevant virtual block group information 3200 is updated to point to the head real block information 3300. By doing this, a new real block is allocated to the virtual block group. Furthermore, the free real block information pointer 3400 is set to point to the next real block information 3300 (the real block information 3300 pointed to by the free real block pointer 3302 in the real block information 3300 of the real block allocated to the virtual block), and the free real block pointer 3302 within the real block information 3300 of the real block allocated to the virtual block is set to NULL. The number of free real blocks in chip 3103 of the chip information 3100 corresponding to the relevant real block is reduced.

Step 14008: Whether a real segment is allocated to the designated virtual segment is recognized by checking the virtual segment pointer 3205. If a real segment is not allocated, the procedure jumps to Step 14010.

Figure 32:
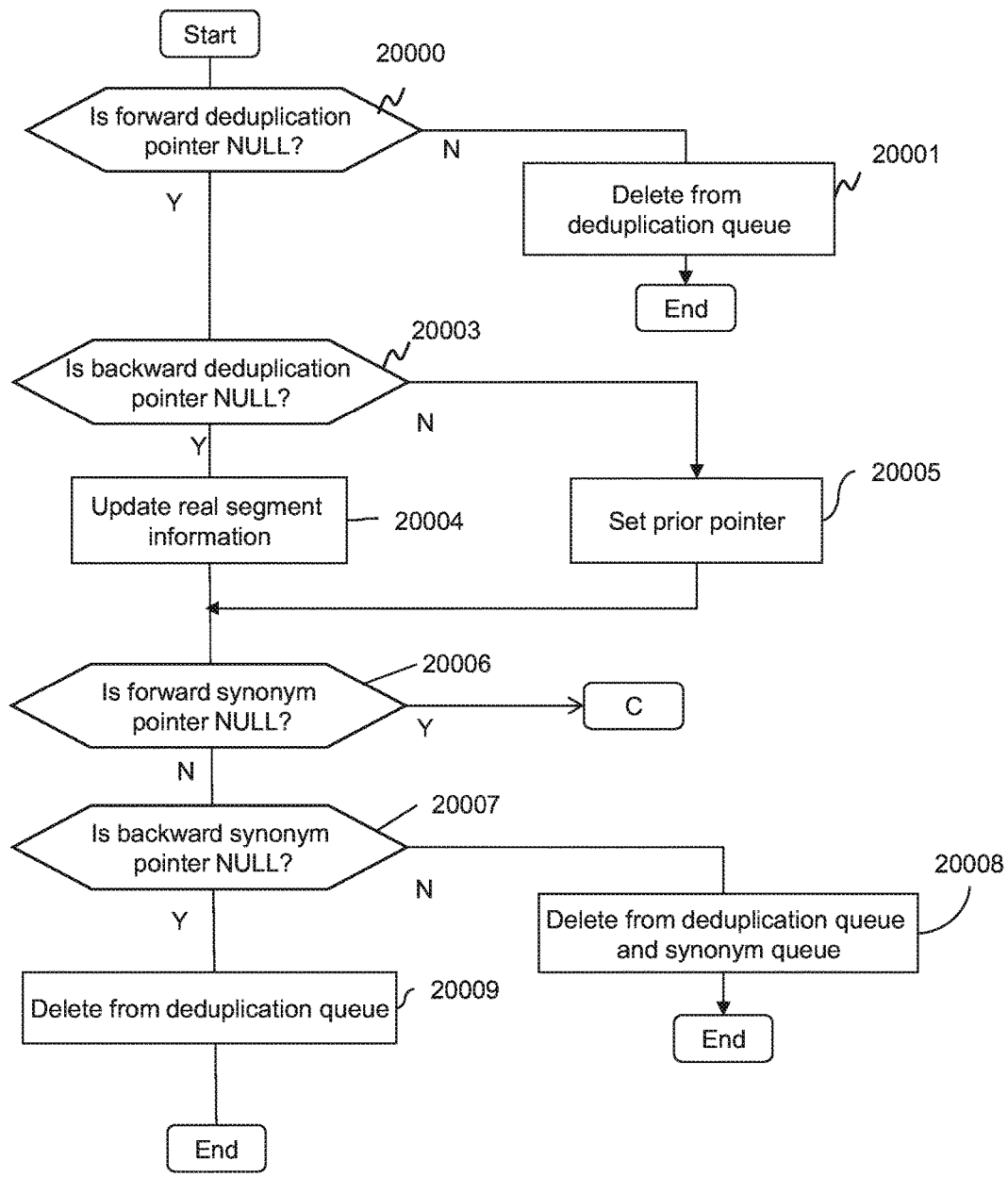
FIG. 32 is a view showing the flow of processing of a queue delete process unit according to the present embodiment.
Figure 33:
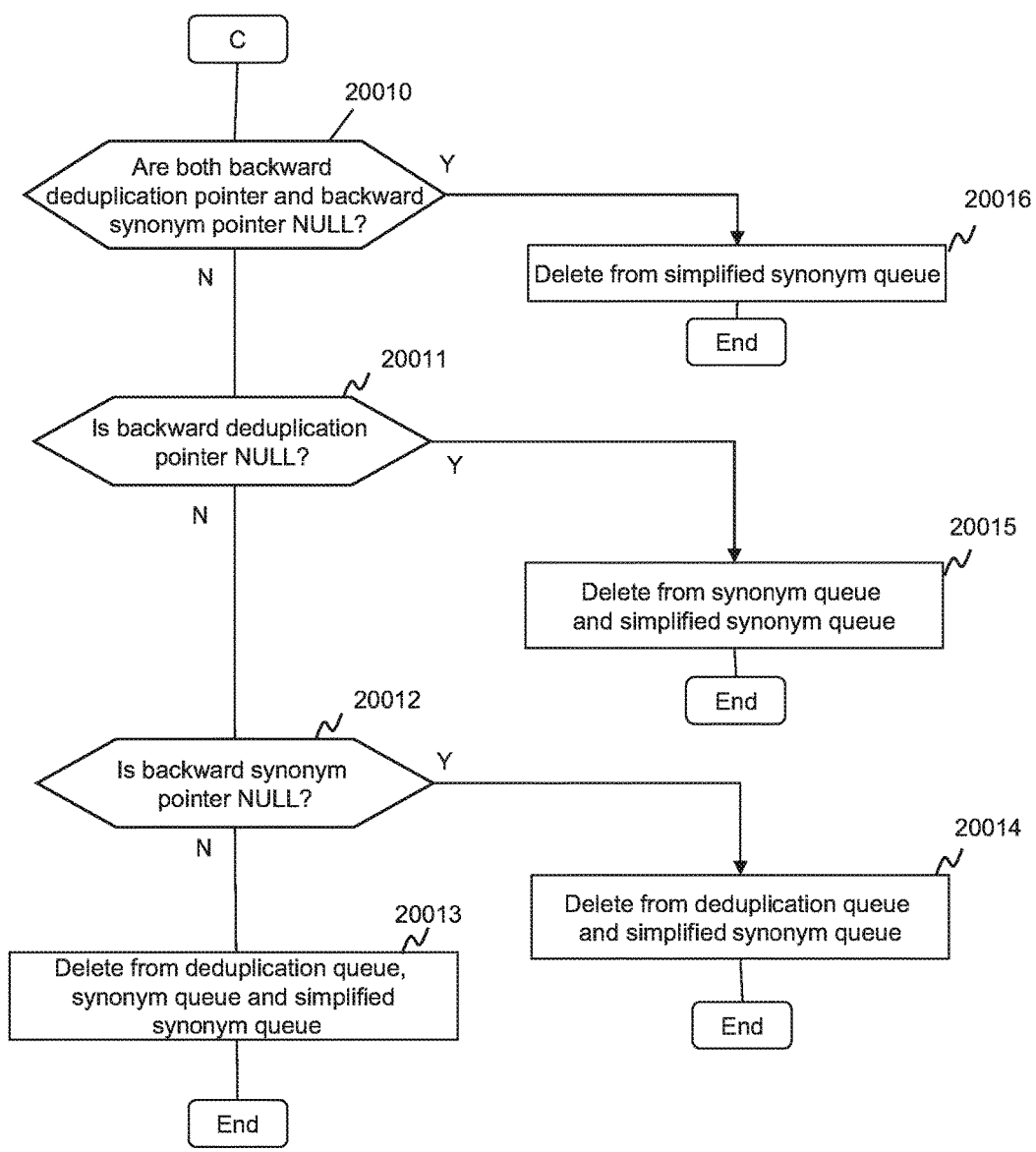
FIG. 33 is a view of the flow of processing of the queue delete process unit according to the present embodiment.

Step 14009: Since the data of the write-target virtual segment is changed here, the queue delete process 12600 (also called dequeue process) shown in FIGS. 32 and 33 is called to execute a process to remove the relevant virtual segment from the deduplication queue 1800, the synonym queue 1900 and the simplified synonym queue 3550.

Figure 34:
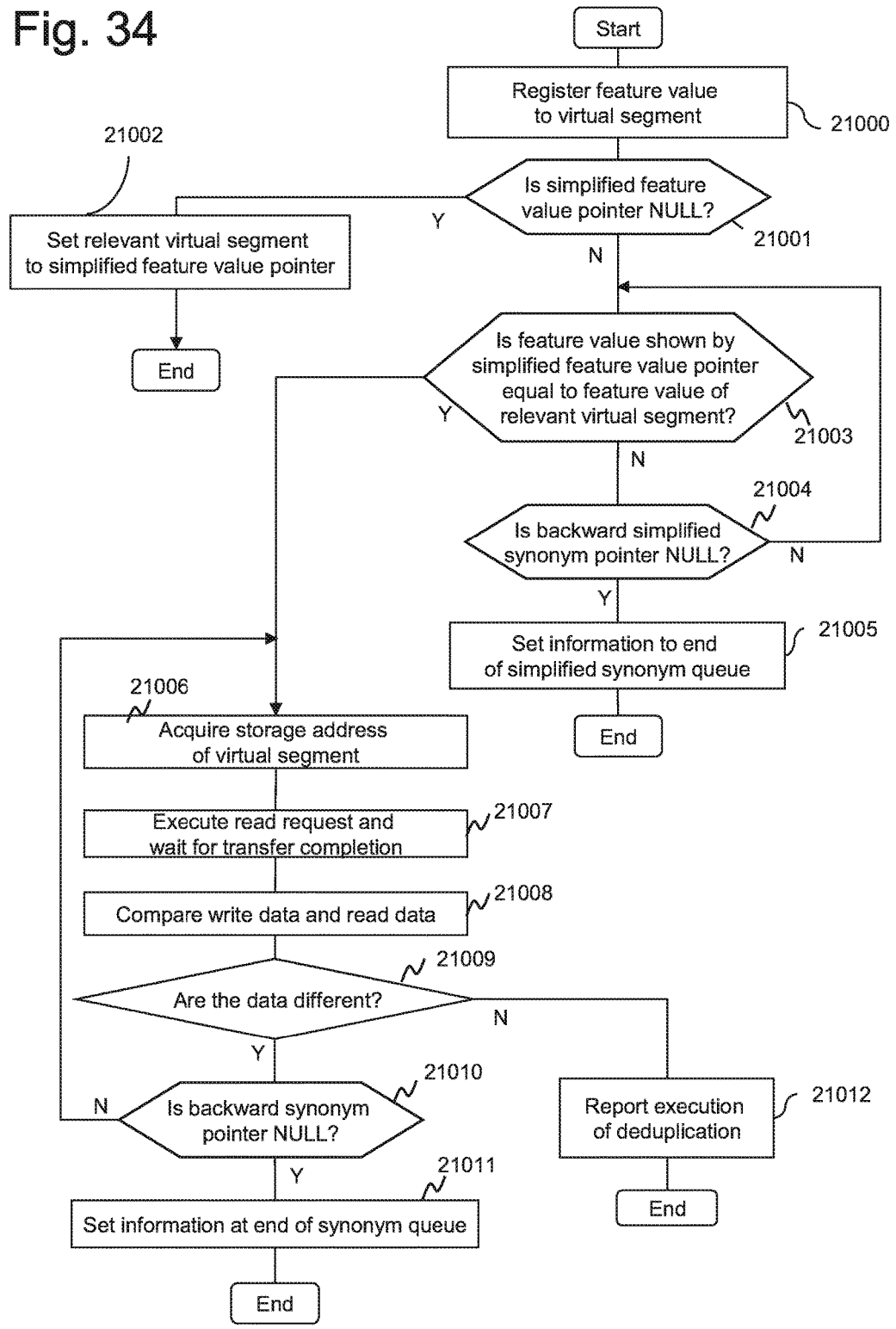
FIG. 34 is a view showing the flow of processing of a queue register process unit according to the present embodiment.

Step 14010: The queue register process 12700 (also called enqueue process) shown in FIG. 34 is called to execute a process to register the relevant virtual segment to the deduplication queue 1800, the synonym queue 1900 or the simplified synonym queue 3550 and to execute the deduplication process, based on the content of data and the feature value of the write-target virtual segment (which are still stored in the buffer 330 at this point of time).

Step 14011: Whether deduplication has been achieved is checked. If deduplication has not been done, the procedure jumps to Step 14013.

Step 14012: A virtual capacity judging process unit (FIG. 38: the details thereof will be described later) is called, and the virtual package capacity 3002 of the flash package 230 is updated. Thereafter, a notice is sent to the storage controller 200 notifying that deduplication has been done, and the amount of stored data being the write target by the current write process (if data corresponding to one virtual segment is written, it is equal to the size of the virtual segment), the amount of data after deduplication of the write target data of the current write process (if write process of data corresponding to one virtual segment is performed and deduplication is done, the amount of data after deduplication is zero), the virtual package capacity 3002, the amount of stored package data 3006, and the amount of stored package data after deduplication 3007, and then the process is ended.

Step 14013: The last real block among the real blocks allocated to the relevant virtual block group (the real block pointed to by the last real block information pointer 3202 whose value is not NULL) is set as the write target of the write data. The address to which the current write is being performed (the chip ID 3101 and the relative address within the flash chip 300) is determined from the real block free capacity 3303 of the target real block. This address is set to the virtual segment pointer 3205 of the relevant virtual segment. Further, the address of the relevant virtual segment (address in the package memory 320 to which the virtual segment pointer 3205 is stored) is set to the prior pointer 3306 corresponding to the real segment to which writing is performed. Further, the relevant bit of the real segment bitmap 3305 is turned ON.

Step 14014: A write request is set to the package bus transfer device 350 so as to write the write data in the buffer 330 to the real segment in the real block to which the write is to be performed, and completion thereof is waited. In the present embodiment, an 8-byte assurance code including the 2-byte feature value is also written for each 512-byte data to the real segment.

Step 14015: A free real block capacity 3303 corresponding to the relevant real block is reduced. Further, the capacity of the write target virtual segment is added to the amount of stored package data after deduplication 3007. Thereafter, the virtual capacity judging process unit is called, and the virtual package capacity 3002 of the flash package 230 is updated. Then, a notice is sent to the storage controller 200 notifying that deduplication has not been done, and the amount of stored data being the write target by the current write process (if data corresponding to one virtual segment is written, it is equal to the size of the virtual segment), the amount of data after deduplication of the write target data of the current write process (if write process of data corresponding to one virtual-segment is performed and deduplication could not be carried out, the amount of data after deduplication is equal to the amount of stored data), the virtual package capacity 3002, the amount of stored package data 3006, and the amount of stored package data after deduplication 3007, then the process is ended.

Figure 35:
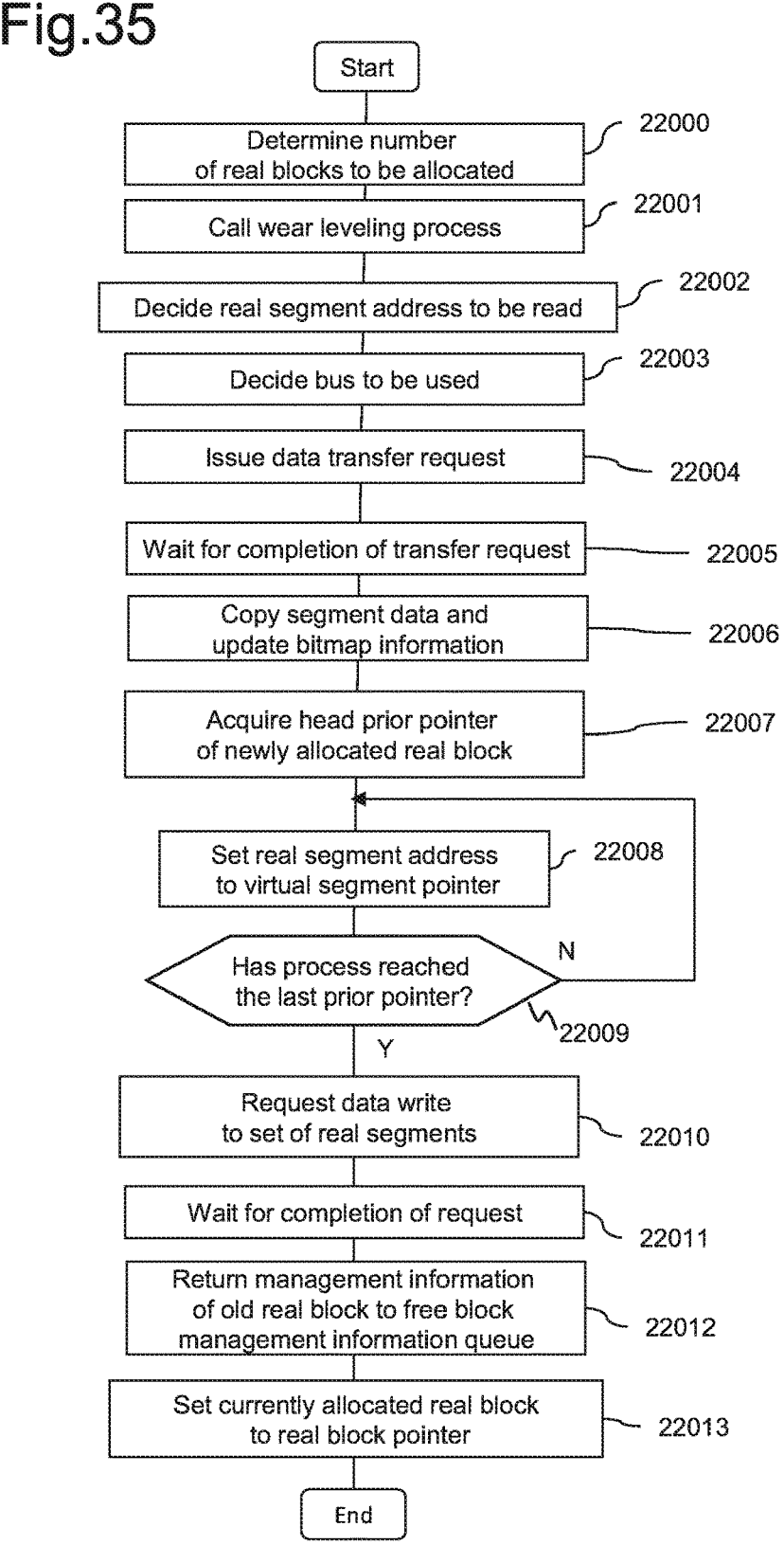
FIG. 35 is a view showing the flow of processing of a real block group replace process unit according to the present embodiment.

Step 14016: A real block replace process unit 12200 shown in FIG. 35 is called, a new real block is allocated, and only the valid real segment is stored. Thereafter, the procedure returns to step 14008.

The queue delete process 12600 shown in FIGS. 32 and 33 execute processes to dequeue the processing target virtual segment from a simplified synonym queue 2100, the synonym queue 1900 and the deduplication queue 1800.

Step 20000: At first, whether the forward deduplication pointer 3208 corresponding to the relevant virtual segment is NULL or not is checked. If it is NULL (Step 20000: Y), the procedure jumps to Step 20003. If it is not NULL (Step 20000: N), the procedure advances to Step 20001.

Step 20001: A process is executed to remove the relevant virtual segment from the deduplication queue 1800. Thereafter, the backward deduplication pointer 3207 and the forward deduplication pointer 3208 of the relevant virtual segment are set to NULL. Thereafter, the process is ended.

Step 20003: Whether the backward deduplication pointer 3207 is NULL or not is checked. If it is not NULL (Step 20003: N), the procedure jumps to Step 20005. If it is NULL, the procedure advances to Step 20004.

Step 20004: The information on the real segment corresponding to the relevant virtual segment is updated. Specifically, in the real segment bitmap 3305 within the real block information 3300 which is the management information of the real block storing the real segment corresponding to the relevant virtual segment, the bit corresponding to the relevant virtual segment is set to OFF. Further, the prior pointer 3306 corresponding to the relevant bit turned to OFF is set to NULL. The virtual segment pointer 3205 corresponding to the relevant virtual segment is set to NULL.

With reference to FIG. 19, a specific example of the operation of management information (real block information 3300 and virtual segment pointer 3205) performed in Step 20004 will be explained (Since FIG. 19 illustrates a case where the virtual segment is connected to the deduplication queue 1800, it differs from the state of the virtual segment to be processed in Step 20004, but in the following, the operation will be descried based on the assumption that the head (0th) virtual segment pointer 3205 within the virtual block group information 3200a is not connected to the deduplication queue 1800).

In FIG. 19, the head (0th) virtual segment pointer 3205 within the virtual block group information 3200a points to the second real segment within a certain real block. Also, the second bit of the real segment bitmap 3305 in the real block information 3300 corresponding to this real block is set to ON, and the second prior pointer points to the 0th virtual segment pointer 3205 (denoted as "virtual segment pointer (0th)" in the drawing). In Step 20004, if the virtual segment pointer 3205 of the "relevant virtual segment" is the head (0th) virtual segment pointer 3205 in the virtual block group information 3200a in FIG. 19, then in Step 20004, a process is performed to set the bit in the real segment bitmap 3305 corresponding to the real segment that the head (0th) virtual segment pointer 3205 points to (second bit in the real segment bitmap 3305 in FIG. 19) to OFF. Further, a process is performed to set the prior pointer corresponding to the second bit in the real segment bitmap 3305 (second prior pointer 3306 in the real block information 3300 in FIG. 19) to NULL. Further, a process is performed to set the head (zeroth) virtual segment pointer 3205 to NULL.

After these processes are completed, the procedure jumps to Step 20006.

Step 20005: A pointer to the virtual segment pointed to by the backward deduplication pointer 3207 corresponding to the current processing target virtual segment (address in the package memory 320 storing the virtual segment pointer 3205 corresponding to the virtual segment) is set to the prior pointer 3306 of the real segment corresponding to the current processing target virtual segment (prior pointer in a real block management information 3300 corresponding to the real block to which the real segment belongs).

With reference to FIG. 19, a specific example of an operation of the management information carried out in Step 20005 is explained. It is assumed that the virtual segment pointer corresponding to the processing target virtual segment in Step 20005 is the head (0th) virtual segment pointer 3205 in the virtual block group information 3200a. In that case, in Step 20005, the second prior pointer 3306 within the real block information 3300 in FIG. 19 (in FIG. 19, it is in a state pointing to the head (0th) virtual segment pointer 3205 in the virtual block group information 3200a) is changed to point to the virtual segment pointed to by the backward deduplication pointer 3207 corresponding to the processing target virtual segment (in the example of FIG. 19, it is the next (1st) virtual segment from the head virtual segment within the virtual block group information 3200b). Specifically, the package memory 320 address storing the virtual segment pointer (1st) 3205 in the virtual block group information 3200b is set to the prior pointer 3306.

Step 20006: Whether the relevant forward synonym pointer 3208 is NULL or not is checked. If it is NULL (Step 20006: Y), the procedure jumps to Step 20010.

Step 20007: In the determination of Step 20006, if a forward synonym pointer 3208 is not NULL (Step 20006: N), Step 20007 is executed. In Step 20007, whether the backward synonym pointer 3209 of the relevant virtual segment is NULL or not is checked. If it is NULL, the procedure jumps to Step 20009.

Step 20008: In the determination of Step 20007, if the backward synonym pointer 3209 is not NULL (Step 20007: N), the procedure executes Step 20008. In Step 20008, the relevant virtual segment is removed from the deduplication queue 1800 and the synonym queue 1900, and the virtual segment pointed to by the backward deduplication pointer 3207 of the relevant virtual segment is connected to the synonym queue 1900 to which the relevant virtual segment was connected. Further, the forward deduplication pointer 3208 of the virtual segment pointed to by the backward deduplication pointer 3207 of the relevant virtual segment is set to NULL. Thereafter, the backward deduplication pointer 3207 and the forward deduplication pointer 3208 of the relevant virtual segment is set to NULL. Thereafter, the backward synonym pointer 3209 and the forward synonym pointer 3210 of the relevant virtual segment is set to NULL. Then, the present process is ended.

In Step 20009: A process to remove the relevant virtual segment from the deduplication queue 1800 is executed. Thereafter, the backward deduplication pointer 3207 and the forward deduplication pointer 3208 of the relevant virtual segment are set to NULL. Then, the present process is ended.

In Steps 20008 and 20009, there are cases where the processing target virtual segment is not connected to the deduplication queue. In that case, there is no need to perform a process to remove the virtual segment from the deduplication queue.

Step 20010: Whether both the backward deduplication pointer 3207 of the relevant virtual segment and the backward synonym pointer 3209 of the relevant virtual segment are NULL or not is checked. If so, the procedure jumps to Step 20016.

Step 20011: Whether the backward deduplication pointer 3207 of the relevant virtual segment is NULL or not is checked. If it is NULL, the procedure jumps to Step 20015.

Step 20012: Whether the backward synonym pointer 3209 of the relevant virtual segment is NULL or not is checked. If it is NULL, the procedure jumps to Step 20014.

Step 20013: The relevant virtual segment is removed from the deduplication queue 1800, the synonym queue 1900 and the simplified synonym queue 3550, and the virtual segment pointed to by the backward deduplication pointer 3207 of the relevant virtual segment is connected to the position in the simplified synonym queue 3550 and the synonym queue to which the relevant virtual segment has been connected. Further, the forward deduplication pointer 3208 of the virtual segment pointed to by the backward deduplication pointer 3207 of the relevant virtual segment is set to a NULL value. Thereafter, the backward deduplication pointer 3207 and the forward deduplication pointer 3208 of the relevant virtual segment are set to a NULL value. Thereafter, the backward synonym pointer 3209, the forward synonym pointer 3210, the backward simplified synonym pointer 3211 and the forward simplified synonym pointer 3212 of the relevant virtual segment are set to NULL. Then, the process is ended.

Step 20014: The relevant virtual segment is removed from the deduplication queue 1800 and the simplified synonym queue 3550, and the virtual segment pointed to by the backward deduplication pointer 3207 of the relevant virtual segment is connected to the position in the simplified synonym queue 3550 to which the relevant virtual segment has been connected. Further, the forward deduplication pointer 3208 of the virtual segment pointed to by the backward deduplication pointer 3207 of the relevant virtual segment is set to NULL. Thereafter, the backward deduplication pointer 3207 and the forward deduplication pointer 3208 of the relevant virtual segment are set to NULL. Then, the backward simplified synonym pointer 3211 and the forward simplified synonym pointer 3212 of the relevant virtual segment are set to NULL. Thereafter, the process is ended.

Step 20015: The relevant virtual segment is removed from the simplified synonym queue 3550 and the synonym queue 1900, and the virtual segment pointed to by a backward synonym pointer 3210 of the relevant virtual segment is connected to the position in the simplified synonym queue 3550 to which the relevant virtual segment has been connected. The forward synonym pointer 3210 of the virtual segment pointed to by the backward synonym pointer 3210 of the relevant virtual segment is set to a NULL value. Thereafter, the backward synonym pointer 3209 and the forward synonym pointer 3210 of the relevant virtual segment are set to a NULL value. Then, the backward simplified synonym pointer 3211 and the forward simplified synonym pointer 3212 of the relevant virtual segment are set to NULL. Thereafter, the process is ended.

Step 20016: The relevant virtual segment is removed from the simplified synonym queue 3550. Then, the backward simplified synonym pointer 3211 and the forward simplified synonym pointer 3212 of the relevant virtual segment are set to NULL. Thereafter, the process is ended.

FIG. 34 is a flow of processing of the queue register process unit 12700 for registering (enqueuing) the relevant virtual segment to the simplified synonym queue 3550, the synonym queue 1900, or the deduplication queue 1800.

Step 21000: The received feature value is set to the virtual segment feature value 3206. Further, a simplified feature value is calculated based on the feature value. Various methods can be adopted as the method for calculating the simplified feature value. It is not necessarily required to perform a complex calculation such as a hash function, and for example, a method may be adopted where n bytes of data are extracted from a given position (such as the head) of the feature value, when the size of the simplified feature value is n bytes.

Step 21001: The simplified feature value table 3500 is referred to in order to check whether the simplified feature value pointer 3510 corresponding to the simplified feature value of the currently-written data is NULL or not. If it is not NULL (Step 21001: N), the procedure jumps to Step 21003.

Step 21002: The value of the simplified feature value pointer 3510 is changed to point to the virtual segment pointer 3205 of the relevant virtual segment (the address in the package memory 320 storing the virtual segment pointer 3205 is stored in the simplified feature value pointer 3510). Thereafter, the procedure returns to the call source (program having called the queue delete process, such as the data write process execution unit 12100), with the information notifying the call source that deduplication could not be executed.

Step 21003: Whether the virtual segment feature value 3206 of the virtual segment pointed to by the simplified feature value pointer 3510 is equal to the virtual segment feature value 3206 of the relevant virtual segment or not is checked (incidentally, the simplified feature value pointer 3510 directly points to the backward simplified synonym pointer 3211, but since the package processor 310 of the flash package 230 grasps the position within the virtual block group information 3200 of the backward simplified synonym pointer 3211 and the virtual segment feature value 3206 and the like, if the storage position of the backward simplified synonym pointer 3211 is determined by referring to the simplified feature value pointer 3510, the storage position of the virtual segment feature value 3206 and other information will also be determined). If the values are equal, the procedure jumps to Step 21006.

Step 21004: Whether the backward simplified synonym pointer 3211 of the virtual segment having referred to the feature value is NULL or not is checked. If it is not NULL (Step 21004: N), the procedure sets the virtual segment pointed to by the backward simplified synonym pointer 3211 to a next comparison target, and jumps to Step 21003.

Step 21005: If the determination result of Step 21004 is NULL (Step 21004: Y), it means that the process has reached the end of the simplified synonym queue 3550, so that information setting is performed to add the current write-target virtual segment to the tail of the simplified synonym queue 3550. Thereafter, the procedure returns to the call source with the information notifying the call source that deduplication could not be performed.

Step 21006: The real segment that the virtual segment pointer 3205 corresponding to the virtual segment found in Step 21003 points to is identified, and the address of the flash chip 300 in which the real segment is stored is identified (since the real block information (real block information 3300) corresponding to the relevant virtual segment and the relative address within the real block corresponding to the relevant virtual segment are stored in the virtual segment pointer 3205, so that the real segment can be substantially identified by these information: Further, the address of the flash chip 300 storing the segment can also be identified by the real block information 3300).

Step 21007: The procedure requests the transfer device 350 to read data from the address of the flash chip 300 specified in Step 21006, and waits for data to be transferred therefrom.

Step 21008: The procedure requests the comparison circuit 370 to compare the read value and the written data value. The procedure waits for the result.

Step 21009: If the result of comparison in Step 21008 is equal (Step 21009: N), the procedure jumps to Step 21012.

Step 21010: If the result of comparison in Step 21008 is not equal (Step 21009: Y), Step 21010 is executed. In S21010, it is determined whether the backward synonym pointer 3209 corresponding to the read virtual segment is NULL or not. If it is not NULL, the procedure sets the virtual segment pointed to by the backward synonym pointer 3209 as the next comparison target, and jumps to Step 21006.

Step 21011: If the determination of Step 21010 is NULL, it means that the end of the synonym queue 1900 has been reached, so that the procedure executes information setting to add the current write-target virtual segment to the tail of the synonym queue 1900. Thereafter, the procedure returns to the call source with the information notifying the call source that deduplication could not be performed.

Step 21012: In this case, deduplication can be performed. Whether the backward deduplication pointer 3207 of the virtual segment read in Step 21007 is NULL or not is checked, and if it is not NULL, the virtual segment at the tail of the deduplication queue to which the virtual segment having been read belongs is found by following the backward deduplication pointer 3207 of the virtual segment having been read. The information stored in the virtual segment pointer 3205 of the virtual segment at the end of the deduplication queue is copied to the virtual segment pointer 3205 of the write-target virtual segment. Thereby, for example as shown in FIG. 28, if the current write-target virtual segment is virtual segment # (s−1) of the virtual block group #0 and the content of data of the relevant virtual segment is the same as that of virtual segment #1, the virtual segment pointer 3205 of the virtual segment # (s−1) will point to the same real segment as the virtual segment pointer 3205 of virtual segment #1, so that it means that the deduplication process has been performed. Further, the write-target virtual segment is added to the end of the deduplication queue. Thereafter, the procedure returns to the call source with the information notifying the call source that deduplication could not be performed.

FIG. 35 is the flow of processing of the real block group replace process unit 12200. The real block group replace process unit executes a process to replace the real block group allocated to a virtual block group with a different set of real blocks. This process is executed when there are no free areas in m+1 real blocks. Another reason for allocating a different real block is to reduce the deviation of the number of erases of real blocks. This process is called wear leveling process.

Step 22000: In the present step, a different real block group is allocated to the relevant virtual block group. The number of real blocks to be allocated is determined as follows. At first, the real block information 3300 of the real blocks allocated to the relevant virtual block group are specified. Then, to calculate the number of real segments, the number of ON bits in the real segment bitmaps 3305 of the respective real block information 3300 is counted up, and based on the calculated number of real segments, the number of real blocks to be allocated is computed (for example, the number of real segments divided by the number of real segments storable in one real block should be calculated). When the calculated value is zero, the number of real block to be allocated is regarded as 1.

Step 22001: In this step, the procedure calls a wear leveling process unit to decide the real block, wherein the number of necessary real blocks is used as the input value. From the wear leveling process unit, the procedure receives the same number of addresses of the real block information 3300 of real blocks storing write data as the input value. It is assumed that these real blocks are in an erased state and in the state that data can be immediately written thereto. Further according to the present embodiment, the wear leveling process unit presupposes a conventional technology used in the conventional flash memory storages, so that it will not be described in detail here.

Step S22002: Here, valid data is read from the set of real blocks having been allocated to the relevant virtual block group. The real segments whose real segment bitmap 3305 is set to ON are read to the buffer. Therefore, an address list is generated from the set of these real segment addresses to show whether they should be transferred to the buffer. However, if the set of real segment addresses is an empty set, the procedure is ended and returned. Incidentally, in the example described above, the valid data, that is, the real segment being the read target, is selected by referring to the real segment bitmap 3305, but as another method, it is also possible to select the read-target real segment by referring to the prior pointer 3306.

Step 22003: By accessing the chip information 3100 of the flash chip 300 corresponding to the relevant real block based on the real block identifier 3301 of the real block information 3300 specified in Step 2200, the procedure identifies the package bus 340 to which the relevant flash chip 300 is connected, and recognizes the corresponding package bus transfer device 350.

Step 22004: The procedure instructs the address of the flash chip 300 from which data should be read to the buffer 330 based on the instruction information generated in Step 22002 to the package bus transfer device 350 recognized in Step 22003. In the present embodiment, 8-byte assurance code including the 2-byte feature value per 512-byte data is also read to the buffer 330 with respect to the real segment.

Step 22005: Thereafter, the procedure waits for the completion of data read to the buffer 330.

Step 22006: The prior pointers 3306 corresponding to the real segment having the real segment bitmap 3305 set to ON are copied sequentially from the head to the prior pointers 3306 of the set of real blocks being currently allocated. Further, as many real segment bitmaps 3305 of the set of real blocks being currently allocated as the number of real segments that have been read are set to ON from the head.

Step 22007: The prior pointer 3306 at the head of the real block being currently allocated is recognized.

Step 22008: The virtual segment pointed to by the prior pointer 3306 is recognized, and the relevant real segment address (the real block identifier of real block to which the relevant real segment belongs and the relative address within the relevant real block) is set to the virtual segment pointer 3205 of the relevant virtual segment. If the relevant virtual segment is connected to the deduplication queue 1800, the address of the relevant real segment is also set to the virtual segment pointer 3205 of the other virtual segment belonging to the deduplication queue 1800 to which the relevant virtual segment is connected.

Step 22009: The procedure checks whether the last prior pointer has been reached or not, and if not reached, the procedure jumps to 22008 where the next prior pointer 3306 is set as the processing target.

Step 22010: The procedure instructs to write data from the buffer 330 to the set of real segments having the real segment bitmap 3305 set to ON. Further, according to the present embodiment, the 8-byte assurance code including the 2-byte feature value is also written per 512 bytes of data to the real segment.

Step 22011: Thereafter, the procedure waits for the completion of writing of data from the buffer 330.

Step 22012: The real block information 3300 corresponding to the real block having been allocated to the relevant virtual segment group is returned to the free block management information queue 1700. Further, at this time, the necessary information of the corresponding real block information 3300 is initialized.

Step 22013: The information of the currently-allocated real blocks is set to the real block information pointers 3202 of the virtual block group information 3200 corresponding to the relevant virtual block group. Thereafter, the process is ended.

Figure 36:
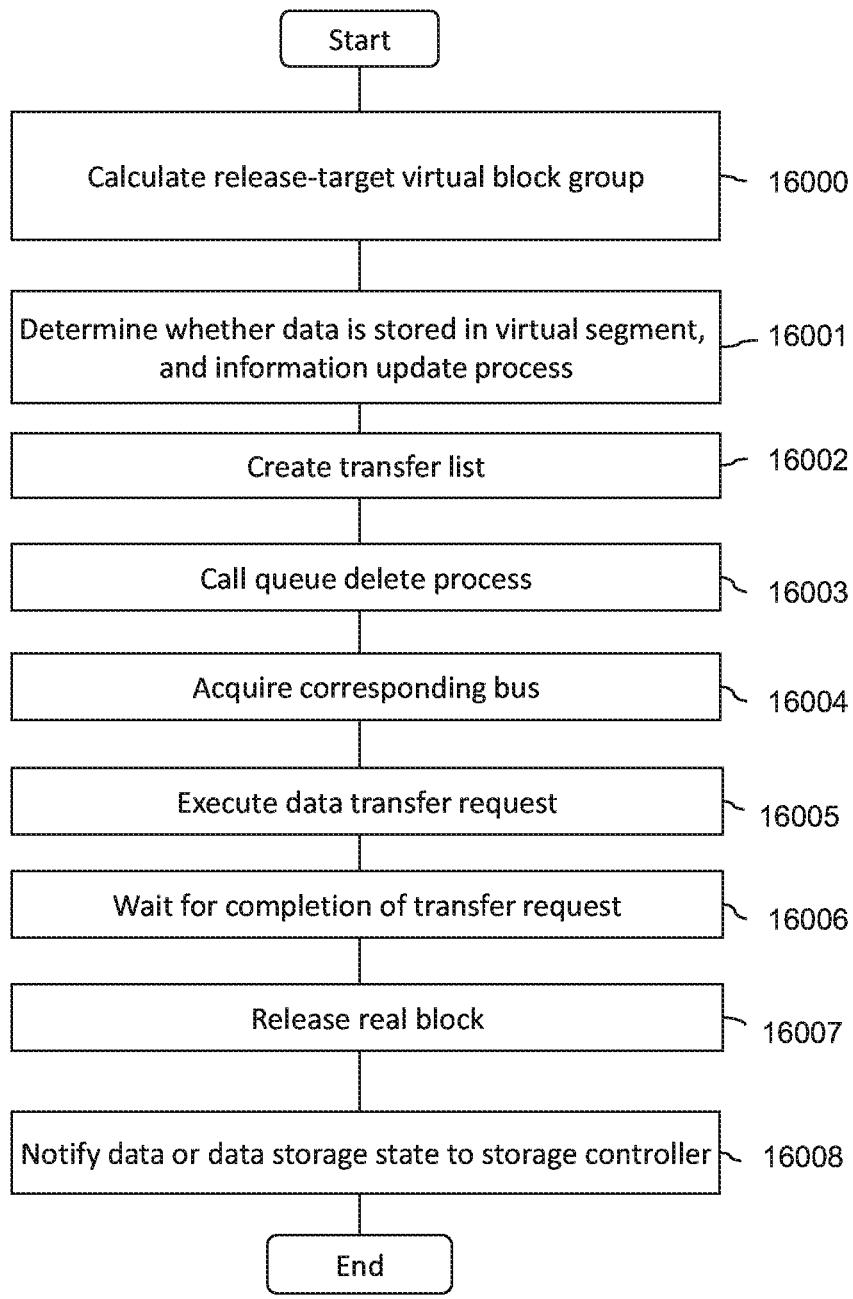
FIG. 36 is a view showing the flow of processing of a virtual block transfer process execution unit according to the present embodiment.

FIG. 36 is the flow of processing of the virtual block transfer process execution unit 12300. The virtual block transfer process execution unit 12300 is a process executed when an instruction to transmit data stored in the designated set of virtual segments is received from the storage controller 200. In the present process, an instruction related to all virtual segments included in the real page is received from the storage controller 200. Since the transfer instruction is performed in virtual segment units, there is no request to transfer a portion of the segments in a virtual block group.

Step 16000: The set of virtual block groups to which release is instructed are identified.

Step 16001: Information to be sent to the storage controller 200 is edited. Specifically, if the virtual segment pointers 3205 of the virtual segment groups are NULL regarding all designated virtual block groups, information showing that data is not stored is set as the information to be sent to the storage controller 200, and if they are not NULL, information showing that data is stored is set as the information to be sent to the storage controller 200. Further, if data is stored, the feature value stored in the virtual segment feature value 3206 is set as information to be sent to the storage controller 200. Further, the total value of the amount of data stored in the addresses pointed to by the virtual segment pointers 3205 storing a non-NULL value is subtracted from the amount of stored package data 3006. Further, the total value of the virtual segment size after performing the deduplication process of the addresses pointed to by the virtual segment pointers 3205 storing a non-NULL value (if there are same addresses, they are gathered as one) is calculated, and this value is subtracted from the amount of stored package data after deduplication 3007.

Step 16002: A transfer list showing the chip ID from which data is read and the relative address within the chip is created from the real segments pointed to by all the virtual segment pointers 3205 storing a non-NULL value.

Step 16003: Since the virtual segments storing a non-NULL value are removed from the simplified synonym queue 3550, the synonym queue 1900, and the deduplication queue 1800, the queue delete process unit 12500 shown in FIGS. 32 and 33 is called for each virtual segment.

Step 16004: The chip information 3100 corresponding to the flash chip 300 storing the real segments pointed to by all non-NULL virtual segment pointers is accessed, so as to identify the package bus 340 to which the relevant flash chip 300 is coupled, and to recognize the corresponding package bus transfer device 350.

Step 16005: A request to transfer data to the buffer 330 from the data transfer target flash chip 300 (specified in Step 16004) is issued to the package bus transfer device 350 recognized in Step 16004. A transfer list (generated in Step 16002) with respect to the data transfer target flash chip 300 is included in this request. In the present embodiment, the 8-byte assurance code including the 2-byte feature value per 512 bytes of data is also read to the buffer 330 in the real segments according to the present invention.

Step 16006: The procedure waits for completion of the transfer.

Step 16007: In the present step, the real block information 3300 corresponding to all real blocks having been allocated to all corresponding virtual block groups is returned to the free real block information queue 1700.

Step 16008: The data stored in the buffer 330 is sent to the storage controller 200. At first, information showing whether data is stored or not is sent for each virtual segment. Also, if data is stored, this data and the 8-byte assurance code are sent.

Figure 37:
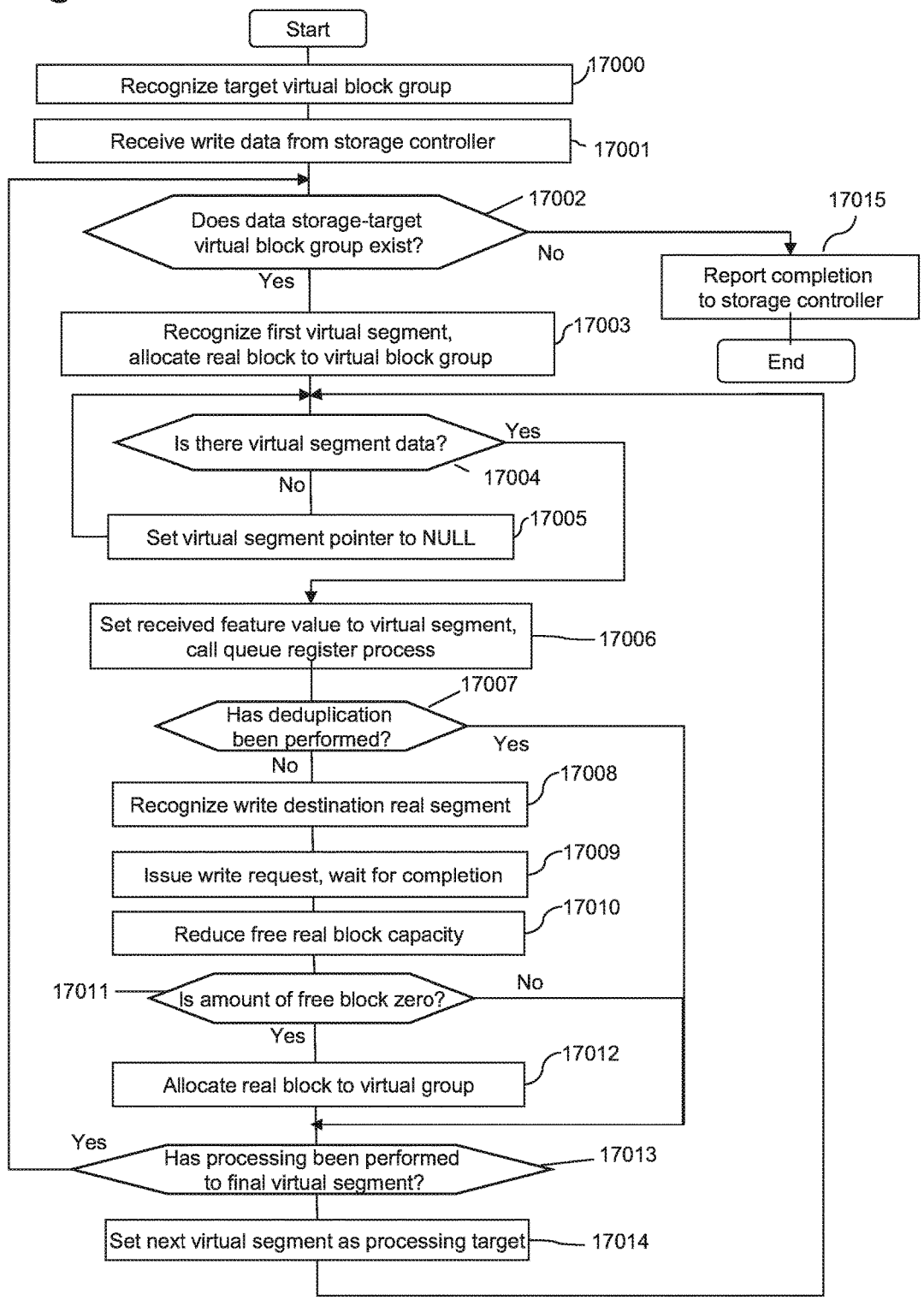
FIG. 37 is a view showing the flow of processing of a virtual block storage process execution unit according to the present embodiment.

FIG. 37 is the flow of processing of a virtual block storage process execution unit. The virtual block store process execution unit 12400 is a process executed when a request to allocate real blocks to each of the designated virtual blocks and to store the data sent from the storage controller 200 is received from the storage controller 200. The present processing has many points in common with the virtual block transfer process execution unit 12300 having an opposite flow of data, so that the present processing is described by referring to the respective steps of the flow of processing illustrated in FIG. 36.

Step 17000: Similar to Step 16000, the target virtual block group is recognized based on the set of virtual segments which are designated to store data.

Step 17001: The flash package 230 receives the following information from the storage controller 200. Regarding these information, the value showing whether data is stored or not for each virtual segment among the set of designated virtual segments is received in the buffer. If data is stored, data is received by a write command where the 520-byte data including the 8-byte assurance code is a unit of data transfer. Further, the 2-byte data showing the feature value is taken out from the assurance code and stored in the buffer. In this case, since the data showing the feature value exist in 520-byte units, if the virtual segment length (excluding the assurance code portion) is 8 KB, a total of 32-byte feature value will be stored, and if the virtual segment length is 4 KB, a total of 16-byte feature value will be stored. However, a portion of the feature values can be stored instead of storing all the feature values having been taken out. Next, the designated virtual segments are classified per virtual block group.

Step 17002: The procedure searches for a virtual block group designated to store data. If there is no more virtual block group, the procedure jumps to Step 17015.

Step 17003: The first virtual segment of the virtual block group is recognized as the processing target. Further, at this time, one real block is allocated to the relevant virtual block group. Further, the capacity of the real block is set to the free capacity in real block 3304.

Step 17004: A check is performed on whether the information received from the storage controller 200 of the processing target virtual segment shows that data is not stored. If data is stored, the procedure jumps to Step 17006.

Step 17005: In the present step, the virtual segment pointer 3205 of the corresponding virtual segment is set to a NULL value. Thereafter, the next virtual segment is recognized as the processing target, and the procedure jumps to step 17004.

Step 17006: The received feature value is set to the virtual segment feature value 3206 of the relevant virtual segment. Further, the size of the relevant virtual segment is added to the amount of stored package data 3006. Further, the queue register process shown in FIG. 34 is called to execute the process to register the relevant virtual segment to the simplified synonym queue 3550, the synonym queue 1900 or the deduplication queue 1800, and to execute the deduplication process.

Step 17007: The result of the queue register process executed in Step 17006 is received, and if a notice is received stating that deduplication has been done, the procedure jumps to Step 17013. If a notice stating that deduplication has not been done, the procedure advances to Step 17008.

Step 17008: The data of the corresponding virtual segment is written. Here, the address where the data is to be written this time (the chip ID 3101 and the relative address within the flash chip 300) is determined based on the real block address of the corresponding real block and the free real block capacity. This address is set to the virtual segment pointer 3205 of the relevant virtual segment. Further, the address of the relevant virtual segment address is set to the prior pointer 3306 corresponding to the real segment to which the data is written. Further, the real segment bitmap 3305 corresponding to the real segment to which the data is written is turned to ON.

Step 17009: The write request is set to the transfer device to write data in the buffer 330 to the real segment in the real block, and completion thereof is waited. In the present embodiment, the 8-byte assurance code including the 2-byte feature value is also written to the real segment in each 512-byte data.

Step 17010: The free capacity in real block 3304 corresponding to the relevant real block is decreased. Further, the size of the relevant virtual segment is added to the amount of stored package data after deduplication 3007.

Step 17011: Whether the free capacity in real block 3304 of the corresponding real block is zero or not is checked. If it is not zero, the procedure jumps to Step 17013.

Step 17012: In the current step, a new real block is allocated to the relevant virtual block group. Then, the value of capacity of the real block is stored in the free capacity in real block 3304 of the real block information 3300 corresponding to the real block allocated to the virtual block group.

Step 17013: Whether the processing has been completed to the last virtual segment of the relevant virtual block group or not is checked. If so, the procedure returns to Step 17002.

Step 17014: The procedure recognizes the next virtual segment as the processing target, and returns to Step 17004.

Step 17015: A completion report is sent to the storage controller 200, and the process is ended.

Figure 38:
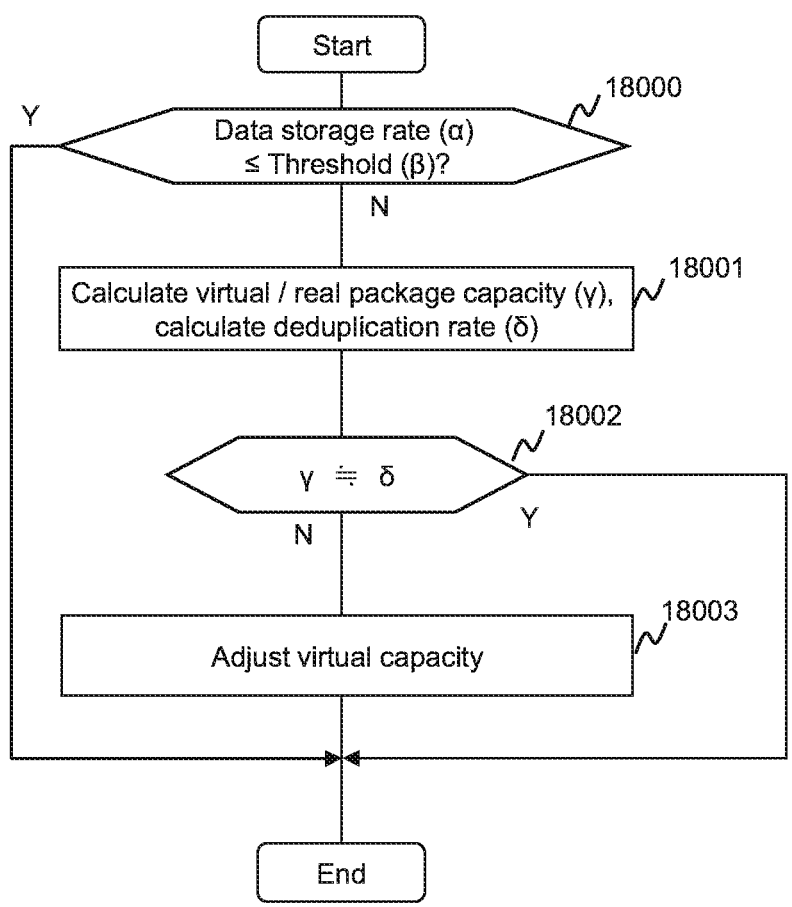
FIG. 38 is a view showing the flow of processing of a virtual capacity judging process unit according to the present embodiment.

FIG. 38 is the flow of processing of the virtual capacity judging process unit 12500. The present procedure checks the deduplication rate, and determines whether it is necessary to adjust the virtual capacity of the relevant package 300 (virtual package capacity 3002) or not. If it is determined that adjustment is necessary, the capacity thereof is determined and set to the virtual package capacity 3002. Furthermore, it returns the capacity and that the capacity has been changed to the call source.

Step 18000: The value of the amount of stored package data 3006/virtual package capacity 3002 is calculated, and the calculated value is set as α (α is the data storage rate). If this value is equal to or smaller than β (β is sufficiently small), the procedure decides that not much data is stored, and returns to the call source without performing adjustment.

Step 18001: Next, the value of the virtual package capacity 3002/real package capacity 3003 is calculated, and the calculated value is set as γ (called virtual/real package capacity ratio). Further, the value of the amount of stored package data 3006/amount of stored package data after deduplication 3007 is calculated, and the value is set as δ. In the present specification, δ is referred to as deduplication rate.

Step 18002: The values of γ and δ are compared. If they are substantially equal, it means that a ideal virtual package capacity 3002 is set, so that the procedure returns to the call source without performing adjustment. If γ>(δ+threshold 1) (if the virtual capacity is too large), or if γ<(δ−threshold 2) (if the virtual capacity is too small), the procedure advances to step 18003, where the virtual package capacity 3002 is adjusted. Threshold 1 and threshold 2 can be the same value or different values.

Step 18003: In the present step, the virtual capacity is adjusted (changed). The value of the virtual capacity after adjustment is, for example, real package capacity*δ. This will be the ideal value if the deduplication rate δ does not change in the future. However, instead of the method for immediately changing the virtual capacity value to this ideal value, it is possible to adopt a method of setting (real package capacity−amount of stored data in package after deduplication 3007)*γ+amount of stored data in package after deduplication 3007∗δ as the virtual capacity. The determined virtual capacity value is set to the virtual package capacity 3002, and then the information that virtual capacity adjustment is performed and the determined value are notified to the call source, before the process is ended.

According to the first embodiment, in the large-capacity storage system having a large number of flash packages, each of which is equipped with a large number of flash memories and has a deduplication function, the feature value is calculated by the storage controller and transmitted to the flash package. Therefore there is no need to calculate the feature value requiring a complex calculation in the flash packages, and a low-overhead deduplication process is enabled. Further, since the feature values are transmitted and received using the data format and commands standardized via SCSI standards, there is no need to implement a new interface for transmitting and receiving feature values. Furthermore, since the flash package provides a greater storage space (virtual capacity) than the physical storage area to the storage controller by using a lower-level capacity virtualization technology, when the usable storage area is increased by the deduplication process, the increased virtual capacity will be notified to the storage controller. Therefore the storage controller can effectively utilize the storage space saved by the deduplication process.

Embodiment 2

Next, the second embodiment of the present invention will be described. The hardware configurations of the information system, the storage system, and the flash package according to Embodiment 2 are the same as the first information system. However, the storage system 200 according to the second embodiment differs from the storage system 200 of the first embodiment in that the flash package 230 does not constitute a flash package group 280.

Also according to the storage system 200 of the second embodiment, the flash package 230 has a deduplication function, but in the second embodiment, the storage controller 200 improves the deduplication rate by appropriately controlling the data storage destination. Specifically, the storage controller 200 calculates the feature value of the data to be written, and based on the calculated feature value, determines the flash package 230 which is the data storage destination. For example, if a plurality of data having the same features values of the write data is stored in the same flash package 230, the deduplication rate can be improved.

Also according to the second embodiment, the storage system 100 has a hierarchical capacity virtualization function.

Also according to the present embodiment, the storage media within the storage system are all flash packages 230, but the present embodiment is also effective when HDD or other storage media are included. Further, it is assumed that the capacities of the flash packages 230 are all equal according to the present embodiment. According to the present embodiment, if the hash value or feature value of newly written data is equal to the hash value or feature value of the already-stored data in the flash package 230, the value of the stored data is compared with that of the data to be newly stored, and if the values are equal, the newly received data will not be stored. Thereby, a capacity reduction effect can be achieved. If the values are not equal, the newly received data is written to a different area. In the second embodiment, the hash value or feature value used by the flash package 230 can either be received from the storage controller 200, or be calculated by the flash package 230.

In the present embodiment, the flash package 230 is recognized as one storage device from the storage controller 200. Therefore, in order to realize high reliability, the storage controller 200 is provided with a RAID function so as to enable data recovery of the flash package 230, even if a flash package 230 fails. However, according to the second embodiment, a group of segments including the n pieces of data in segment units and the parities generated from the n pieces of data (hereinafter referred to as RAID segment group) are stored in different flash packages 230, but the store-destination flash package 230 is decided for each RAID segment group, considering the feature values of the segments. Therefore, according to the storage system of the second embodiment, there is no concept of configuring a RAID group by multiple flash packages 230, in other words, there is no concept of a flash package group 280 (and management information) as in the storage system 100 according to the first embodiment.

Figure 41:
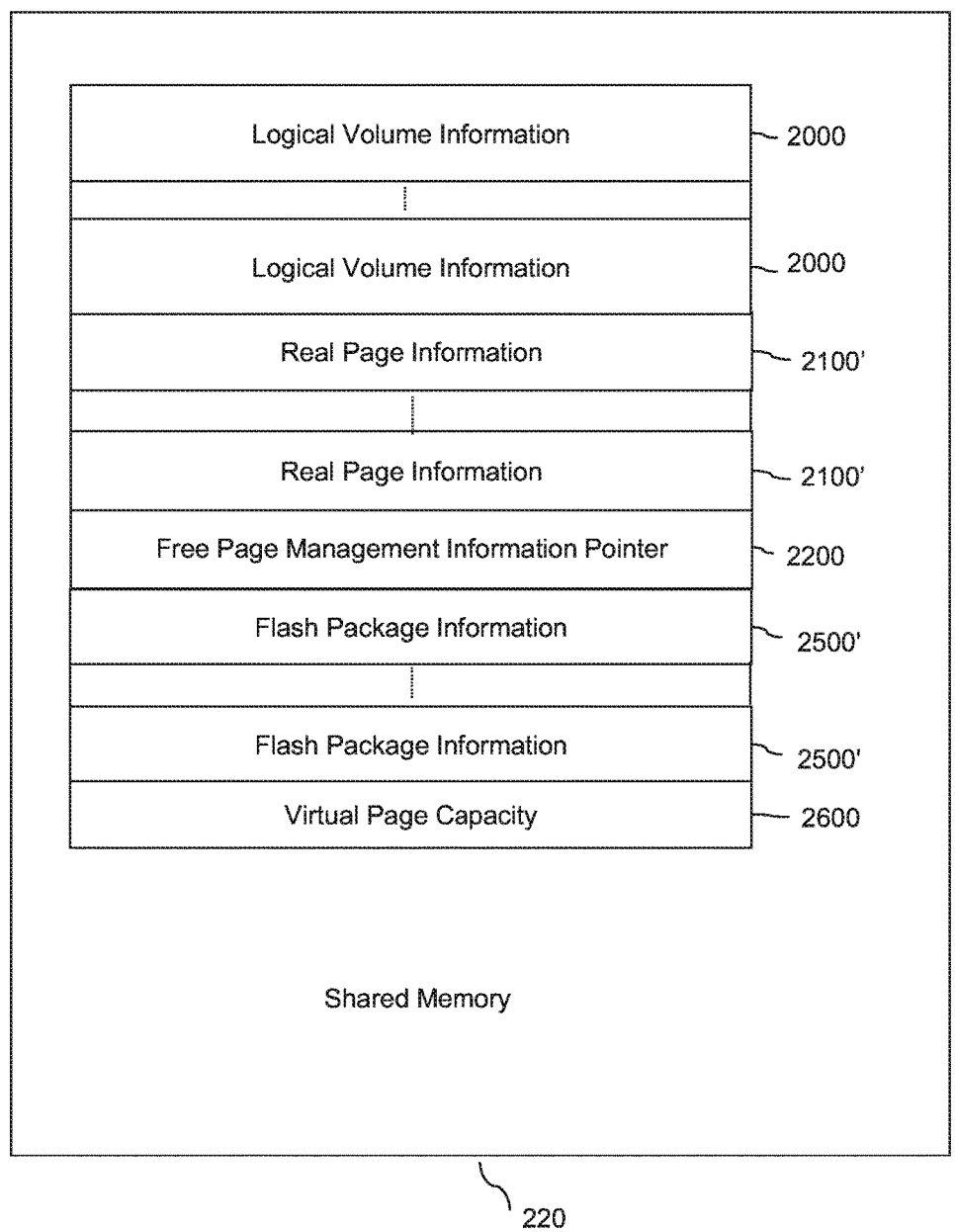
FIG. 41 is a view showing information for performing higher-level control stored in a shared memory of a storage system according to the second embodiment.

FIG. 41 shows information related to the present embodiment within the shared memory 220 of the storage system 100 according to the second embodiment, which are composed of a logical volume information 2000, a real page information 2100', a free real page management information pointer 2200, a virtual RAID segment group address table 2300, a flash package information 2500', and a virtual page capacity 2600. These information are required to improve the higher-level capacity virtualization technology and deduplication rate in the storage controller 200.

In the present embodiment, the storage controller 200 is designed to support the higher-level capacity virtualization function. However, the present invention is effective even if the storage controller 200 does not have a higher-level capacity virtualization function. Normally, in the higher-level capacity virtualization function, the allocation unit of storage areas is called page. In the present embodiment, the logical volume space is divided by units called virtual pages. In conventional capacity virtualization function, when data is written to a virtual page, the real page in the actual storage media has been allocated. However, according to the present embodiment, since the flash package 230 for storing the virtual segment is determined based on the feature value in each virtual segment unit, the real page is also a logical space instead of actual storage media. Therefore, this logical virtual segment is called a logical virtual segment. Also according to the present embodiment, the real page includes redundancy data generated by the RAID function. Since the amount of redundancy data varies depending on RAID type, the capacity of the real page is determined in accordance with the RAID type (logical volume RAID type 2003 stored in the logical volume information) of the logical volume to which the real page is allocated, similar to the first embodiment.

Figure 42:
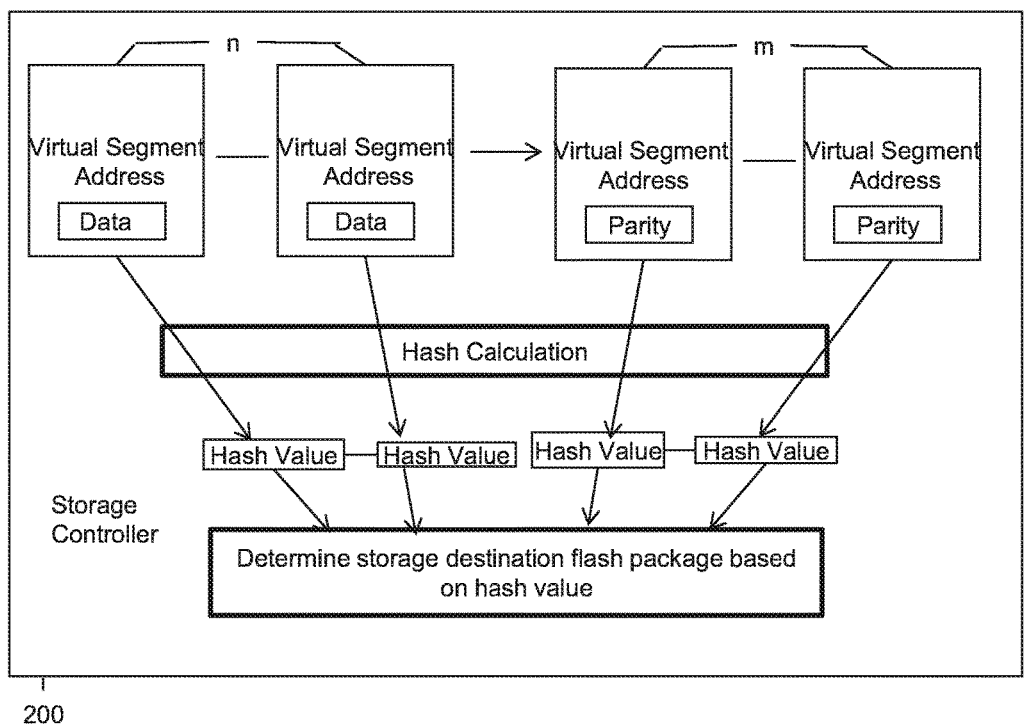
FIG. 42 is a view showing a concept of the second embodiment.

The basic concept of the second embodiment will be shown in FIG. 42. According to the first embodiment, k sets of n pieces of data (virtual segments) and m pieces of parities (virtual segments) generated from the n data are stored in the real page, wherein the real pages are stored in one flash package group 280 composed of (m+n) flash packages 230. Then, the n pieces of data and m pieces of parities are respectively stored in one flash package 230 (so as not to cause duplication) among the (m+n) flash packages 230 constituting the flash package group 280. The storage destination has been decided in a fixed manner.

In the second embodiment, the configuration of the real page, and that the flash package has the deduplication function is similar to the first embodiment. But the characteristic feature of the second embodiment is that the storage controller 200 decides the flash package 230 and the virtual segment storing data using the hash values or the feature values derived from the logical virtual segments including the one storing parity. Since the segments that can be subjected to deduplication have the same hash values or feature values, so that the deduplication rate can be improved by storing the virtual segments with the same hash values or feature values in the same flash package 230. However, from the viewpoint of reliability, each segment belonging to the same RAID segment group should be stored in different flash packages (so that data can be recovered from data stored in the flash packages that have not failed when failure occurs to a flash package). In the first embodiment, a physical area in the flash package 230 has been allocated to the real page. However, in the second embodiment, the real page is a logical area composed of a logical virtual segment storing data and a logical virtual segment storing redundancy data. As for the physical area, the storage controller 200 determines the virtual segment within the flash package 230 to be allocated to each logical virtual segment.

The format of the logical volume information 2000 of the second embodiment is similar to the first embodiment. Similar to the first embodiment, redundancy data such as parity is included in the real page. Further, similar to the first embodiment, the logical volume RAID type 2003 determines the number of sets of redundancy data to be generated from the number of sets of data. Here, n logical virtual segments storing data and m logical virtual segments storing redundancy data generated therefrom are stored in the real page, and further, n logical virtual segments storing data and m logical virtual segments storing redundancy data generated therefrom are stored in the next real page. In the second embodiment, one real page corresponds to one RAID segment group.

Figure 43:
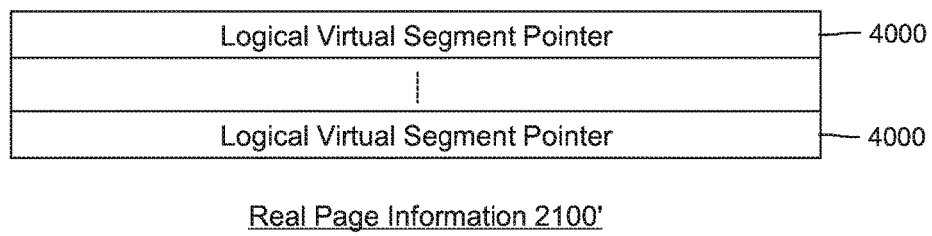
FIG. 43 is a view showing a format of the real page information according to the second embodiment.

FIG. 43 shows the format of the real page information 2100'. The real page information 2100' is the management information of the corresponding real page existing for each real page. The real page information is composed of a plurality of logical virtual segment pointers 4000. The number of the logical virtual segment pointers 4000 is the number of logical virtual segments included in the real page (when n logical virtual segments and m logical virtual segments are stored in the real page, the number of logical virtual segment pointers 4000 is (n+m)). When virtual segments within the flash package 230 are allocated to the real page, information showing which virtual segment in which flash package 230 is allocated is stored in the logical virtual segment pointer 4000. If a segment is not allocated, the information is NULL.

In the present embodiment, each flash package 230 has a capacity virtualization function, and apparently, a capacity greater than the actual physical capacity is provided to the storage controller 200.

Figure 44:
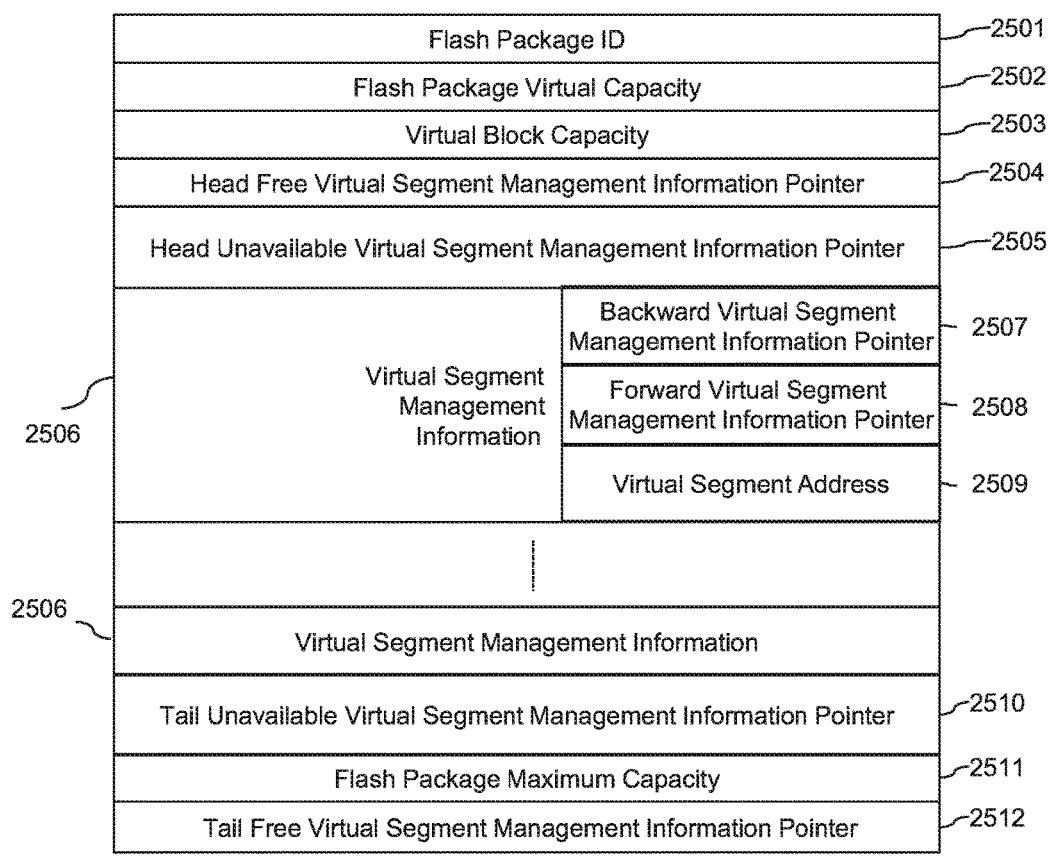
FIG. 44 shows a format of flash package information according to the second embodiment.

FIG. 44 is the format of the flash package information 2500'. The flash package information 2500' is composed of a flash package ID 2501, a flash package virtual capacity 2502, a virtual block capacity 2503, a flash package maximum capacity 2511, virtual segment management information 2506, a head free virtual segment management information pointer 2504, a tail free virtual segment management information pointer 2512, a head unavailable virtual segment management information pointer 2505, and a tail unavailable virtual segment management information pointer 2510.

The flash package ID 2501 is an identifier of the relevant flash package 230. The flash package virtual capacity 2502 denotes a virtual capacity of the relevant flash package 230. The virtual block capacity 2503 denotes a capacity of the virtual block of the relevant flash package 230. The flash package maximum capacity 2511 denotes a maximum virtual capacity that the relevant flash package 230 can have. The same number of the virtual segment management information 2506 is included as the number of virtual segments when the virtual capacity of the relevant flash package 230 becomes the maximum virtual capacity. The virtual segment management information 2506 is composed of a forward virtual segment management information pointer 2508, a backward virtual segment management information pointer 2507, and a virtual segment address 2509. The backward virtual segment management information pointer 2507 is a pointer for pointing to the subsequent virtual segment management information 2506. The forward virtual segment management information pointer 2508 is a pointer for pointing to the prior virtual segment management information 2506. The virtual segment address 2509 is an address where the relevant virtual segment is positioned (address in the storage space that the flash package provides to the storage controller 200), wherein this value and the flash package ID 2501 are set in the logical virtual segment pointer 4000 of the real page information 2100'.

Figure 45:
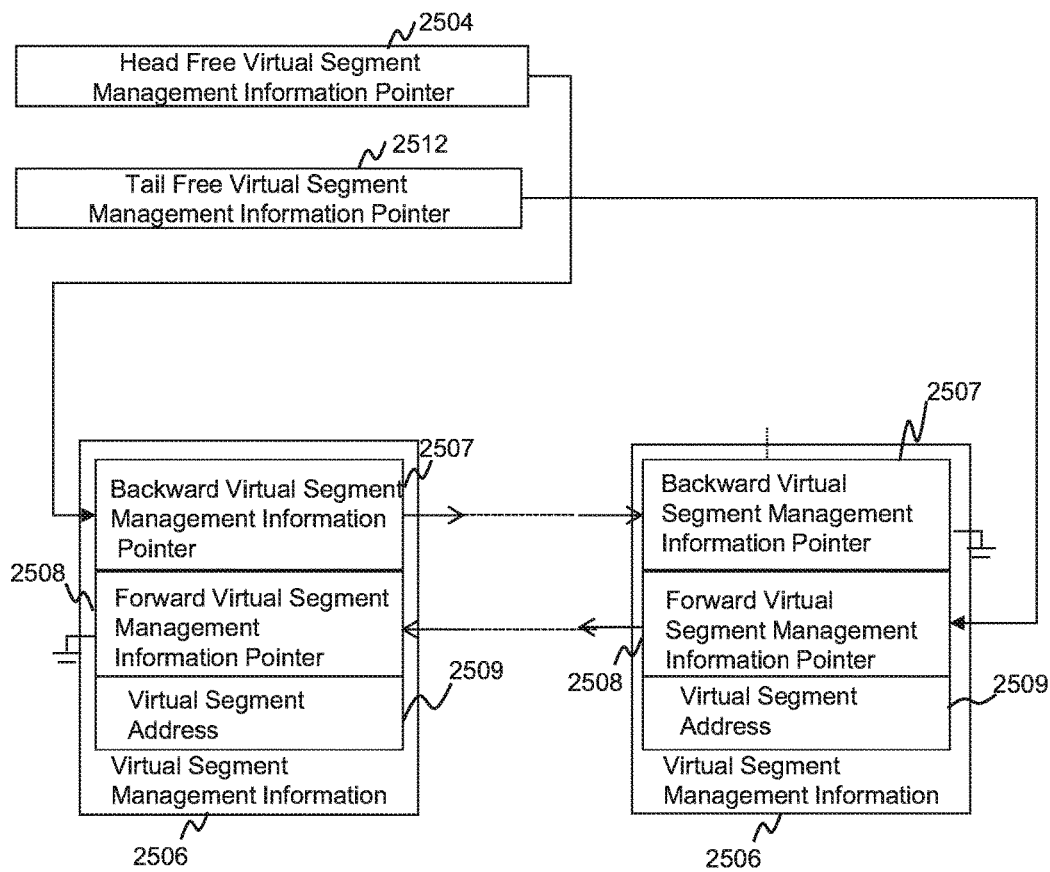
FIG. 45 is a view showing a configuration of a free virtual segment management information queue according to the second embodiment.

A free virtual segment management information queue 42000 illustrated in FIG. 45 shows the set of free virtual segment queues managed by the head free virtual segment management information pointer 2504 and the tail free virtual segment management pointer 2512 in the flash package information 2500'. The head free virtual segment management information pointer 2504 denotes an address of the first free virtual segment management information 2506. Next, the backward virtual segment management information pointer 2507 in the first virtual segment management information 2506 points to the next free virtual segment management information 2506. Furthermore, the tail free virtual segment management information pointer 2512 denotes the address of the tail free virtual segment management information 2506. The forward virtual segment management information pointer 2508 included in the tail free virtual segment management information 2506 points to the previous free virtual segment management information 2506. In FIG. 45, NULL is stored in the backward virtual segment management information pointer 2504 of the last free virtual segment management information 2506. NULL is also stored in the forward virtual segment management information pointer 2512 of the first free virtual segment management information 2506. Here, the virtual segment management information 2506 is returned to the tail of the queue when it is returned to the free virtual segment management information queue 42000, and the virtual segment management information 2506 is taken from the head of the queue when it is taken from the free virtual segment management information queue 42000. The reason for this is to make the wear leveling of the real blocks in the flash packages 230 easier.

Figure 46:
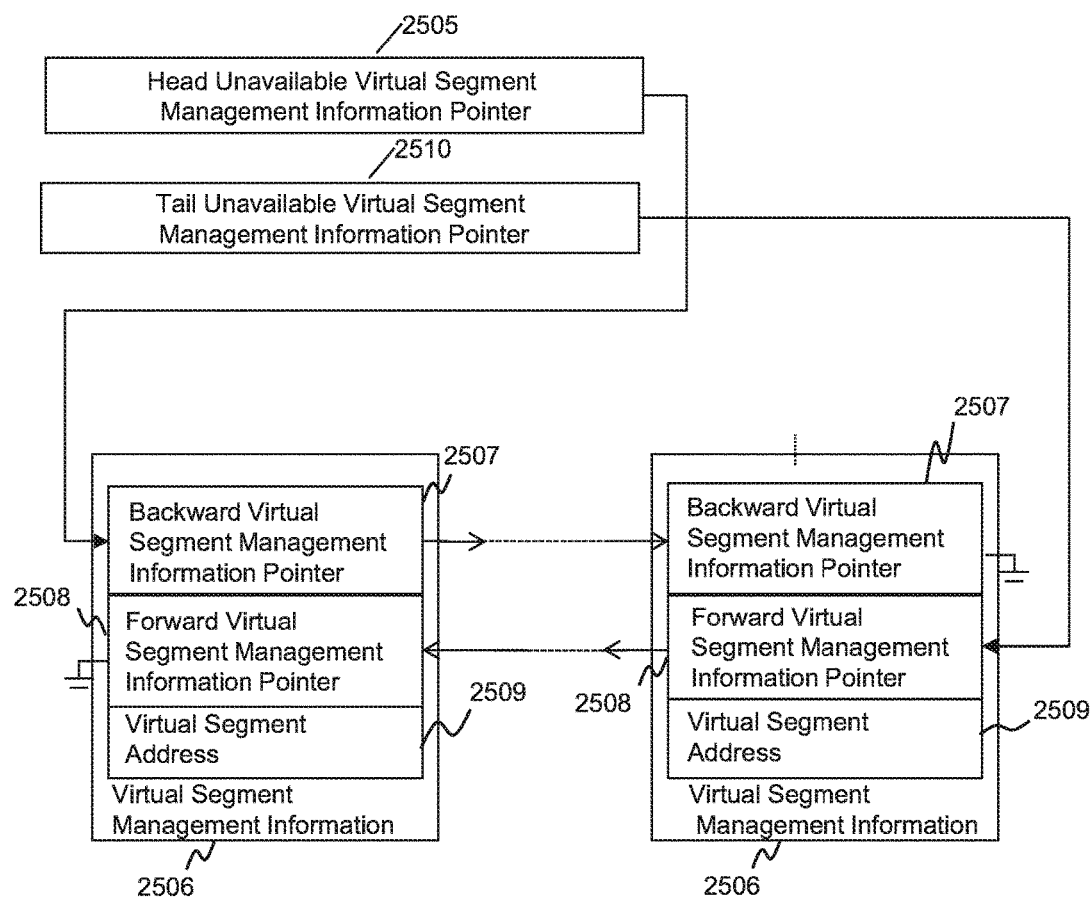
FIG. 46 is a view showing a configuration of an unavailable virtual logical segment queue according to the second embodiment.

An unavailable virtual segment management information queue 4300 illustrated in FIG. 46 shows a set of unavailable virtual segment information 2506 managed by the head unavailable virtual segment management information pointer 2505 and the tail unavailable virtual segment management information pointer 2510. The configuration thereof is the same as the free virtual segment management information queue 42000. When the physical free capacity of the flash package 230 is reduced, the corresponding number of virtual segment management information 2506 managed by the free virtual segment management information queue 42000 is moved to the unavailable segment management information queue 2701. In contrast, when the physical free capacity of the flash package 230 is increased, the corresponding number of virtual segment management information 2506 managed by the unavailable virtual segment management information queue 4300 is moved to the free virtual segment management information queue 42000. In the present invention, the storage controller 200 has the higher-level capacity virtualization function, and the flash package 230 has the lower-level capacity virtualization function. Therefore, even if the virtual capacity of the flash package 230 is changed, the system can cope with the situation simply by transferring the virtual segment management information 2506 in a manner described above. In the present example, when the virtual segment management information 2506 is returned to the unavailable virtual segment management information queue 4300, it is returned to the end of the queue, and when the virtual segment management information 2506 is taken out from the unavailable virtual segment queue 4300, it is taken from the head of the queue. This is for realizing wear leveling of real blocks of the flash packages 230.

The configuration of the free page management information queue in the second embodiment is similar to that described in the first embodiment, so that it is not shown in the drawings. However, in the first embodiment, the queue unit is the flash package group 280, whereas in the second embodiment, the queue exists in each RAID type.

Further, since the information that the flash package 230 according to the second embodiment has is similar to the first embodiment, the description thereof is omitted.

Figure 39:
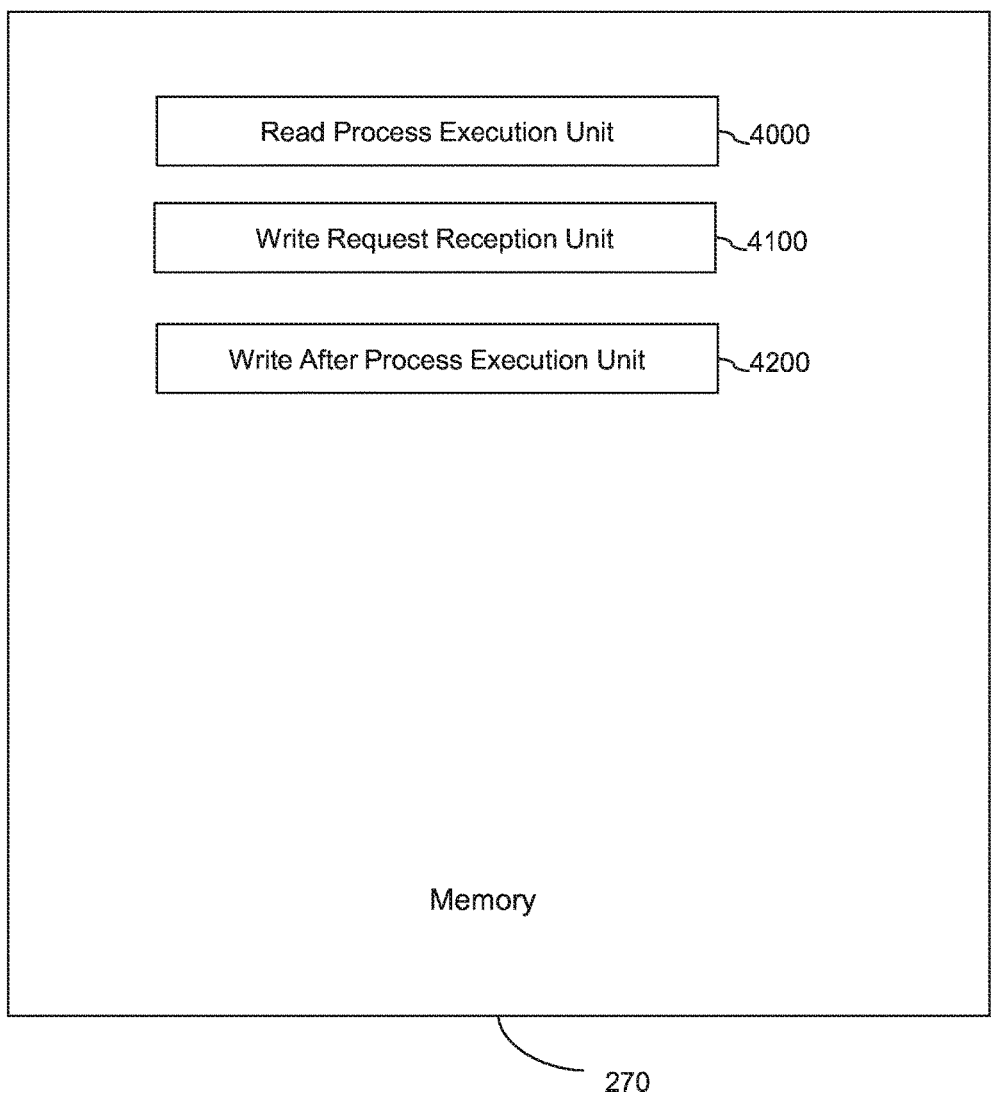
FIG. 39 is a view showing programs for performing control in a storage controller according to a second embodiment.

Next, the operation that the storage controller 200 and the flash packages 230 execute using the above-described management information will be described. FIG. 39 shows programs related to the second embodiment stored in the memory 270 of the storage controller 200. The programs related to the present embodiment are the read process execution unit 4000, the write request reception unit 4100, and the write after process execution unit 4200. These programs are executed by the processor 260, similar to the first embodiment, so that the processor is the subject of operation of the respective steps described below, unless stated otherwise. Similar to the first embodiment, also according to the second embodiment, we will describe a case where the range of access designated by the read/write request from the host 12 corresponds to the virtual segment boundary. Further, it is assumed that the access data size corresponds to the size of one virtual segment. However, the present invention is also effective in a case where a plurality of virtual segments or a portion of the virtual segment are designated as the access range designated by the read/write request from the host 12.

Figure 47:
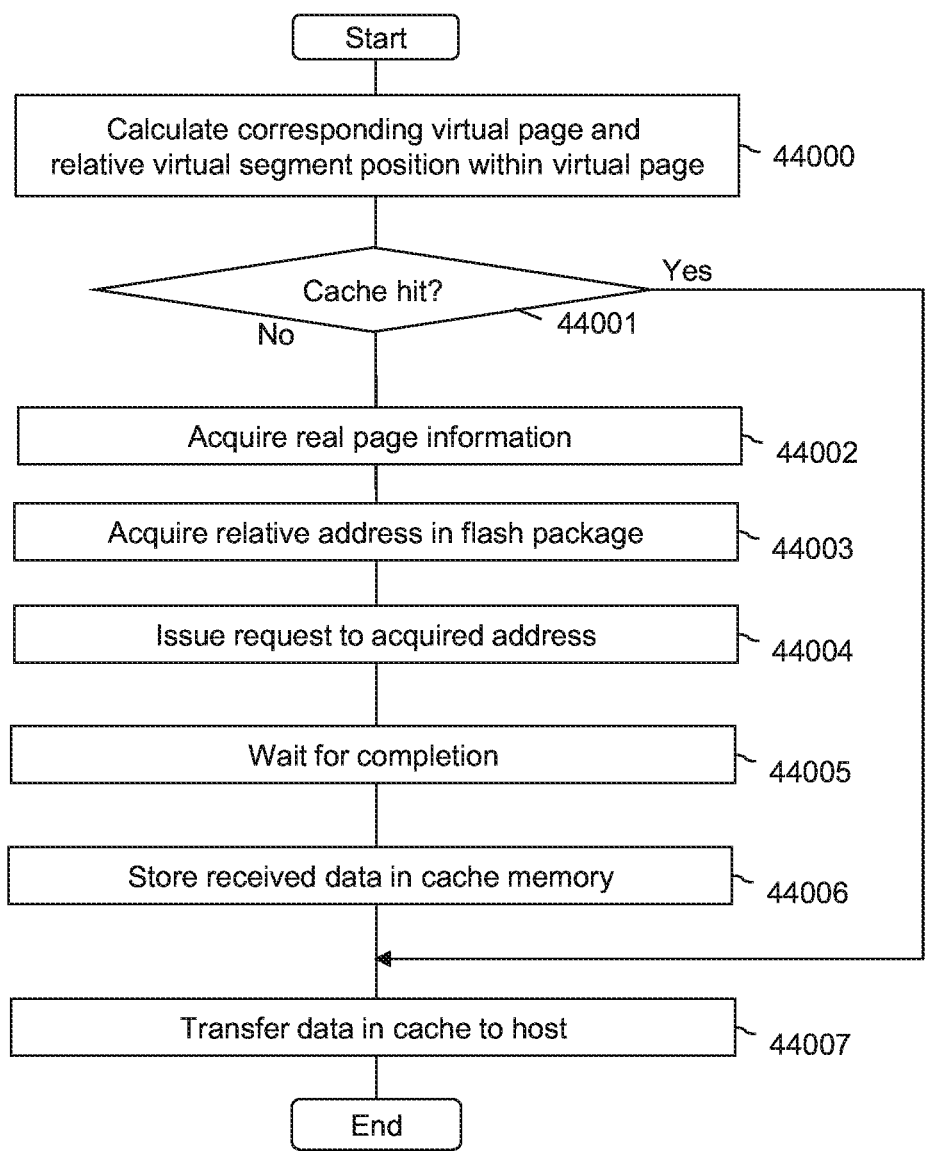
FIG. 47 is a view showing the flow of processing of a read process execution unit according to the second embodiment.

FIG. 47 shows the flow of processing of the read process execution unit 4000 in the second embodiment. The read process execution unit 4000 is executed when the storage controller 200 receives a read request from the host 120.

Step 44000: The processor 260 calculates the virtual page being the read target and the relative virtual segment position within the relevant virtual page (relative position in the virtual page of the read-target logical virtual segment) from the read target address designated by the received read request.

Step 44001: Whether the read target data is a hit in the cache memory 210 or not is checked. This is a well-known technique. In the case of cache hit, the procedure jumps to Step 44007.

Step 44002: In the present step, the read target data must be loaded to the cache memory 210. At first, in the present step, the real page information 2100' corresponding to the real page allocated to the read target virtual page is acquired from the real page pointer 2004 within the logical volume information 2000.

Step 44003: The logical virtual segment pointer 4000 corresponding to the access target virtual segment is specified from the acquired real page information 2100' using the virtual segment position calculated in Step 44000. Thereby, it becomes possible to specify the address (virtual segment) of the flash package 230 from which the data should be read.

Step 44004: A read request for reading the data stored in the specified address is issued to the flash package 230 acquired in Step 44003.

Step 44005: The procedure waits for data to be transmitted from the flash package 230.

Step 44006: The data that was transmitted from the flash package 230 is stored in the cache memory 150.

Step 44007: The data in the cache memory 210 designated by the relevant read request is transmitted to the host 120, and the process is completed.

Figure 48:
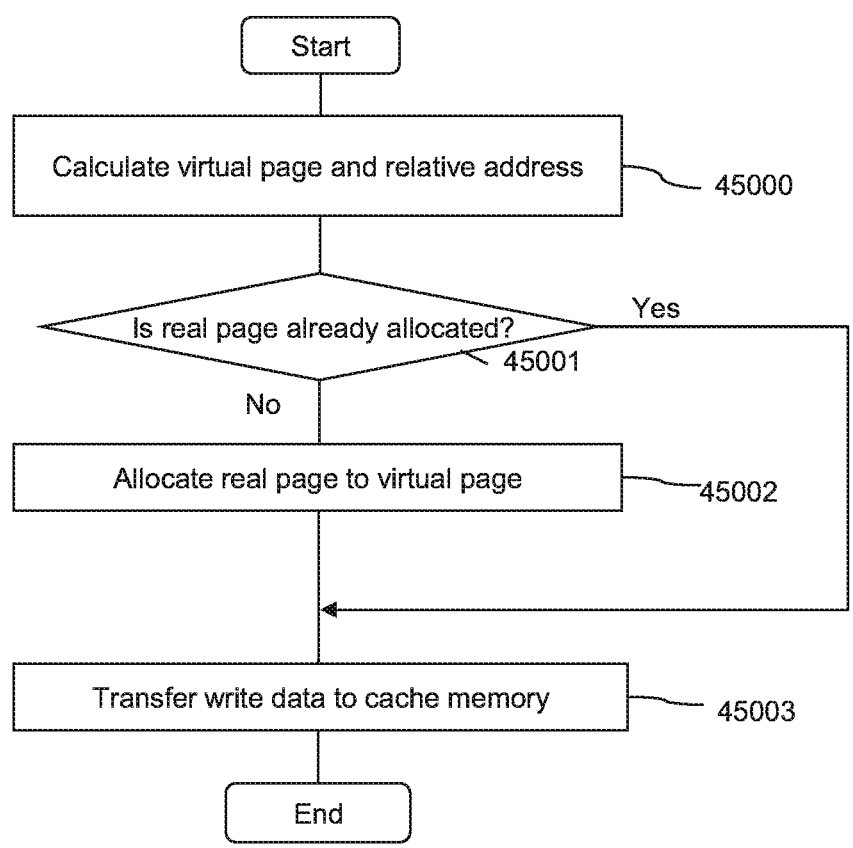
FIG. 48 is a view showing the flow of processing of a write request reception unit according to the second embodiment.

FIG. 48 shows the flow of processing of the write request reception unit 4100 in the second embodiment. The write request reception unit 4100 is executed when the storage controller 200 receives a write request from the host 120.

Step 45000: The processor 260 calculates the corresponding virtual page and the relative address within the virtual page to be accessed based on the write target address in the received write request.

Step 45001: The logical volume information 2000 corresponding to the logical volume designated by the write request is referred to, and whether the real page is allocated to the virtual page acquired in Step 45000 is checked by referring to the real page pointer 2004 within the logical volume information 2000. When it is allocated, the procedure jumps to Step 45003.

Step 45002: In the present step, a real page is allocated to the corresponding virtual page. By referring to the free real page management information pointer 2200 corresponding to the RAID type 2002 in the logical volume information 2000, the procedure sets the real page pointer 2004 so that it points to the head of the real page information 2100' (real page information 2100' of the free real page). By doing this, the real page is allocated to the virtual page. However, in the second embodiment, since the real page is also a logical space, at this point of time, the area of the flash package 230 is not actually allocated to the virtual page (the flash package 230 and the address within the flash package 230 to which write data is to be stored have not been decided). Further, in the present embodiment, the process for allocating the virtual page to the real page is executed when the write request is received, but in the present invention, the allocation process should simply be executed before data is stored in the flash package 230.

Step 45003: The write data designated by the write request from the host 120 is stored in the cache memory 210.

The real page adopts a RAID configuration, so that redundancy data is generated with respect to the write data stored in the cache memory 210, which is also stored in the cache memory 210 before the process is ended. Since this is a publicly known method, it will not be described in detail. The corresponding real page information (such as the pointer to the real page information 2100', and the information about the location in the real page (location information representing which logical virtual segment in which real page the data should be stored)) is added to the redundancy data and write data in the cache memory 210. The write data and the redundancy data are written in the flash package 160 by the write after process executing unit 5200, but from the viewpoint of the write after process executing unit 5200, there is no need to distinguish them since both of them are the data to be written to the flash package 230. Similarly, the flash package 230 does not need to distinguish them. Further, the redundancy data is not necessarily generated in Step 45003.

Figure 49:
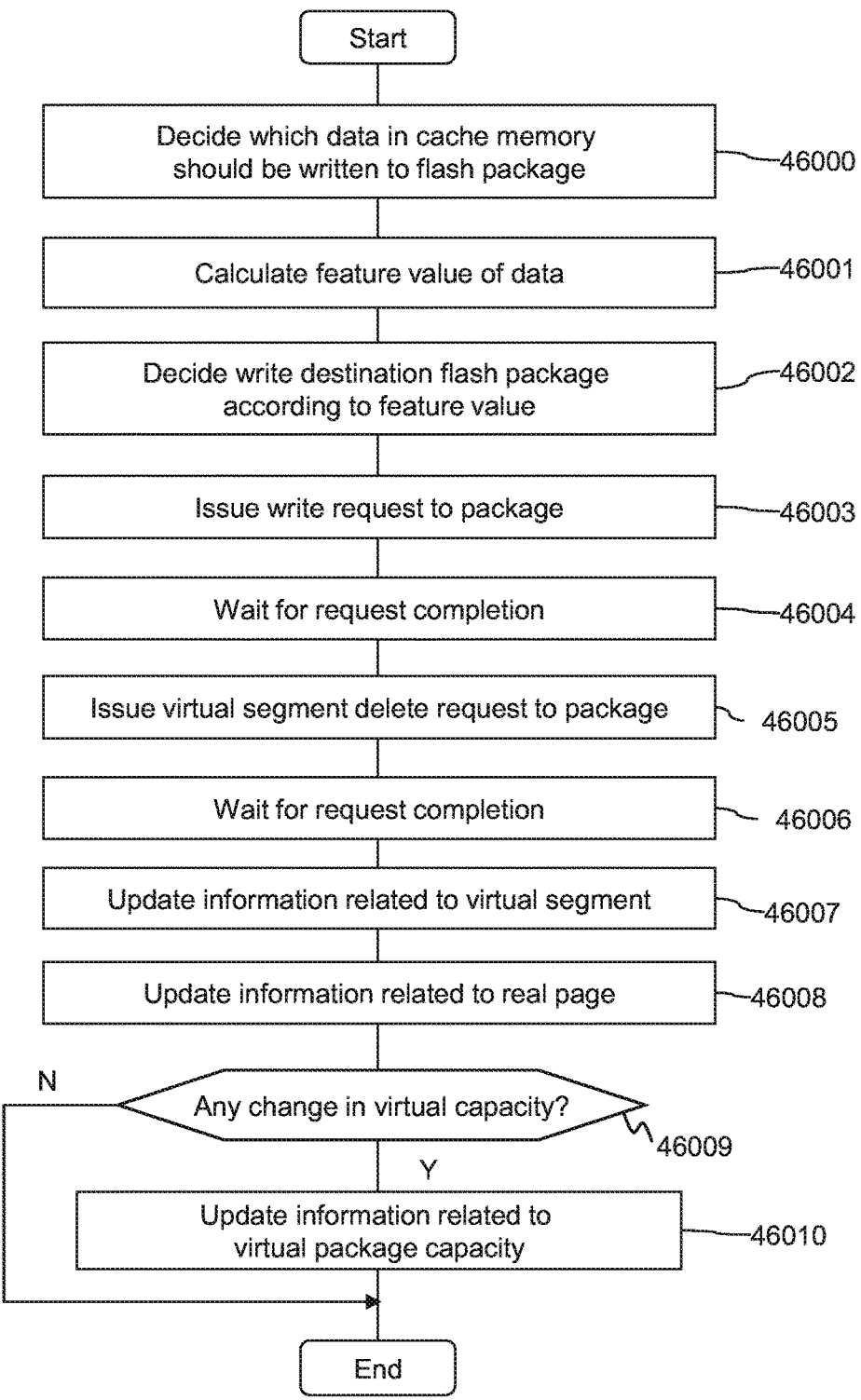
FIG. 49 is a view showing the flow of processing of a write after process execution unit according to the second embodiment.

FIG. 49 shows the flow of processing of the write after process execution unit 4200 according to the second embodiment. The write after process execution unit 4200 is a process executed by the processor 260 appropriately. The write after process execution unit 4200 executes a process to write the write data received from the host 120 and redundancy data generated from the write data to the flash package 230. However, the write after process execution unit 4200 processes both the write data and the redundancy data as data to be written to the flash package 230, without distinguishing them.

Step 46000: The processor 260 searches the cache memory 210, and decides the logical virtual segment to be written to the flash package 230. The processor 260 selects data by the logical virtual segments based on the information added to the data. However, at this time, it is possible to check whether the logical virtual segments within the RAID segment group to which the determined logical virtual segment belongs are stored in the cache memory 210 or not, and to decide all the logical virtual segments within the relevant RAID segment group stored in the cache memory 210 to be the write target to the flash package 230.

Step 46001: The procedures requests the arithmetic circuit 290 to create a feature value for each write-target logical virtual segment, and waits for completion thereof.

Step 46002: The flash package 230 to which the relevant logical virtual segment should be written is decided based on this feature value. The determination method is as described earlier, and as one example, a flash package 230 storing data having the same feature value should preferably be selected. At that time, if a different logical virtual segment belonging to the same RAID segment group as the write-target logical virtual segment is already stored in the selected flash package 230, another flash package should be selected. Further in step 46000, when a plurality of logical virtual segments within the RAID segment group are selected as the write target to the flash package 230, even if some of the logical virtual segments within the RAID segment group have the same feature values, each of these logical virtual segments is decided to be stored in different flash package 230. As for the feature values of the logical virtual segments stored in the respective flash packages 230, the storage controller 200 may record the feature value of a logical virtual segment in each flash package 230 when the storage controller 200 stores the logical virtual segment to the flash package 230. Or, if the flash package 230 is equipped with a means for calculating the feature value, the feature value of the logical virtual segment stored in the flash package 230 can be received from each flash package 230.

A free virtual segment management information 2506 is taken out from the head of the free virtual segment management information queue corresponding to the decided write-destination flash package 230, and the virtual segment to which the data should be written is decided based on the virtual segment address 2509 in the relevant virtual segment management information 2506.

Step 46003: A write request is issued to the selected flash package 230, designating the virtual segment to be written and the hash value thereof. In the second embodiment, it is possible either to send data using a SCSI write command having 520 bytes as one transfer unit, with 8-byte data including the 2-byte feature value added to the 512-byte data, or to not send such data. According to the second embodiment, the flash package 230 may calculate the hash value or the feature value.

Step 46004: The procedure waits for a write request completion report from the flash package 230.

Step 46005: An erase request of the virtual segment that had been allocated to the relevant logical virtual segment is requested to the flash package 230 including the virtual segment.

Step 46006: The procedure waits for completion thereof.

Step 46007: The virtual segment of the package that had been allocated to the relevant logical virtual segment is connected to the end of the free virtual segment management information queue 42000 of the corresponding flash package 230. Further, the address of the virtual segment in the package of which write has been currently completed (the flash package ID 2501 and the virtual segment address 2509) is set to the logical virtual segment pointer 4000 corresponding to the logical virtual segment of the corresponding real page information 2100' (for example, if the data being written is data that should be written to the k-th logical virtual segment of the real page (where 1≤k≤(m+n)), the virtual segment address is set to the k-th logical virtual segment pointer 4000 within the real page information 2100').

Step 46008: The processor 260 checks the completion report regarding the relevant write request from the flash package 230. If deduplication could not be performed by the relevant write request, the virtual segment capacity is added to the amount of stored page data and the amount of data after page deduplication. If deduplication could not be performed, the virtual segment capacity is added to the amount of stored page data.

Step 46009: A check is performed on whether there is no flash package 230 where the virtual capacity of the flash package 230 has been changed. If there is none, the process is ended.

Step 46010: If there is a change in virtual capacity, each received virtual capacity is set to the corresponding flash package virtual capacity 2502. Next, in accordance with the changed value, the virtual segment management information 2506 is transferred between the free virtual segment management information queue 42000 and the unavailable virtual segment management information queue 4300. Thereafter, the process is ended.

Figure 40:
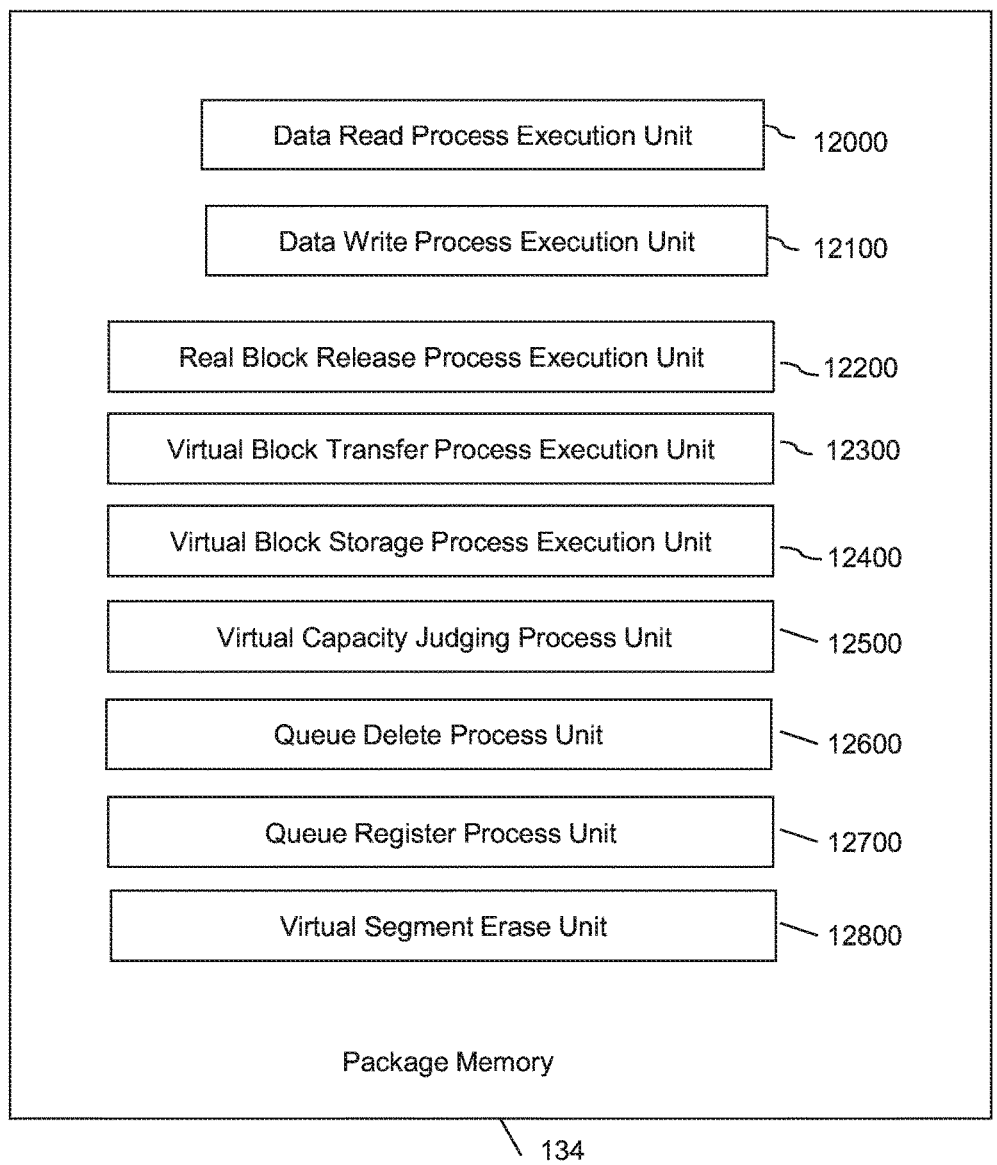
FIG. 40 is a view showing programs for performing control in a flash package side according to the second embodiment.

FIG. 40 shows programs stored in the package memory 320 to be executed by the flash package 230 according to the second embodiment. The programs executed by the flash package 230 in the second embodiment are the data read process execution unit 12000, the data write process execution unit 12100, the virtual block transfer process execution unit 12300, the queue delete process unit 12600, the queue register process unit 12700, and a virtual segment erase unit 12800. The data read process execution unit 12000, the virtual block transfer process execution unit 12300, the queue delete process unit 12600, and the queue register process unit 12700 are completely the same as the first embodiment. The virtual segment erase unit 12800 is a program only included in the second embodiment. The data write process execution unit 12100 is the same as the first embodiment in a case where the storage controller 200 calculates the hash value or the feature value and transmits the same to the flash package 230. If the flash package 230 calculates the hash value or the feature value, the only point that differs from the first embodiment is that the write data stored in the buffer 330 is referred to in calculating the hash value or the feature value, and that the calculated value is set as the virtual segment feature value 3206, and the other points are the same as Embodiment 1. Therefore, the flow of processing of the virtual segment erase unit 12800 will be described below.

Figure 50:
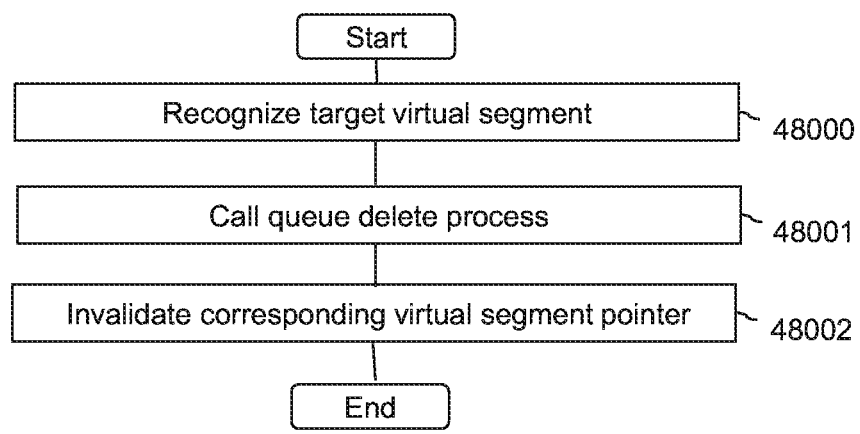
FIG. 50 is a view showing the flow of processing of a virtual segment delete unit according to the second embodiment.

FIG. 50 shows the flow of processing of the virtual segment erase unit 12800. The virtual segment erase unit 12800 is a process for invalidating the virtual segment designated by the storage controller 200. This process is executed by the package processor 310 in the flash package 230.

Step 48000: The package processor 310 recognizes the virtual block group information 3200 and the corresponding virtual segment pointer 3205 of the virtual block group including the virtual segment designated by the storage controller 200. In Embodiment 1, a process of specifying the virtual block group information 3200 and the virtual segment pointer 3205 based on the contents of the access request (such as the LBA) when the flash package 230 receives an access request (read request or write request) from the storage controller 200 is described. A process that is similar to this is performed in Step 48000.

Step 48001: The procedure calls the queue delete process unit 12600 so as to remove the recognized virtual segment from the simplified synonym queue 3550, the synonym queue 1900 or the deduplication queue 1800.

Step 48002: The procedure sets the corresponding virtual segment pointer 3205 to NULL, sends a completion report to the storage controller 200, and ends the process.

As described, in the storage system according to the second embodiment of the present invention, each of a plurality of flash packages equipped with a large number of flash memories has a deduplication function, and in a storage system having a large number of such flash packages, the storage controller selects a flash package having a high possibility of having the write data subjected to deduplication process and writes the write data thereto, so that the deduplication rate can be improved.

REFERENCE SIGNS LIST

100 Storage system
110 Host
120 Storage Area Network (SAN)
200 Storage controller
210 Cache memory
220 Shared memory
230 Flash package
250 Connecting unit
260 Processor
270 Memory
280 Hash arithmetic circuit
280 Flash package group
300 Flash chip
310 Package processor
320 Package memory
330 Buffer
340 Package bus
350 Package transfer device
2000 Logical volume information
2100 Real page information
2300 Flash package group information
2500 Flash package information
3000 Package information
3100 Chip information
3200 Virtual block information
3300 Real block information
4000 Read process execution unit
4100 Write process reception unit
4200 Write after process execution unit
4500 Real page transfer process execution unit
12000 Data read process execution unit
12100 Data write process execution unit
12200 Real block replace process execution unit
12300 Virtual block release process execution unit
12400 Virtual block store process execution unit
12500 Virtual capacity judging process unit
12600 Queue delete process unit 12700 Queue register process unit
12800 Virtual segment erase unit

The invention claimed is:
1. A storage system comprising:
a plurality of flash packages including a plurality of flash chips, each of the flash packages respectively including one or more of the flash chips, a package memory and a processor which is configured to manage the flash chips thereof in units of segments and the segments are read/write units, and the flash packages including at least a first flash package and a second flash package,
a storage controller configured to execute read/write processing between a host and the flash packages to store data having first feature values in the first flash package and to store data having second feature values in the second flash package,
wherein the storage controller is configured to:
when receiving a write request for first write data to be stored in the flash packages, generate second write data by adding an assurance code including a feature value of the first write data to the first write data,
send the second write data to one of the first or second flash packages as a SCSI command instructing to write the first write data to the first flash package when the feature value of the first write data corresponds to the first feature values in the first flash package, and to the second flash package when the feature value of the first write data corresponds to the second feature values in the second flash package,
wherein the processors of the first and second flash packages are respectively configured to:
when the SCSI command is received from the storage controller, search for a deduplication candidate segment among the segments thereof which has a same feature value as the feature value included in the received first write data,
when the deduplication candidate segment is found, compare the first write data and stored data of the deduplication candidate segment,
when the first write data is a same contents as the stored data of the deduplication candidate segment, store management information showing that the first write data has the same contents as the stored data of the deduplication candidate segment into a management area of the package memory, and
when the first write data is not the same contents as the stored data of the deduplication candidate segment, store the first write data in one of the segments of the first flash package.

2. The storage system according to claim 1, wherein the processors of the first and second flash packages are respectively further configured to:
when the SCSI command is received from the storage controller and when the first write data is the same contents as the stored data of the deduplication candidate segment, not store the first write data in the first flash package.

3. The storage system according to claim 1, wherein the processors of the first and second flash packages are further configured to:
when the SCSI command is received from the storage controller, calculate a second feature value from the feature value included in the assurance code of the second write data, the second feature value being shorter than the feature value included in the assurance code of the second write data,
searches for at least one second deduplication candidate segment among the segments thereof having a same second feature value as the calculated second feature value, and
when the at least one second deduplication candidate segment is not found, not search for the deduplication candidate segment having the same feature value as the feature value included in the assurance code of the second write data and store the first write data in one of the segments thereof.

4. The storage system according to claim 1, wherein the processors of the first and second flash packages are further configured to:
send information showing whether the deduplication candidate segment having the same contents as the first write data exists in the first flash package in response to the received SCSI command.

5. The storage system according to claim 1, wherein each of the processors of the flash packages are further configured to:
provide a respective first storage space having a greater size than a total storage capacity of the plurality of flash chips thereof to the storage controller, the respective first storage space being managed in units of virtual blocks configured from the segments,
wherein the storage controller is further configured to:
provide a second storage space having a greater size than a total size of the first storage spaces that the plurality of flash packages provide, the second storage space being managed in units of virtual pages having a predetermined size greater than the virtual blocks,
when the write request to one of the virtual pages is received from the host, a real page to the one of the virtual pages, the real page configured from one or more of the virtual blocks of the first storage spaces provided by the plurality of flash packages.

6. The storage system according to claim 5, wherein the management area includes a mapping of the segments to the virtual blocks,
wherein the processors of the first and second flash packages are further configured to:
when the SCSI command is received from the storage controller and when the first write data has the same contents as the stored data in the deduplication candidate segment, not store the first write data designated by the write request to the flash chips, and update the mapping information to map the first write data to the deduplication candidate segment having the same contents as the first write data.

7. The storage system according to claim 6, wherein each of the processors of the flash packages is further configured to manage the segments thereof in units of real blocks, each of the real blocks including two or more segments and the real blocks are data delete units, and
provide the respective first storage space in units of the virtual blocks which are configured from the real blocks.

8. The storage system according to claim 5, wherein each of the processors of the flash packages are further configured to:
change a size of the respective first storage space provided to the storage controller based on the management information, and
notify the changed first storage space size to the storage controller.

9. The storage system according to claim 8, wherein each of the processors of the flash packages are further configured to:
    store a total size of data stored to the respective first storage space from the storage controller before deduplication, and a total size of the data stored to the respective first storage space after deduplication in the management information, and
    when a ratio of the total size of the data before deduplication and the total size of the data after deduplication is greater than a ratio of a size of the respective first storage space and a total storage capacity of the plurality of flash chips thereof for a predetermined value or greater, the size of the respective first storage space is changed.

10. The storage system according to claim 5, wherein the storage controller is further configured to:
    transfer data written to the one of the real pages between the flash packages based on an amount of free pages in the flash chips.

11. A storage system comprising:
    a plurality of flash packages including a plurality of flash chips, each of the flash packages respectively including one or more of the flash chips, a package memory and a processor which is configured to manage the flash chips thereof in units of segments and the segments are read/write units; and
    a storage controller configured to provide a first storage space to a host and execute a read/write process between a host and the storage space, the storage space being managed in units of virtual pages which correspond to the segments of the flash packages being managed in units of real pages, and the read/write process storing data having predetermined different feature values in different ones of the flash packages configured as a RAID group,
    wherein the storage controller is configured to:
    when receiving a write request for first write data to be stored in the first storage space, generate redundancy data based on the first write data,
    separate the first write data and the redundancy data into a plurality of pieces of second write data,
    generate a plurality of pieces of third write data by adding an assurance code including a feature value of one of the respective pieces of second write data to the one of the respective pieces of second write data, each of the pieces of third write data corresponding to one of the first write data or the redundancy data,
    send the pieces of third write data to the RAID group as a plurality of SCSI commands instructing to write the first write data and the redundancy data, the SCSI commands being sent to the RAID group according to the respective feature values of the pieces of third write data,
    wherein each processor of the flash packages configured as the RAID group is configured to:
    when one of the SCSI commands is received from the storage controller, search for a deduplication candidate segment among the segments thereof which has a same feature value as the feature value included in the received piece of third write data,
    when the deduplication candidate segment is found, compare the piece of first write data or redundancy data in the received piece of third write data and stored data of the deduplication candidate segment,
    when the piece of first write data or redundancy data in the received piece of third write data is a same contents as the stored data of the deduplication candidate segment, store management information showing that the piece of first write data or redundancy data in the received piece of third write data has the same contents as the stored data of the deduplication candidate segment into a management area of the package memory thereof, and
    when the piece of first write data or redundancy data in the received piece of third write data is not the same contents as the stored data of the deduplication candidate segment, store the piece of first write data or redundancy data in the received piece of third write data in one of the segments thereof, and
    wherein the SCSI commands instructing to write the first write data are sent to different flash packages than the SCSI commands instructing to write the redundancy data.

12. The storage system according to claim 11, wherein each processor of the flash packages configured as the RAID group is further configured to:
    when the piece of first write data or redundancy data in the received piece of third write data is the same contents as the stored data of the deduplication candidate segment, not store the piece of first write data or redundancy data in the received piece of third write data in any of the segments thereof, and
    wherein a number of the flash packages which receive the SCSI commands corresponding to the pieces of third write data including redundancy data is smaller than a number of the flash packages which receive the SCSI commands corresponding to the pieces of third write data including first write data.

13. The storage system according to claim 11, wherein the storage controller is further configured to:
    provide the first storage space having a greater size than a total storage capacity of the real pages to the host,
    wherein each processor of the flash packages configured as the RAID group is further configured to:
    provide a respective second storage space having a greater size than a total size of the segments provided by the flash chips thereof, and
    allocate one or more of the segments in the respective second storage space to a real page corresponding to the first storage space when the write request is received from the host.

14. The storage system according to claim 11, wherein the processors of the flash packages are further configured to:
    manage the segments thereof in units of blocks which are data delete units.

* * * * *